(12) United States Patent
Shelton et al.

(10) Patent No.: US 8,003,715 B2
(45) Date of Patent: *Aug. 23, 2011

(54) LOW MOLECULAR WEIGHT CELLULOSE MIXED ESTERS AND THEIR USE AS LOW VISCOSITY BINDERS AND MODIFIERS IN COATING COMPOSITIONS

(75) Inventors: Michael Charles Shelton, Kingsport, TN (US); Jessica Dee Posey-Dowty, Kingsport, TN (US); Luis Guillermo Rios Perdomo, Kingsport, TN (US); Daniel Wayne Dixon, Jr., Church Hill, TN (US); Paul Lee Lucas, Gray, TN (US); Alan Kent Wilson, Kingsport, TN (US); Kenneth Raymond Walker, Dunblane (GB); Jonathan Edward Lawniczak, Kingsport, TN (US); Roy Glenn Foulk, Kingsport, TN (US); Hieu Duy Phan, Antioch, IL (US); Charlie Carroll Freeman, Jr., Rogersville, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/510,324

(22) Filed: Jul. 28, 2009

(65) Prior Publication Data

US 2009/0286095 A1    Nov. 19, 2009

Related U.S. Application Data

(62) Division of application No. 10/796,176, filed on Mar. 9, 2004, now Pat. No. 7,585,905.

(60) Provisional application No. 60/455,033, filed on Mar. 14, 2003.

(51) Int. Cl.
*C08L 1/00* (2006.01)
*C08L 1/14* (2006.01)
*C08L 1/12* (2006.01)

(52) U.S. Cl. ............... 524/39; 524/38; 524/35
(58) Field of Classification Search ............ 536/66, 536/58; 524/35, 38, 430; 522/88
See application file for complete search history.

(56) References Cited

U.S. PATENT DOCUMENTS

| | | | |
|---|---|---|---|
| 1,652,573 A | 12/1927 | Mallabar | |
| 1,683,347 A | 9/1928 | Gray et al. | |
| 1,878,954 A | 9/1932 | Malm | |
| 2,129,052 A | 9/1938 | Fordyce | |
| 2,801,239 A | 7/1957 | Hiatt et al. | |
| 3,281,267 A | 10/1966 | Rice | |
| 3,386,932 A | 6/1968 | Steinmann | |
| 3,391,135 A | 7/1968 | Ouno et al. | |
| 3,411,941 A | 11/1968 | Lowe et al. | |
| 3,429,840 A | 2/1969 | Lowe et al. | |
| 3,518,249 A | 6/1970 | Hiatt et al. | |
| 3,850,770 A | 11/1974 | Juna et al. | |
| T941,001 I4 | 12/1975 | Corpening et al. | |
| 3,998,768 A | 12/1976 | Pettit | |
| 4,007,144 A | 2/1977 | Sanders et al. | |
| 4,134,809 A | 1/1979 | Pacifici et al. | |
| 4,170,663 A | 10/1979 | Hahn et al. | |
| 4,389,502 A | 6/1983 | Fry et al. | |
| 4,407,990 A | 10/1983 | Hall et al. | |
| 4,408,028 A | 10/1983 | Nakayama et al. | |
| 4,415,734 A | 11/1983 | Yabune et al. | |
| 4,442,145 A | 4/1984 | Probst et al. | |
| 4,532,177 A | 7/1985 | Mahar | |
| 4,543,409 A | 9/1985 | Diamantoglou et al. | |
| 4,551,491 A | 11/1985 | Panush | |
| 4,551,492 A | 11/1985 | Aerts | |
| 4,565,730 A | 1/1986 | Poth et al. | |
| 4,590,265 A | 5/1986 | Bogan et al. | |
| 4,595,722 A | 6/1986 | Such | |
| 4,598,015 A | 7/1986 | Panush | |
| 4,598,020 A | 7/1986 | Panush | |
| 4,598,111 A | 7/1986 | Wright et al. | |
| 4,603,160 A | 7/1986 | Leonard | |
| 4,605,687 A | 8/1986 | Panush | |
| 4,650,821 A | 3/1987 | Leonard | |
| 4,692,481 A | 9/1987 | Kelly | |
| 4,707,381 A | 11/1987 | Toyama et al. | |
| 4,714,634 A | 12/1987 | Miyazono et al. | |
| 4,725,640 A | 2/1988 | Cowles | |
| 4,732,790 A | 3/1988 | Blackburn et al. | |

(Continued)

FOREIGN PATENT DOCUMENTS

| | | |
|---|---|---|
| EP | 0 267 409 B1 | 5/1988 |
| EP | 0 289 997 A2 | 11/1988 |
| EP | 0 515 208 A3 | 11/1992 |
| EP | 0 547 614 A3 | 6/1993 |
| EP | 0 455 211 B2 | 4/1995 |
| EP | 0 803 552 B2 | 5/2000 |
| EP | 1 574 554 A3 | 9/2005 |
| FR | 2 244 572 | 4/1975 |
| GB | 1 122 006 | 7/1968 |
| JP | 51-119088 | 10/1976 |

(Continued)

OTHER PUBLICATIONS

PCT International Search Report and Written Opinion with Date of Mailing Jan. 8, 2010 for related PCT/US2009/005144 application.

(Continued)

*Primary Examiner* — James Seidleck
*Assistant Examiner* — Saira Haider
(74) *Attorney, Agent, or Firm* — Polly C. Owen; Bernard J. Graves, Jr.

(57) ABSTRACT

Cellulose mixed esters are disclosed having low molecular weights and low degrees of polymerization. These new cellulose mixed esters include cellulose acetate propionate and cellulose acetate butyrate. The esters exhibit solubility in a wide range of organic solvents with minimal viscosity increase, are compatible with a wide variety of resins, and are useful in coatings and inks compositions as binder resins and rheology modifiers.

43 Claims, 1 Drawing Sheet

U.S. PATENT DOCUMENTS

| | | |
|---|---|---|
| 4,732,791 A | 3/1988 | Blackburn et al. |
| 4,740,541 A | 4/1988 | Morse |
| 4,753,829 A | 6/1988 | Panush |
| 4,755,581 A | 7/1988 | Blackburn et al. |
| 4,755,582 A | 7/1988 | Blackburn et al. |
| 4,829,108 A | 5/1989 | Okuda et al. |
| 4,855,184 A | 8/1989 | Klun et al. |
| 4,859,758 A | 8/1989 | Shalati et al. |
| 4,888,372 A | 12/1989 | Abrams et al. |
| 4,902,578 A | 2/1990 | Kerr, III |
| 4,970,247 A | 11/1990 | Hoppe et al. |
| 4,975,300 A | 12/1990 | Deviny |
| 4,983,730 A | 1/1991 | Domeshek et al. |
| 5,051,473 A | 9/1991 | Tabuchi et al. |
| 5,086,144 A | 2/1992 | Shalati et al. |
| 5,089,313 A | 2/1992 | Cope |
| 5,091,010 A | 2/1992 | Souma et al. |
| 5,256,453 A | 10/1993 | Heithorn et al. |
| 5,260,358 A | 11/1993 | Shimizu et al. |
| 5,283,126 A | 2/1994 | Rasmussen et al. |
| 5,292,783 A | 3/1994 | Buchanan et al. |
| 5,321,063 A | 6/1994 | Shimada et al. |
| 5,322,560 A | 6/1994 | DePue et al. |
| 5,360,644 A | 11/1994 | Briggs et al. |
| 5,372,638 A | 12/1994 | DePue et al. |
| 5,384,163 A | 1/1995 | Budde et al. |
| 5,389,139 A | 2/1995 | Carpenter et al. |
| 5,418,293 A | 5/1995 | Numa et al. |
| 5,425,969 A | 6/1995 | Wakabayashi et al. |
| 5,449,555 A | 9/1995 | Karstens et al. |
| 5,473,032 A | 12/1995 | Bederke et al. |
| 5,478,386 A | 12/1995 | Itoh et al. |
| 5,480,922 A | 1/1996 | Mülhaupt et al. |
| 5,498,663 A | 3/1996 | Shimada et al. |
| 5,498,781 A | 3/1996 | Hall et al. |
| 5,504,178 A | 4/1996 | Shaffer et al. |
| 5,510,443 A | 4/1996 | Shaffer et al. |
| 5,520,963 A | 5/1996 | Liu |
| 5,527,848 A | 6/1996 | Carpenter et al. |
| 5,545,677 A | 8/1996 | Hall et al. |
| 5,552,458 A | 9/1996 | Hall et al. |
| 5,580,819 A | 12/1996 | Li et al. |
| 5,585,186 A | 12/1996 | Scholz et al. |
| 5,624,757 A | 4/1997 | Smith |
| 5,658,976 A | 8/1997 | Carpenter et al. |
| 5,663,310 A | 9/1997 | Shimoda et al. |
| 5,668,273 A | 9/1997 | Allen et al. |
| 5,670,141 A | 9/1997 | Nebra |
| 5,705,632 A | 1/1998 | Shimoda et al. |
| 5,720,803 A | 2/1998 | Itoh et al. |
| 5,721,015 A | 2/1998 | Iwamura et al. |
| 5,741,880 A | 4/1998 | Valpey et al. |
| 5,744,243 A | 4/1998 | Li et al. |
| 5,753,373 A | 5/1998 | Scholz et al. |
| 5,759,631 A | 6/1998 | Rink et al. |
| 5,821,315 A | 10/1998 | Moriya et al. |
| 5,856,468 A | 1/1999 | Shuto et al. |
| 5,873,931 A | 2/1999 | Scholz et al. |
| 5,914,309 A | 6/1999 | Ulbl et al. |
| 5,914,397 A | 6/1999 | Kiyose et al. |
| 5,919,920 A | 7/1999 | Murakami et al. |
| 5,942,030 A | 8/1999 | Schuhmacher et al. |
| 5,962,677 A | 10/1999 | Murakami et al. |
| 5,990,304 A | 11/1999 | Kiyose et al. |
| 5,993,526 A | 11/1999 | Sommer et al. |
| 5,994,530 A | 11/1999 | Posey-Dowty et al. |
| 5,997,621 A | 12/1999 | Scholz et al. |
| 5,998,035 A | 12/1999 | Iwamura et al. |
| 6,001,484 A | 12/1999 | Horrion et al. |
| 6,001,931 A | 12/1999 | Brahm et al. |
| 6,025,433 A | 2/2000 | Shibatoh et al. |
| 6,040,053 A | 3/2000 | Scholz et al. |
| 6,046,259 A | 4/2000 | Das et al. |
| 6,051,242 A | 4/2000 | Patel et al. |
| 6,099,973 A | 8/2000 | Miyai et al. |
| 6,207,601 B1 | 3/2001 | Maurer et al. |
| 6,218,448 B1 | 4/2001 | Kraaijevanger et al. |
| 6,225,404 B1 | 5/2001 | Sorenson et al. |
| 6,228,433 B1 | 5/2001 | Witt |
| 6,261,642 B1 | 7/2001 | Nagai et al. |
| 6,303,670 B1 | 10/2001 | Fujino et al. |
| 6,313,202 B1 | 11/2001 | Buchanan et al. |
| 6,331,326 B1 | 12/2001 | Tsunoda et al. |
| 6,355,303 B1 | 3/2002 | Vogt-Birnbrich et al. |
| 6,403,152 B1 | 6/2002 | Puligadda et al. |
| 6,407,151 B1 | 6/2002 | Hoppe et al. |
| 6,407,224 B1 | 6/2002 | Mironov et al. |
| 6,509,440 B1 | 1/2003 | Sakane et al. |
| 6,512,044 B1 | 1/2003 | Wilke |
| 6,522,812 B1 | 2/2003 | Nikonov |
| 6,544,593 B1 | 4/2003 | Nagata et al. |
| 6,592,944 B1 | 7/2003 | Uhlianuk et al. |
| 6,596,069 B2 | 7/2003 | Ido et al. |
| 6,607,833 B1 | 8/2003 | Uhlianuk et al. |
| 6,609,677 B2 | 8/2003 | Seybold et al. |
| 6,632,852 B1 | 10/2003 | Chen et al. |
| 6,635,314 B1 | 10/2003 | William et al. |
| 6,653,411 B2 | 11/2003 | Puligadda et al. |
| 6,656,983 B1 | 12/2003 | Mayer et al. |
| 6,689,839 B1 | 2/2004 | Hayakawa et al. |
| 6,696,142 B2 | 2/2004 | Baer et al. |
| 6,758,992 B2 | 7/2004 | Solomon et al. |
| 6,861,495 B2 | 3/2005 | Barsotti et al. |
| 6,870,024 B2 | 3/2005 | Haubennestel et al. |
| 6,903,145 B2 | 6/2005 | Nienhaus et al. |
| 6,913,831 B2 | 7/2005 | Suzuki |
| 6,930,161 B2 | 8/2005 | Schwarte et al. |
| 6,987,144 B2 | 1/2006 | Anderson et al. |
| 6,997,980 B2 | 2/2006 | Wegner et al. |
| 7,001,948 B2 | 2/2006 | Gupta et al. |
| 7,026,470 B2 | 4/2006 | Obie |
| 7,208,534 B2 | 4/2007 | Van Rooyen |
| 7,585,905 B2 | 9/2009 | Shelton et al. |
| 2002/0197411 A1 | 12/2002 | Colyer et al. |
| 2003/0059547 A1 | 3/2003 | Rihan et al. |
| 2003/0161961 A1 | 8/2003 | Barsotti et al. |
| 2003/0212171 A1 | 11/2003 | Frederick et al. |
| 2004/0058083 A1 | 3/2004 | Lettmann et al. |
| 2004/0101629 A1 | 5/2004 | Baumgart et al. |
| 2004/0110895 A1 | 6/2004 | Anderson et al. |
| 2004/0180993 A1 | 9/2004 | Shelton et al. |
| 2004/0181009 A1 | 9/2004 | Shelton et al. |
| 2004/0185269 A1 | 9/2004 | Loper et al. |
| 2005/0031873 A1 | 2/2005 | Berschel et al. |
| 2005/0100740 A1 | 5/2005 | Lin et al. |
| 2005/0123781 A1 | 6/2005 | Drescher et al. |
| 2005/0132781 A1 | 6/2005 | Seo et al. |
| 2005/0186349 A1 | 8/2005 | Loper et al. |
| 2005/0203278 A1 | 9/2005 | McCreight et al. |
| 2005/0227162 A1 | 10/2005 | Van Rooyen |
| 2006/0052525 A1 | 3/2006 | Staunton et al. |
| 2006/0100353 A1 | 5/2006 | Barsotti et al. |
| 2006/0123890 A1 | 6/2006 | Seo et al. |
| 2007/0028806 A1 | 2/2007 | Piro et al. |
| 2007/0088105 A1 | 4/2007 | Shelton et al. |
| 2007/0282038 A1 | 12/2007 | Bhattacharya et al. |
| 2008/0032067 A1 | 2/2008 | Sakurazawa et al. |
| 2008/0069963 A1 | 3/2008 | Bhattacharya et al. |

FOREIGN PATENT DOCUMENTS

| | | |
|---|---|---|
| JP | 51-119089 | 10/1976 |
| JP | 59152901 | 8/1984 |
| JP | 11035601 | 2/1999 |
| WO | WO 82/02719 | 8/1982 |
| WO | WO 91/16356 | 10/1991 |
| WO | WO 96/20961 | 7/1996 |
| WO | 9833821 A1 | 8/1998 |
| WO | WO 99/59753 | 11/1999 |
| WO | WO 01/35719 | 5/2001 |
| WO | 0236637 A1 | 5/2002 |
| WO | WO 03/070843 A1 | 8/2003 |
| WO | WO 2004/083253 A1 | 9/2004 |
| WO | WO 2004/094515 A1 | 11/2004 |
| WO | WO 2006/116367 A1 | 11/2006 |
| WO | WO 2007/005808 A2 | 1/2007 |
| WO | WO 2007/145929 A2 | 12/2007 |
| WO | 2008036274 A2 | 3/2008 |

OTHER PUBLICATIONS

USPTO Notice of Allowance dated Jun. 1, 2009 for copending U.S. Appl. No. 10/796,176.
USPTO Office Action dated May 26, 2009 for copending U.S. Appl. No. 10/796,235.
USPTO Office Action dated Jan. 22, 2010 for copending U.S. Appl. No. 11/394,008.
PCT International Search Report and Written Opinion with Date of Mailing Jun. 22, 2010 for related PCT/US2010/000839 application.
USPTO Office Action dated Apr. 9, 2008 for copending U.S. Appl. No. 11/810,065.
Coatings Encyclopedic Dictionary, ed. LeSota, S.; 1995, Federation of Societies for Coatings Technology, Blue Bell, PA.
Colour Index, 3d Ed., 2d Rev., 1982, Published by the Society of Dryers and Colourists in association with the American Association of Textile Chemists and Colorists.
Raw Materials Index, Published by the National Paint & Coatings Association, 1500 Rhode Island Avenue, N.W., Washington, D.C. 20005.
U.S. Appl. No. 60/455,033, filed Mar. 14, 2003, now expired.
U.S. Appl. No. 60/810,924, filed Jun. 5, 2006, now expired.
U.S. Appl. No. 60/810,923, filed Jun. 5, 2006, now expired.
Copending U.S. Appl. No. 11/810,011, filed Jun. 4, 2007.
U.S. Appl. No. 60/845,374, filed Sep. 18, 2006, now expired.
U.S. Appl. No. 60/845,288, filed Sep. 18, 2006, now expired.
Copending U.S. Appl. No. 11/856,176, filed Sep. 17, 2007.
Copending U.S. Appl. No. 11/845,179, filed Sep. 17, 2007.
USPTO Notice of Allowance dated Oct. 7, 2010 for copending U.S. Appl. No. 10/796,235.
USPTO Notice of Allowance dated Jun. 1, 2009 for U.S. Appl. No. 10/796,176.
Office Action from the United States Patent and Trademark Office with Mail Date of May 26, 2009 for U.S. Appl. No. 10/796,235.
Office Action from the United States Patent and Trademark Office with Mail Date of Jan. 22, 2010 for U.S. Appl. No. 11/394,008.
Copending U.S. Appl. No. 12/559,744, filed Sep. 15, 2009, Deepanjan Bhattacharya, et al.
Copending U.S. Appl. No. 12/728,427, filed Mar. 22, 2010, Michael Charles Shelton, et al.
USPTO Office Action dated Oct. 8, 2010 for copending U.S. Appl. No. 12/559,744.
USPTO Office Action dated Aug. 4, 2010 for copending U.S. Appl. No. 11/394,008.
Kirk-Othmer, Encyclopedia of Chemical Technology, Fourth Ed., vol. 5, pp. 496-529, 509 (1993), John Wiley & Sons, New York, New York.
Nishimura, T.; Nakatsubo, F. "Chemical Synthesis of Cellulose Derivatives by a Convergent Synthetic Method and Several of Their Properites," *Cellulose*, 1997, 4, 109.
Kawada, T.; Nakatsubo, F.; Murakami, K.; Sakuno, T. "Synthetic Studies of Cellulose IX: Reactivity and Cleavage of Three Kinds of Protective Groups of Synthesized Celloologosaccharide Derivatives," *Mokuzai Gakkaishi*, 1991, 37 (10), 930.
Kawada, T.; Nakatsubo, F.; Umezawa, T.; Murakami, K.; Sakuno, T. "Synthetic Studies of Cellulose XII: First Chemical Synthesis of Cellooctaose Acetate," *Mokuzai Gakkaishi*, 1994, 40 (7), 738.
"Characterization of Cellulose Esters by Solution-State and Solid-State Nuclear Magnetic Resonance Spectroscopy," Editors: T. J. Heinze and W. G. Glasser, Chapter 10 in the ACS Symposium Series 688 :Cellulose Derivatives—Modification, Characterization, and Nanostructures, Douglas W. Lowman, 131-162 (1998).
Miyamoto, T.; Sato, Y.; Shibata, T.; Inagaki, H.; Tanahashi, M; *J. Polym. Sci., Polym. Chem. Ed.*, 1984, 22, 2363.
Malm, Carl J.; Fordyce, Charles R.; Tanner, Howard A. "Properties of Cellulose Esters of Acetic, Propionic, and Butyric Acids," *Ind. Eng. Chem.*, 1942, 34(4), 430.
Abatzoglou, N.; Chornet, E. "Acid Hydrolysis of Hemicelluloses and Cellulose: Theory and Applications," in *Polysaccharides: Structural Diversity and Functional Versatility*, ed. S. Dumitriu, Marcel Dekker, Inc., New York, 1998.
Buchanan, C. M.; Hyatt, J. A.; Kelley, S. S.; Little, J. L.; *Macromolecules*, 1990, 23, 3747.
Dickey, E. E.; Wolfrom, J. L., A Polymer-Homologous Series of Sugar Acetates from the Acetolysis of Cellulose,: *J. Am. Chem. Soc.*, 1949, 825.
Wolfrom, M. L.; Dacons, J. C., "The Polymer-Homologous Series of Oligosaccharides from Cellulose," *J. Am. Chem. Soc.*, 1952, 5331.
Research Disclosure, Sep. 1978, 17304, p. 19.
International Search Report and Written Opinion of the International Searching Authority for Corresponding PCT/US2006/015573.
Office Action dated May 16, 2007 from United States Patent and Trademark Office for co-pending U.S. Appl. No. 10/796,176.
Office Action dated May 16, 2007 from United States Patent and Trademark Office for co-pending U.S. Appl. No. 10/796,235.
PCT International Search Report and Written Opinion With Date of Mailing Jan. 7, 2007 for Related PCT/US2007/013253 Application.
PCT International Search Report and Written Opinion with Date of Mailing Feb. 6, 2008 for Related PCT/US2007/013212 Application.
Office Action dated Jan. 17, 2008 from United States Patent and Trademark Office for co-pending U.S. Appl. No. 10/796,235.
Office Action dated Jan. 25, 2008 from United States Patent and Trademark Office for co-pending U.S. Appl. No. 10/796,176.
PCT International Search Report and Written Opinion with Date of Mailing Mar. 3, 2008 for Related PCT/US2007/020219 Application.
Office Action dated Mar. 28, 2008 from United States Patent and Trademark Office for co-pending U.S. Appl. No. 11/810,011.
PCT International Search Report and Written Opinion with Date of Mailing Jul. 28, 2008 for Related PCT/US2007/020224 Application.
Office Action from the United States Patent and Trademark Office with Mail Date of Sep. 30, 2008 for U.S. Appl. No. 10/796,235.
Office Action from the United States Patent and Trademark Office with Mail Date of Apr. 2, 2009 for U.S. Appl. No. 11/394,008.
USPTO Office Action dated May 5, 2011 for copending U.S. Appl. No. 12/559,744.
USPTO Notice of Allowance dated Jun. 8, 2011 for copending U.S. Appl. No. 11/394,008.

LOW MOLECULAR WEIGHT CELLULOSE MIXED ESTERS AND THEIR USE AS LOW VISCOSITY BINDERS AND MODIFIERS IN COATING COMPOSITIONS

RELATED APPLICATIONS

This application is a divisional of U.S. patent application Ser. No. 10/796,176, filed Mar. 9, 2004, which claims priority from U.S. Provisional Patent Application No. 60/455,033, filed Mar. 14, 2003, the disclosure of which is incorporated herein by reference in its entirety.

FIELD OF THE INVENTION

This invention belongs to the field of cellulose chemistry, and more particularly, to low molecular weight cellulose mixed esters that are useful in coating and ink compositions as low viscosity binder resins and rheology modifiers.

BACKGROUND OF THE INVENTION

Cellulose esters are valuable polymers that are useful in many plastic, film, coating, and fiber applications. Cellulose esters (CEs) are typically synthesized by the reaction of cellulose with an anhydride or anhydrides corresponding to the desired ester group or groups, using the corresponding carboxylic acid as diluent and product solvent. Some of these ester groups can afterward be hydrolyzed to obtain a partially-esterified product. These partially substituted cellulose esters have great commercial value, and find use in coatings, where their greater solubility and compatibility with co-resins (in comparison with triesters) and hydroxyl group content (to facilitate crosslinking) are prized.

An important aspect in obtaining suitable cellulose esters has traditionally been maintaining molecular weight during the esterification process. A loss in molecular weight is associated with poor plastic properties and brittle films, a flexible film being the desired goal. Thus, it has long been recognized that in order to obtain a suitable chloroform-soluble (triacetate) cellulose ester, the acetylation process must not result in significant degradation, or lowering of the molecular weight, of the cellulose. See, for example, U.S. Pat. No. 1,683,347.

When it was discovered that these early triacetate esters could be modified, via partial hydrolysis of the acetate groups, to obtain acetone-soluble cellulose acetate, maintaining a suitable molecular weight during hydrolysis remained important. See, for example, U.S. Pat. No. 1,652,573. It was recognized as early as the 1930's that the amount of hydrochloric acid present in the reaction mixture during partial ester hydrolysis must be carefully controlled to avoid hydrolysis or breakdown of the cellulose acetate. See, for example, U.S. Pat. No. 1,878,954.

Likewise, U.S. Pat. No. 2,129,052 advised that hydrolysis under severe conditions such as high temperature or high concentration of catalyst caused degradation of the cellulose, the resulting products being unsuitable for commercial use because of their low strength. U.S. Pat. No. 2,801,239, relating to the use of zinc chloride as an esterification catalyst, cited as an advantage that the process minimized the rate of breakdown of the cellulose. U.S. Pat. No. 3,518,249 acknowledged that little interest had been shown in cellulose esters of an extremely low degree of polymerization. More recently it was confirmed that the rate of hydrolysis in cellulose esters is controlled by temperature, catalyst concentration, and, to a lesser extent, by the amount of water, and that higher water content slightly increases the rate of hydrolysis and "helps minimize degradation." Kirk-Othmer, Encyclopedia of Chemical Technology, Fourth Ed., vol. 5, pp. 496-529, 509 (1993), John Wiley & Sons, New York, N.Y.

When used in coating compositions, conventional cellulose esters provide many benefits, including improved hardness, improved aluminum flake orientation, high clarity, high gloss, decreased dry-to-touch time, improved flow and leveling, improved redissolve resistance, reduced cratering, and reduced blocking. However, the performance properties of conventional cellulose esters are accompanied by an increase in viscosity, which must be offset by increasing the level of solvents used. With recent concerns of VOC levels in coating compositions, there remains a need for a cellulose ester product that provides the benefits of conventional cellulose esters, while providing only a moderate increase in viscosity without the addition of organic solvents. It would clearly be an advance in the art to provide cellulose esters that provide the performance properties of conventional cellulose esters, without an undue increase in viscosity when incorporated into coating compositions.

Although maintaining the molecular weight of cellulose esters during esterification and partial hydrolysis has long been deemed important in obtaining a suitable product, there has nonetheless been occasional mention in the literature of lower molecular weight cellulose esters.

For example, U.S. Pat. No. 3,386,932 discloses a method for reducing the molecular weight of cellulose triacetate with a catalyst such as boron trifluoride, the resulting bifunctional, low molecular weight cellulose triacetate then being used to produce linear block copolymers. This disclosure emphasizes the importance of maintaining the ester substitution at the 2-, 3-, and 6-positions of the triacetate, that is, wherein substantially all of the hydroxyl groups of the cellulose have been esterified, so that the hydroxyl functionality necessary for formation of the linear block copolymers preferentially appears only on the ends of the polymer chains.

U.S. Pat. No. 3,391,135 discloses a process in which hydrogen halides are used to reduce the molecular weight of cellulose derivatives. The examples describe methylcellulose powder and methyl-hydroxypropyl cellulose reacted with hydrogen chloride to reduce the molecular weight, as evidenced by a reduction in viscosity.

U.S. Pat. No. 3,518,249 describes oligosaccharide tripropionates, having an average degree of polymerization of from about 4 to about 20 and low levels of hydroxyl, that are useful as plasticizers and as control agents for the manufacture of foamed plastics. The oligosaccharide tripropionates are prepared by degrading a cellulose propionate in the presence of an acid catalyst. The patentees acknowledge that it has been an object in the art to provide methods of preventing the degradation of cellulose esters into low-viscosity oligosaccharide esters.

U.S. Pat. No. 4,532,177 describes base coat compositions that include a film-forming resin component, selected from alkyd, polyester, acrylic and polyurethane resins, from 1.0 to 15.0% by weight pigment, and from 2.0% to 50.0% by weight of a cellulose ester material. The '177 patent suggests a solution viscosity for the cellulose ester material from 0.05-0.005 seconds, an acetyl content from 10.0-15.0% by weight, a propionyl content from 0.1-0.8% by weight, a butyryl content from 36.0-40.0% by weight, and a free-hydroxyl content of from 1.0-2.0% by weight. However, the examples of the '177 patent use a cellulose ester having a solution viscosity of 0.01, which is approximately equivalent to an inherent viscosity (IV) for such an ester of from about 0.25 to about 0.30 dL/g, as measured in a 60/40 (wt./wt.) solution of phenol/tetrachloroethane (PM95) at 25° C. We have found that solution viscosities less than about 0.01 correlate poorly with IV values and GPC molecular weight values, although there is a strong correlation between IV and GPC molecular weights.

WO 91/16356 describes a process for the preparation of low molecular weight, high-hydroxyl cellulose esters by treating a cellulose polymer with trifluoroacetic acid, a mineral acid, and an acyl or aryl anhydride in an appropriate carboxylic solvent, followed by optional in situ hydrolysis. The cellulose esters obtained according to the disclosure are said to have a number average molecular weight ($M_n$) ranging from about $0.01 \times 10^5$ (about 1,000) to about $1.0 \times 10^5$ (about 100,000), and an IV (inherent viscosity) from about 0.2 to about 0.6, as measured at a temperature of 25° C. for a 0.25 gram sample in 100 ml of a 60/40 by weight solution of phenol/tetrachloroethane.

Japanese Kokai Patent Publication No. 51-119089 describes a process for the preparation of a low molecular weight cellulose mixed organic acid ester that involves heating cellulose acetate with a saturated or unsaturated organic acid of 3 or more carbon atoms (propionyl or higher), in the presence of an acid catalyst, with removal of the resulting acetic acid from the reaction mixture, to obtain a lower molecular weight cellulose mixed organic acid ester. The starting material for this process is cellulose acetate.

Another patent document naming the same inventors, Japanese Kokai Patent Publication No. 51-119088, discloses a method for the manufacture of a low molecular weight cellulose organic acid ester that includes heating cellulose acetate with a saturated or unsaturated organic acid at a temperature above 30° C. in the presence of a cation exchange resin, the resulting ester having a lower molecular weight than the starting material. The starting material for the disclosed process is cellulose acetate.

Both of these references teach low molecular weight mixed cellulose esters. The process uses cellulose acetate as starting material, and performs a transesterification while hydrolyzing the cellulose backbone, the amount of higher mixed ester introduced being relatively low.

U.S. Pat. No. 6,303,670 discloses an ultraviolet-curable cellulosic coating composition comprising a cellulose acetate, a diepoxy compound, and a photo cationic polymerization catalyst. The cellulose acetate useful in these compositions is a low molecular weight cellulose acetate, having a number-average molecular weight of from 1,500 to 5,000, and is prepared from cellulose triacetate by hydrolysis. According to this disclosure, the degree of substitution of hydroxyl groups must be from 1 to 3, since hydroxyl values of less than 1 are said to result in insufficient crosslinking in the final coating composition.

Although efforts have been made to prepare oligosaccharides via stepwise addition of anhydroglucose units, these methods are not believed to result in cellulose derivatives that are suitable for coating applications. Further, the costs of such processes would be significant. See, for example, Nishimura, T.; Nakatsubo, F. "Chemical Synthesis of Cellulose Derivatives by a Convergent Synthetic Method and Several of Their Properties," *Cellulose*, 1997, 4, 109. See also Kawada, T.; Nakatsubo, F.; Umezawa, T.; Murakami, K.; Sakuno, T. "Synthetic Studies of Cellulose XII: First Chemical Synthesis of Cellooctaose Acetate," *Mokuzai Gakkaishi* 1994, 40(7), 738.

The present applicants have unexpectedly discovered that relatively low molecular weight cellulose mixed esters, which were thought to lack the properties necessary to provide the performance characteristics of conventional molecular weight esters, can be incorporated into coating compositions, without an undue increase in viscosity, and without the high levels of solvent heretofore necessary in the preparation of high solids coatings containing cellulose esters. Also surprisingly, the properties of the resulting coatings, when the coating compositions are applied and cured, are comparable in most respects to those made using conventional molecular weight esters.

Various esters according to the invention exhibit improved solubilities in a variety of organic solvents, compatibility with various co-resins, and suitable melt stability after prolonged exposure to melt temperatures. Further advantages of the inventive esters are set forth in the following.

SUMMARY OF THE INVENTION

The cellulose mixed esters according to the present invention are low in molecular weight, have a high maximum degree of substitution (are highly substitutable), and provide high solids, low viscosity coating compositions, with none of the drawbacks typically associated with low molecular weight cellulose esters, such as formation of brittle films. When used as coating additives in combination with one or more resins, the inventive esters do not themselves unduly increase the viscosity of the compositions, providing the advantages of conventional cellulose esters without the drawbacks typically associated with their use, such as an undesirable increase in organic solvent levels to maintain the desired viscosity.

These new cellulose mixed esters have a high maximum degree of substitution (DS) per anhydroglucose unit on the cellulose backbone in the fully esterified or partially hydrolyzed form, and generally have a DS for hydroxyl groups of less than about 0.70 (<0.70 DS hydroxyl). The maximum degree of substitution per anhydroglucose unit for the cellulose esters of this invention is from about 3.08 to about 3.50. These new mixed esters are soluble in a wide range of organic solvents, allowing coatings formulators a wide latitude of solvent choice. They have a minimal impact on both the solution and spray viscosities of high solids coatings. These materials exhibit superior compatibility when blended with other coating resins, thereby yielding clear films with a wider range of coatings resins than do conventional cellulose esters.

DETAILED DESCRIPTION OF THE INVENTION

Figure 1:
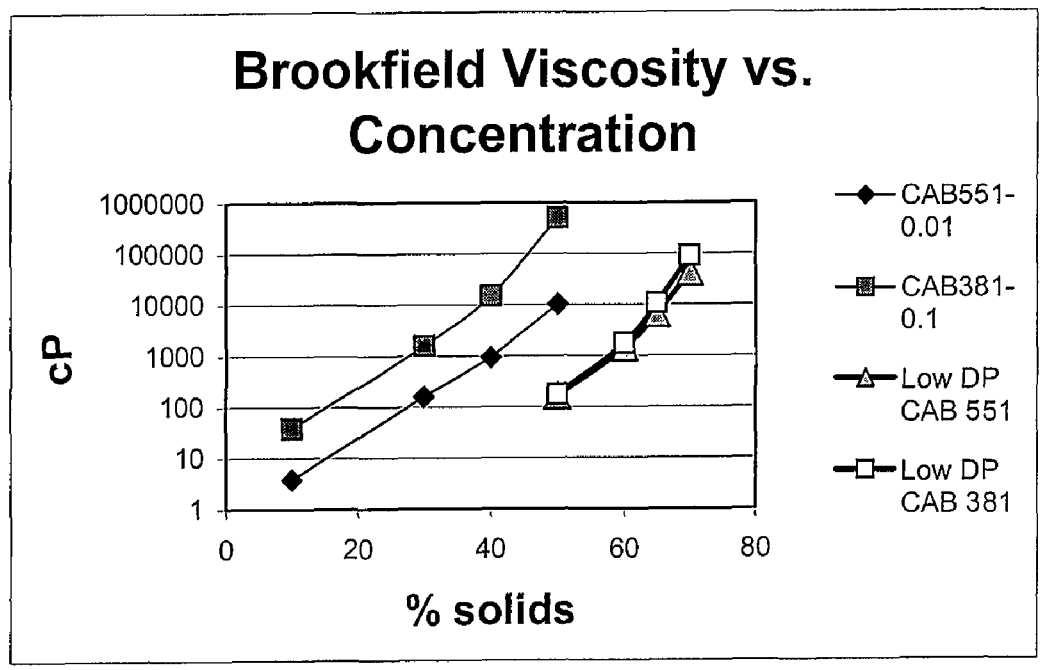
FIG. 1 is a graph plotting log viscosity as a function of concentration for solutions of cellulose esters according to the invention and conventional cellulose esters.

The present invention may be understood more readily by reference to the following detailed description of the invention, and to the Examples included therein.

Before the present compositions of matter and methods are disclosed and described, it is to be understood that this invention is not limited to specific synthetic methods or to particular formulations, unless otherwise indicated, and, as such, may vary from the disclosure. It is also to be understood that the terminology used is for the purpose of describing particular embodiments only, and is not intended to limit the scope of the invention.

The singular forms "a," "an," and "the" include plural referents, unless the context clearly dictates otherwise.

Optional or optionally means that the subsequently described event or circumstances may or may not occur. The description includes instances where the event or circumstance occurs, and instances where it does not occur.

Ranges may be expressed herein as from about one particular value, and/or to about another particular value. When such a range is expressed, it is to be understood that another embodiment is from the one particular value and/or to the other particular value.

Throughout this application, where patents or publications are referenced, the disclosures of these references in their entireties are intended to be incorporated by reference into this application, in order to more fully describe the state of the art to which the invention pertains.

As used throughout the disclosure, CAB means a cellulose acetate butyrate; CAP means a cellulose acetate propionate; CA means a cellulose acetate; CMCAB means a carboxymethylcellulose acetate butyrate; CMCAP means a carboxymethylcellulose acetate propionate; CMCA means a carboxymethylcellulose acetate; and HS-CAB means an inventive high solids cellulose acetate butyrate according to the invention, having a high maximum degree of substitution, a low degree of polymerization, a low intrinsic viscosity (IV), and a low molecular weight.

Unless indicated otherwise, HS-CAB-55 refers to an inventive high solids cellulose acetate butyrate with a high maximum degree of substitution, a low degree of polymerization, a low IV, a low molecular weight, and a high butyryl content (high-butyryl, or from about 52 to about 55 wt. %), prepared along the lines of Example 3, unless noted otherwise; HS-CAB-46 refers to an inventive high solids cellulose acetate butyrate with a high maximum degree of substitution, a low degree of polymerization, a low IV, a low molecular weight, and a medium to high butyryl content (high mid-butyryl, or from about 43 to about 51 wt. %), prepared along the lines of Examples 21-22 unless noted otherwise; HS-CAB-38 refers to an inventive high solids cellulose acetate butyrate with a high maximum degree of substitution, a low degree of polymerization, a low IV, a low molecular weight, and a medium butyryl content (mid-butyryl, or from about 35 to about 42 wt. %), prepared along the lines of Example 1, unless noted otherwise; HS-CAB-36 refers to an inventive high solids cellulose acetate butyrate with a high maximum degree of substitution, a low degree of polymerization, a low IV, a low molecular weight, and a low medium butyryl content (low mid-butyryl, or from about 30 to about 38 wt. %), prepared along the lines of Example 2, unless noted otherwise; HS-CAB-17 refers to an inventive cellulose acetate butyrate with a high maximum degree of substitution, a low degree of polymerization, a low IV, a low molecular weight, and a low butyryl content (low-butyryl, or from about 17 to about 24), prepared along the lines of Examples 9-13, unless noted otherwise; HS-CAB-20 likewise refers to an inventive cellulose acetate butyrate with a high maximum degree of substitution, a low degree of polymerization, a low IV, a low molecular weight, and a low butyryl content (low-butyryl, or from about 17 to about 24), prepared along the lines of Examples 9-13, unless noted otherwise, and considered equivalent to an HS-CAB-17, as used throughout this application; HS-CAP means an inventive high solids, cellulose acetate propionate with a high maximum degree of substitution, a low degree of polymerization, a low IV, and a low molecular weight; and HS-CAP-54 means an inventive high solids, cellulose acetate propionate with a high maximum degree of substitution, a low degree of polymerization, a low IV, and a low molecular weight, and a high propionyl content (high-propionyl, or from about 49 to about 56 wt. %), prepared along the lines of Example 52, unless noted otherwise.

In one embodiment, the invention relates to cellulose mixed esters having a total degree of substitution per anhydroglucose unit of from about 3.08 to about 3.50, and having the following substitutions: a degree of substitution per anhydroglucose unit of hydroxyl of no more than about 0.70; a degree of substitution per anhydroglucose unit of $C_3$-$C_4$ esters from about 0.80 to about 1.40, and a degree of substitution per anhydroglucose unit of acetyl of from about 1.20 to about 2.34. According to this embodiment, the inventive mixed esters exhibit an inherent viscosity from about 0.05 to about 0.15 dL/g, as measured in a 60/40 (wt./wt.) solution of phenol/tetrachloroethane at 25° C.; a number average molecular weight ($M_n$) of from about 1,000 to about 5,600; a weight average molecular weight ($M_w$) of from about 1,500 to about 10,000; and a polydispersity of from about 1.2 to about 3.5. In various embodiments, the ester may comprise butyryl, or propionyl, or mixtures of the two.

In various alternative aspects, the degree of substitution per anhydroglucose unit of hydroxyl may be from about 0.05 to about 0.70; the inherent viscosity may be from about 0.05 to about 0.12 dL/g, as measured in a 60/40 (wt./wt.) solution of phenol/tetrachloroethane at 25° C.; or the number average molecular weight ($M_n$) may be from about 1,500 to about 5,000. In certain embodiments, a preferred polydispersity may be from 1.2 to 2.5; a preferred inherent viscosity from 0.07 to 0.11 dL/g; or a preferred number average molecular weight ($M_n$) from about 1,000 to about 4,000. In certain other embodiments, a preferred inherent viscosity may be from about 0.07 to about 0.11 dL/g; or a preferred number average molecular weight ($M_n$) from about 1,000 to 4,000.

In a further embodiment, the invention relates to cellulose mixed esters having a total degree of substitution per anhydroglucose unit of from about 3.08 to about 3.50, and having the following substitutions: a degree of substitution per anhydroglucose unit of hydroxyl of no more than about 0.70; a degree of substitution per anhydroglucose unit of $C_3$-$C_4$ esters from about 1.40 to about 2.45, and a degree of substitution per anhydroglucose unit of acetyl of from 0.20 to about 0.80. According to this embodiment, the inventive mixed esters exhibit an inherent viscosity of from about 0.05 to about 0.15 dL/g, as measured in a 60/40 (wt./wt.) solution of phenol/tetrachloroethane at 25° C.; a number average molecular weight ($M_n$) of from about 1,000 to about 5,600; a weight average molecular weight ($M_w$) of from about 1,500 to about 10,000; and a polydispersity of from about 1.2 to about 3.5. In various embodiments, the ester may comprise butyryl, or propionyl, or mixtures of the two.

In various alternative embodiments, the degree of substitution per anhydroglucose unit of hydroxyl may be from about 0.05 to about 0.70; the inherent viscosity may be from about 0.05 to about 0.12 dL/g, as measured in a 60/40 (wt./wt.) solution of phenol/tetrachloroethane at 25° C.; or the number average molecular weight ($M_n$) may be from about 1,500 to about 5,000. In certain embodiments, a preferred polydispersity may be from 1.2 to 2.5; a preferred inherent viscosity from 0.07 to 0.11 dL/g; or a preferred number average molecular weight ($M_n$) from about 1,000 to about 4,000. In certain other embodiments, a preferred inherent viscosity may be from about 0.07 to about 0.11 dL/g; and a preferred number average molecular weight ($M_n$) from about 1,000 to 4,000.

In yet another embodiment, the invention relates to cellulose mixed esters having a total degree of substitution per anhydroglucose unit of from about 3.08 to about 3.50, and having the following substitutions: a degree of substitution per anhydroglucose unit of hydroxyl of no more than about 0.70; a degree of substitution per anhydroglucose unit of $C_3$-$C_4$ esters from about 2.11 to about 2.91, and a degree of substitution per anhydroglucose unit of acetyl of from 0.10 to about 0.50. According to this embodiment, the inventive mixed esters may exhibit an inherent viscosity of from about 0.05 to about 0.15 dL/g, as measured in a 60/40 (wt./wt.) solution of phenol/tetrachloroethane at 25° C.; a number average molecular weight ($M_n$) of from about 1,000 to about 5,600; a weight average molecular weight ($M_w$) of from about 1,500 to about 10,000; and a polydispersity of from about 1.2 to about 3.5. In various embodiments, the ester may comprise butyryl, or propionyl, or mixtures of the two.

In various alternative embodiments, the degree of substitution per anhydroglucose unit of hydroxyl may be from about 0.05 to about 0.70; the inherent viscosity may be from about 0.05 to about 0.12 dL/g, as measured in a 60/40 (wt./wt.) solution of phenol/tetrachloroethane at 25° C.; or the number average molecular weight ($M_n$) may be from about 1,500 to about 5,000. In certain embodiments, a preferred polydispersity may be from 1.2 to 2.5; a preferred inherent viscosity from 0.07 to 0.11 dL/g; and a preferred number average molecular weight ($M_n$) from about 1,000 to about 4,000. In certain other embodiments, a preferred inherent viscosity may be from about 0.07 to about 0.11 dL/g; and a preferred number average molecular weight ($M_n$) from about 1,000 to 4,000.

The present invention thus provides certain mixed esters of cellulose, which are useful, for example, as binder components and additives in coatings compositions. The inventive esters may have an inherent viscosity of from about 0.05 to about 0.15 dL/g, or from about 0.07 to about 0.11 dL/g, as measured in a 60/40 (wt./wt.) solution of phenol/tetrachloroethane at 25° C. (as further defined below), and a maximum degree of substitution per anhydroglucose unit from about 3.08 to about 3.50, and a degree of substitution per anhydroglucose unit of organic esters, for example those having from 1 to 12 carbon atoms, preferably $C_2$-$C_4$ alkyl esters, and more preferably saturated $C_2$-$C_4$ alkyl esters, of about 2.38 to about 3.50. As is described below, these resins are especially useful in coating and ink formulations. They are soluble in a wide range of solvents and solvent blends, as demonstrated in the examples of this application, making them particularly suited for custom coating formulations. The cellulose esters may be alkyl cellulose esters, such as methylcellulose, or hydroxyalkyl cellulose esters, such as methyl-hydroxypropyl cellulose esters. However, in some embodiments, the cellulose esters are esters that are not otherwise modified, i.e. the cellulose is modified only by the addition of organic ester functionality, not ether functionality or carboxyl functionality obtained via oxidation chemistry. Certain particular novel esters are preferred and further provided as additional embodiments of this invention.

In yet another embodiment, there is provided a cellulose mixed ester, having a maximum degree of substitution of from about 3.08 to about 3.50, a degree of substitution per anhydroglucose unit of hydroxyl from about 0.01 up to about 0.70, a degree of substitution per anhydroglucose unit of $C_3$-$C_4$ esters of about 0.8 to about 3.50, a degree of substitution per anhydroglucose unit of acetyl from about 0.05 to about 2.00, and having an inherent viscosity of about 0.05 to about 0.15 dL/g, as measured in a 60/40 (wt./wt.) solution of phenol/tetrachloroethane at 25° C. In various alternative embodiments, the inherent viscosity may be from about 0.07 to about 0.11 dL/g, the degree of substitution per anhydroglucose unit of hydroxyl from 0.10 to 0.70, the degree of substitution per anhydroglucose unit of $C_3$-$C_4$ esters from 1.10 to 3.25, or the degree of substitution per anhydroglucose unit of acetyl from 0.05 to 0.90. Various esters according to this embodiment exhibit solubility in a wide range of solvents and solvent blends.

In another embodiment, there is provided a cellulose mixed ester, having a maximum degree of substitution of from about 3.08 to about 3.50, a degree of substitution per anhydroglucose unit of hydroxyl from about 0.01 up to about 0.70, a degree of substitution per anhydroglucose unit of $C_3$-$C_4$ esters of about 0.8 to about 3.50, a degree of substitution per anhydroglucose unit of acetyl from about 0.05 to about 2.00, and having an inherent viscosity of about 0.05 to about 0.15 dL/g, as measured in a 60/40 (wt./wt.) solution of phenol/tetrachloroethane at 25° C. In various alternative embodiments, the inherent viscosity may be from about 0.07 to about 0.11 dL/g, the degree of substitution per anhydroglucose unit of hydroxyl about 0, the degree of substitution per anhydroglucose unit of $C_3$-$C_4$ esters from 2.60 to 3.40, or the degree of substitution per anhydroglucose unit of acetyl from 0.10 to 0.90. Various esters according to these embodiments exhibit solubility in a wide range of solvents and solvent blends.

In another embodiment of the present invention, there is provided a cellulose acetate butyrate having a maximum degree of substitution of from about 3.08 to about 3.50, and a degree of substitution per anhydroglucose unit of hydroxyl from about 0.01 to about 0.70, and a degree of substitution per anhydroglucose unit of butyryl of about 0.80 to about 3.44, and a degree of substitution per anhydroglucose unit of acetyl of about 0.05 to about 2.00, and having an inherent viscosity of 0.05 to 0.15 dL/g, as measured in a 60/40 (wt./wt.) solution of phenol/tetrachloroethane at 25° C. In various alternative embodiments, the inherent viscosity may be from 0.07 to 0.11 dL/g, the degree of substitution per anhydroglucose unit of hydroxyl from 0.10 to 0.70, butyryl from 1.10 to 3.25, or acetyl from 0.10 to 0.90. Various esters according to this embodiment exhibit solubility in a wide range of solvents and solvent blends.

As a further embodiment, there is provided a cellulose acetate propionate having a degree of substitution per anhydroglucose unit of hydroxyl from about 0.01 to about 0.70, and a degree of substitution per anhydroglucose unit of propionyl of about 0.80 to about 3.44 and a degree of substitution per anhydroglucose unit of acetyl of from about 0.05 to about 2.00, and having an inherent viscosity of about 0.05 to about 0.15 dL/g, as measured in a 60/40 (wt./wt.) solution of phenol/tetrachloroethane at 25° C. In various alternative embodiments, the inherent viscosity may be from 0.07 to 0.11 dL/g, the degree of substitution per anhydroglucose unit of hydroxyl from 0.10 to 0.70, the degree of substitution per anhydroglucose unit of propionyl from 1.10 to 3.25, or the degree of substitution per anhydroglucose unit of acetyl of from 0.10 to 0.90. Various esters according to this embodiment exhibit solubility in a wide range of solvents and solvent blends.

Different grades and sources of cellulose are available and are useful according to the invention, and can be selected from cotton linters, softwood pulp, hardwood pulp, corn fiber and other agricultural sources, and bacterial cellulose, among others. The source of cellulose used to prepare the cellulose esters of the invention is important in providing a product having suitable properties. It is generally preferred that a dissolving-grade cellulose be used as starting material for preparing the cellulose esters of this invention. It is more preferred that the dissolving-grade cellulose have an α-cellulose content of greater than 94%. Those skilled in the art will also recognize that the use of cellulose from different sources may require modifications to the reaction conditions (e.g. temperature, catalyst loading, time) in order to account for any differences in the reactivity of the cellulose.

In certain embodiments, it is preferred that the source of cellulose be a natural cellulose as just described, and that the source of cellulose not be a modified cellulose such as a cellulose ether, e.g. an alkyl cellulose. Similarly, in certain embodiments, it is preferred that the cellulose starting material not be a carboxyalkylcellulose, such as carboxymethylcellulose, or any cellulose derivative having acid functionality. These cellulose derivatives are more expensive than the naturally-derived cellulose just described, and in many cases result in esters that are less suitable than the inventive esters in coating formulations, especially those containing appreciable amounts of organic solvents. It also follows that certain of the inventive esters according to the invention have an acid value no greater than about 5, or no greater than about 1. Suitable cellulose esters containing carboxyl functionality are being separately pursued in a copending application filed herewith.

The cellulose esters of the invention may be prepared by a multi-step process. In this process, cellulose is water-activated, followed by water displacement via solvent exchange with an alkanoic acid such as acetic acid, followed by treatment with a higher alkanoic acid (propionic acid or butyric acid) to give a cellulose activate wet with the appropriate alkanoic acid. Next, the cellulose activate is treated with the desired anhydride, in the presence of a strong acid catalyst such as sulfuric acid, to give essentially a fully-substituted cellulose ester having a lower molecular weight than conventional esters. A solution consisting of water and an alkanoic acid is added slowly to the anhydrous "dope" solution so as to allow removal of combined sulfur from the cellulose backbone. The final addition allows a slow transition through the hydrous point to give a period of low water concentration and high temperature (as a result of the exotherm from water reacting with excess anhydride) in the reaction medium. This is important for hydrolysis of combined sulfur from the cellulose backbone. This product is then hydrolyzed using sulfuric acid to provide a partially substituted cellulose ester. Hydrolysis is important to provide gel-free solutions in organic solvents, and to provide better compatibility with other resins in coatings applications. The hydroxyl groups exposed during hydrolysis are also important crosslinking sites in many coatings applications.

Next, the sulfuric acid is neutralized after the esterification or hydrolysis reactions are complete by addition of a stoichiometric amount of an alkali or alkaline earth metal alkanoate, for example, magnesium acetate, dissolved in water and an alkanoic acid such as acetic acid. Neutralization of the strong acid catalyst is important for optimal thermal and hydrolytic stability of the final product.

Finally, either the fully substituted or partially hydrolyzed forms of cellulose ester are isolated by diluting the final neutralized "dope" with an equal volume of acetic acid followed by precipitation of the diluted "dope" into a volume of water about 20 to 30 times its weight, to give a particle that can be easily washed with deionized water to efficiently remove residual organic acids and inorganic salts. In many cases, a fairly sticky precipitate is initially formed. The precipitate can be hardened by exchanging the precipitation liquid for fresh water and allowing the precipitate to stand. The hardened precipitate can then be easily washed and ground up as necessary.

The key descriptors of the composition of a cellulose ester are the level of substitution of the various ester groups (i.e. degree of substitution or wt. % are commonly used and are discussed in detail in other parts of this application), the level of hydroxyl groups, and the size of the polymer backbone, which can be inferred from IV, viscosity, and GPC data. The key factors that influence the resulting composition of the inventive cellulose mixed esters thus produced are: acetic anhydride level, acetic acid level, butyric (or propionic) anhydride level, butyric (or propionic) acid level, water level, cellulose level, catalyst type, catalyst level, time, and temperature. One skilled in the art will appreciate that higher catalyst loadings, higher temperatures, and/or longer reaction times during esterification are used to produce the inventive cellulose esters, having lower molecular weights than conventional esters.

Thus, as a further aspect of the invention, the cellulose esters of the invention may be prepared by a multi-step process. In the process according to the invention, cellulose is water-activated, followed by water displacement via solvent exchange with an alkanoic acid such as acetic acid, followed by solvent exchange with a higher alkanoic acid (e.g. propionic acid or butyric acid) to give a cellulose-activate wet with the appropriate alkanoic acid (e.g. propionic or butyric acid). In this regard, we have found that it is important that the starting cellulose has a 94 to 99% alpha content, preferably about 95 to 98% alpha cellulose content. The high alpha content is important for the quality of the final products prepared therefrom. We have found that low alpha cellulose pulps lead to poor solubility in organic solvents and consequently to poor formulations.

Next, the activated cellulose is reacted with the desired anhydride in the presence of a strong acid catalyst such as sulfuric acid to give a fully substituted cellulose ester with a lower molecular weight than conventional esters. A solution containing water and an alkanoic acid or mixture of alkanoic acids is added slowly to the anhydrous "dope" solution so as to allow removal of combined sulfur from the cellulose backbone. The final addition allows a slow transition through the hydrous point to give a period of low water concentration and high temperature (as a result of the exotherm from water reacting with excess anhydride) in the reaction medium. This is important for hydrolysis of combined sulfur from the cellulose backbone. This product is then hydrolyzed using sulfuric acid to provide a partially-substituted cellulose ester. Hydrolysis is important to provide gel-free solutions in organic solvents, and to provide better compatibility with other resins in coatings applications.

Next, the sulfuric acid is neutralized after the esterification or hydrolysis reactions are complete by addition of a stoichiometric amount of an alkali or alkaline earth metal alkanoate, for example magnesium acetate, dissolved in water and an alkanoic acid such as acetic acid. Neutralization of the strong acid catalyst is important for optimal thermal and hydrolytic stability of the final product.

Finally, either the fully substituted or partially hydrolyzed forms of cellulose ester are isolated by diluting the final neutralized "dope" with an equal volume of acetic acid followed by precipitation of the diluted "dope" into a volume of water about 20 to 30 times its weight, to give a particle that can be easily washed with deionized water to efficiently remove residual organic acids and inorganic salts. In many cases, a fairly sticky precipitate is initially formed. The precipitate can be hardened by exchanging the precipitation liquid for fresh water and allowing the precipitate to stand. The hardened precipitate can then be easily washed and ground up as necessary.

In light of the present disclosure, those skilled in the art will readily appreciate that, of the process parameters just described, higher catalyst loadings, higher temperatures, and/or longer reaction times during esterification will be used to obtain the inventive cellulose esters having lower molecular weights than conventional cellulose esters, as further evidenced in the examples of this disclosure.

The cellulose esters according to the invention have a weight average molecular weight, $M_w$, as measured by GPC, of from about 1,500 to about 10,000; or from about 2,000 to about 8,500; a number average molecular weight, $M_n$, as measured by GPC, of from about 1,500 to about 6,000; and a polydispersity, defined as $M_w/M_n$, from about 1.2 to about 7, or from about 1.2 to about 3.5, or from about 1.2 to about 2.5.

The cellulose mixed esters according to the invention, sometimes described herein as HS-CAB's, exhibit compatibility with a wide variety of co-resins, compatibility being defined as the ability of two or more resins, when mixed together, to form a stable homogeneous mixture useful as a coating composition. For example, an HS-CAB with approximately 38 wt. % butyryl (sometimes described herein as an HS-CAB-38) exhibits compatibilities with Eastman's Acrylamac 2328, Akzo Nobel's Microgel, Eastman's Duramac 2314, Bayer's Desmodur 3300, Rhodia's XIDT, and Bayer's Desmodur IL, equal to or better than commercial higher-butyryl-content samples such as CAB-551-0.01 (cellulose acetate butyrate containing approximately 55 wt. % butyryl, available from Eastman Chemical Company). In some instances, inventive cellulose mixed esters having approximately 38 wt. % butyryl, or approximately 55 wt. % butyryl, are compatible at a 1:1 ester to resin loading with acrylic resins that are not compatible with many conventional molecular weight cellulose esters. Such dramatic shifts in compatibility allow formulators to use a mid-butyryl ester (about 38 wt. %) in applications that might otherwise require a higher butyryl CAB for compatibility purposes.

An advantage to being able to use a mid-butyryl ester instead of a high-butyryl ester is that when all properties aside from butyryl level and acetyl level remain constant, i.e. hydroxyl value and molecular weight, the mid-butyryl CAB has a higher $T_g$ than its high-butyryl counterpart. Another advantage to using a mid-butyryl ester over a high-butyryl ester is that mid-butyryl commercial esters are often less soluble in particular solvents and solvent blends than their high-butyryl counterparts. This same trend is generally observed when comparing mid-butyryl HS-CAB's with high-butyryl HS-CAB's of equivalent molecular weight and hydroxyl content. Without being bound by theory, we believe that the observed solubility differences between mid-butyryl and high-butyryl esters is responsible in part for the improved redissolve resistance seen with certain of the inventive esters when a topcoat is applied to a basecoat. We believe that the combination of improved compatibility along with improved, but also differentiated, solubility will be a valuable asset to coatings formulation chemists.

Thus, conventional cellulose esters with a higher butyryl content tend to be more soluble and have a lower $T_g$ than their counterparts having lower butyryl levels. One result of increased solubility is that the redissolve resistance of the resulting coating is negatively affected. One of the key advantages of a conventional high butyryl cellulose ester such as CAB-551-0.01 is its increased compatibility with many co-resins when compared with a mid-butyryl ester such as CAB-381-0.1. Surprising, we have found that inventive mid-butyryl esters (HS-CAB-38) according to the invention have better compatibility with co-resins than a conventional molecular weight high butyryl cellulose ester such as a CAB-551-0.01, while exhibiting a similar solubility.

As a result, coatings formulators can use the inventive esters of the invention in basecoat formulations that cannot tolerate the viscosity increase imparted by the addition of conventional CAB's, while providing the redissolve resistance typical of conventional esters having a higher butyryl content.

As mentioned, the inventive mixed esters likewise demonstrate better-than-expected redissolve resistance in certain systems. This is surprising, since the inventive mixed esters have a molecular weight lower than conventional cellulose mixed esters. One would instead expect to see a decrease in redissolve resistance with a lowering in molecular weight. As a result, coatings formulators can use the inventive esters of the invention in basecoat formulations that cannot tolerate the viscosity increase imparted by the addition of conventional CAB's, while providing the necessary redissolve resistance.

As is also evident from the examples, cellulose esters according to the invention have excellent melt stability after prolonged exposure to melt temperatures. When HS-CABs according to the invention were used in preparing pigment grinds on a two-roll mill, no discoloring was observed due to decomposition even after prolonged exposure (at least 30 minutes) to melt temperatures of about 100° C. to about 120° C. Melt stability is an important property for cellulose esters used in plastic applications, since yellowing, a common result of poor melt stability, is often a detrimental characteristic of cellulosics used in plastics applications.

Further, the inventive esters exhibit a better-defined melting point, as further described herein, making them especially suitable for uses where a well-defined melting point is necessary. Not being bound by theory, we attribute this to a lower polydispersity value than conventional esters.

Traditionally, cellulose esters are considered to have a maximum degree of substitution of 3.0. A DS of 3.0 indicates that there are 3.0 reactive hydroxyl groups in cellulose that can be derivatized. Native cellulose is a large polysaccharide with a degree of polymerization from 700-2,000, and thus the assumption that the maximum DS is 3.0 is approximately correct. However, as the degree of polymerization is lowered, the end groups of the polysaccharide backbone become relatively more important. In the esters according to the invention, this change in maximum DS influences the performance of the esters, by changing the solubility in certain solvents and the compatibility with certain coatings resins.

Table 1 gives the $DS_{Max}$ at various degrees of polymerization. Mathematically, a degree of polymerization of 401 is required in order to have a maximum DS of 3.00. As the table indicates, the increase in $DS_{Max}$ that occurs with a decrease in DP is slow, and for the most part, assuming a maximum DS of 3.00 is acceptable. However, once the DP is low enough, for example a DP of 21, then it becomes appropriate to use a different maximum DS for all calculations.

TABLE 1

Effect of DSMax on DP

| DP | $DS_{Max}$ |
|---|---|
| 1 | 5.00 |
| 2 | 4.00 |
| 3 | 3.67 |
| 4 | 3.50 |
| 5 | 3.40 |
| 6 | 3.33 |
| 7 | 3.29 |
| 8 | 3.25 |

TABLE 1-continued

Effect of DSMax on DP

| DP | $DS_{Max}$ |
| --- | --- |
| 9 | 3.22 |
| 10 | 3.20 |
| 11 | 3.18 |
| 12 | 3.17 |
| 13 | 3.15 |
| 14 | 3.14 |
| 15 | 3.13 |
| 16 | 3.13 |
| 17 | 3.12 |
| 18 | 3.11 |
| 19 | 3.11 |
| 20 | 3.10 |
| 21 | 3.10 |
| 22 | 3.09 |
| 23 | 3.09 |
| 24 | 3.08 |
| 25 | 3.08 |
| 50 | 3.04 |
| 75 | 3.03 |
| 100 | 3.02 |
| 134 | 3.01 |
| 401 | 3.00 |

The present invention thus provides a cellulose ester with a high maximum degree of substitution and a low degree of polymerization.

As already described, the inventive esters of the present application, having a high maximum degree of substitution and a low degree of polymerization, unexpectedly exhibit rheological performance similar to conventional cellulose esters having a much higher degree of polymerization. It is quite surprising that an HS-CAB with such a low degree of polymerization would display such rheological performance.

Without being bound by any theory, we believe that the cellulose esters according to the invention exhibit a fairly random substitution pattern of hydroxyl groups. We believe that this random substitution pattern of hydroxyl groups is achieved by performing the molecular weight reduction step prior to hydrolysis of the ester groups. The low molecular weight cellulose ester products of the prior art processes generally exhibit a non-random substitution pattern, particularly at C-4 of the non-reducing terminus and at C-1 (RT1) of the reducing terminus. The products of the prior art generally have a hydroxyl group at C-4 and either a hydroxyl or ester at C-1 (RT-1) depending on whether the process is a hydrolysis or an acetolysis reaction.

The widely accepted mechanism presented in Scheme 1 may help the reader to visualize the explanation above. The proposed mechanism presented in Scheme 1 depicts the reaction of a polysaccharide with a high degree of polymerization, the nature of the groups at C4 and RT1 being influenced by the amount of cleavage that occurs. The substitution at the two carbons of interest, C4 and RT1, increases to large levels as more and more glycosidic bonds are cleaved. Scheme 1 shows only a single glycosidic bond being cleaved and thus only one C4 and one RT1 site have the substitution pattern displayed by products generated by the prior art. As more and more sites are cleaved, the effect of the substitution pattern at C4 and RT1 becomes more important.

Processes used to prepare the products of the present invention result in a fully-esterified cellulose ester having approximately the desired degree of polymerization while the reaction mixture is still anhydrous (i.e. before hydrolysis). As a result, the hydrolysis of esters during the preparation of the products of this invention is believed to produce essentially a random distribution of hydroxyl groups throughout the entire cellulosic backbone. This belief is based, in part, on the unique solubility profiles exhibited by the esters according to the invention. Those skilled in the art will recognize that under kinetically controlled conditions, hydrolysis will occur preferentially at certain sites (e.g. C6>>C2>C3). The hydrolysis process practiced in this invention is performed under thermodynamic control (i.e. under equilibrium conditions), which is believed to result in a more random distribution of hydroxyl functionality throughout the cellulosic backbone.

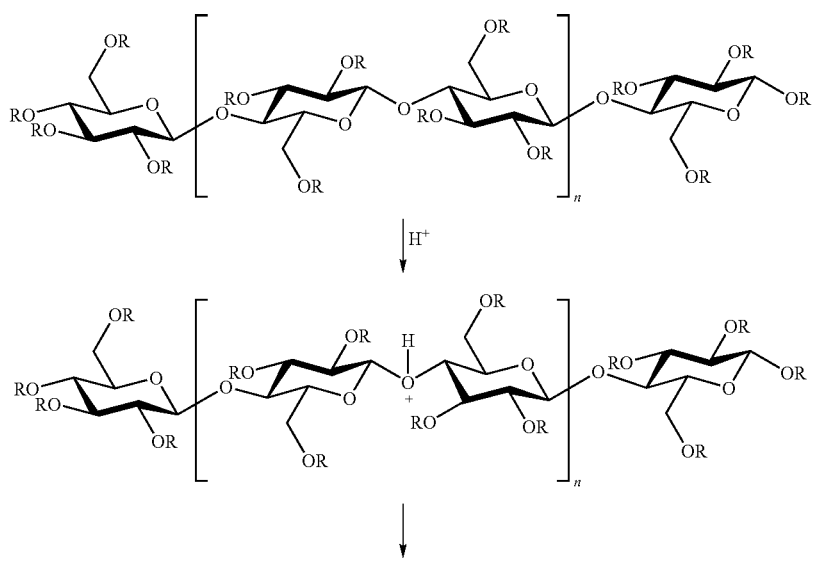

Scheme 1. Proposed mechanism for the hydrolysis and acetolysis of glycosidic bonds.

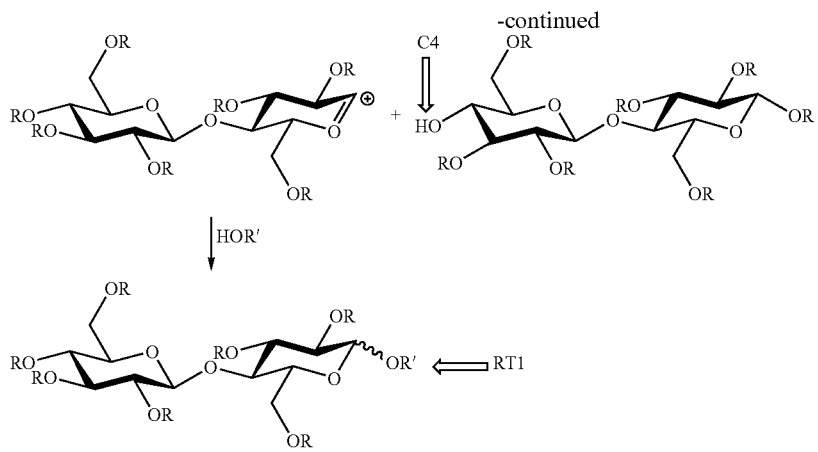

<sup>13</sup>C-NMR studies suggest that the inventive esters (HS-CAB's) have a different substitution pattern than those made by processes in which molecular weight is reduced during hydrolysis. The chemical structure below highlights the areas where differences in the substitution patterns are believed to occur.

nol/tetrachloroethane at 25° C., and a degree of substitution per anhydroglucose unit of $C_2$-$C_4$ esters of about 0.8 to about 3.5.

The esters of the invention are easily formulated into either lacquer or enamel type coatings where they are used as rheology modifiers and/or binder components providing

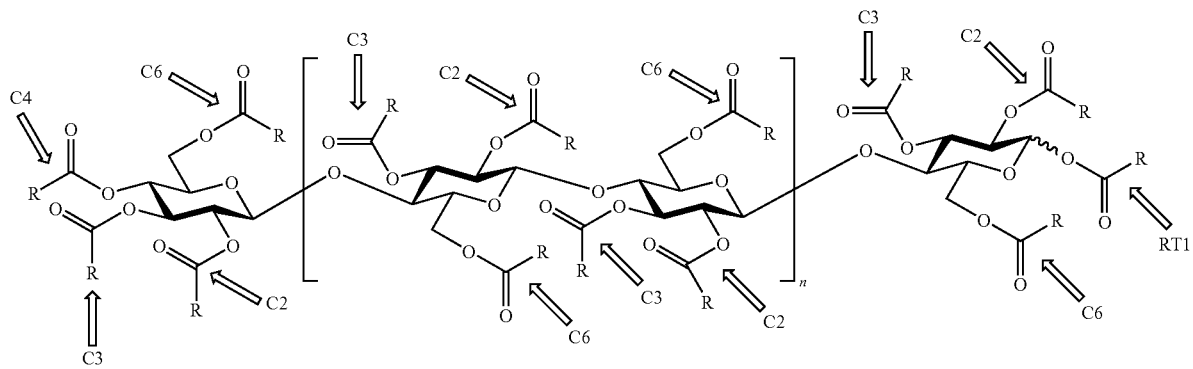

Cellulose mixed esters of the invention have utility in pigment dispersions by blending the cellulose ester and a pigment with heat and/or shear to disperse the pigment. In this manner, pigments can be easily dispersed in coating formulations and plastics, thereby providing high coloring power and good transparency while using a minimal amount of pigment. Such pigment dispersions can be improved by the use of the cellulose esters of the present invention in place of conventional cellulose esters. As with conventional cellulose esters, the cellulose mixed esters of the present invention impart markedly improved wetting properties to the pigment dispersion. Mixtures of $C_2$-$C_4$ esters of cellulose and pigments at pigment: ester weight ratios of about 20:80 to 50:50 may be prepared. These dispersions can be prepared on a two-roll mill or in a ball mill, Kady mill, sand mill, or the like. The high $DS_{Max}$, low DP cellulose esters of this invention have an advantage over conventional cellulose esters in that they have less of an impact on the viscosity, and thus allow formulations with a higher binder (resin) loading to be used.

Thus, the present invention provides a pigment dispersion comprising about 20 to 77 weight percent of a pigment and correspondingly about 33 to 80 percent by weight of a $C_2$-$C_4$ ester of cellulose having an inherent viscosity of about 0.05 to 0.15 dL/g, as measured in a 60/40 (wt./wt.) solution of pheimproved aluminum flake orientation and improved hardness. They can provide a water-clear, high gloss, protective coating for a variety of substrates, especially metal and wood.

An additional advantage, when used for example to prepare pigments for use in plastics or coatings, relates to an increase in melt stability exhibited by the esters of the invention. The inventive HS-CABs have a sharper melting range than commercial CAB's, possibly due to the tighter polydispersity of HS-CAB's versus conventional CAB's. HS-CAB's can be blended with a pigment to produce a pigment dispersion. The pigment dispersions can be prepared by a number of routes including a slurry method and by extrusion. The improved melt stability is advantageous in extruder applications, since yellowing of the cellulosic is reduced or eliminated.

Cellulose esters of this invention, especially high $DS_{Max}$, low DP cellulose acetate butyrate and high $DS_{Max}$, low DP cellulose acetate propionate, as described above, exhibit improved solubility and compatibility (i.e., film clarity) characteristics over many conventional cellulose esters (cellulose acetate, cellulose propionate, cellulose butyrate, cellulose acetate propionate, or cellulose acetate butyrate).

For example, conventional mid-butyryl cellulose esters such as CAB-381-0.1 (available from Eastman Chemical Company, Kingsport, Tenn.), as evidenced for example in Comparative Example 31 and Example 49, are not readily soluble in Eastman C-11 ketone (a mixture of saturated and unsaturated, linear and cyclic ketones), Eastman DIBK (diisobutyl ketone), PP (propylene glycol monopropyl ether), Eastman EP solvent (ethylene glycol monopropyl ether), Eastman EB solvent (ethylene glycol monobutyl ether), methanol, Tecsol C solvent, 95% (ethanol with methanol, methyl isobutyl ketone, and ethyl acetate as denaturants with 5% water), toluene, or a 90/10 isopropyl alcohol/water blend. In contrast, certain inventive esters such as certain of the HS-CAB-38s (as exemplified in Example 28 and Example 49) of the invention are soluble in each of the solvents or solvent systems described above. By the term "soluble," as used throughout the specification, we mean that a clear solution is obtained when a 10% (wt/wt) mixture of the cellulose ester in the desired solvent is prepared, unless stated otherwise.

As another example, conventional high-butyryl cellulose esters such as CAB-551-0.01 (available from Eastman Chemical Company), as evidenced in Comparative Example 32 and Example 49, are not readily soluble in methanol, Tecsol C solvent, 95%, toluene (the ester gels), or a 90/10 isopropyl alcohol/water blend. In contrast, certain inventive esters, such as certain of the high-butyryl cellulose esters (HS-CAB-55's), as evidenced in Example 29 and some of the inventive esters of Example 49, are soluble in each of the solvents or solvent systems described above.

Similarly, conventional low-butyryl cellulose esters such as CAB-171-15S (available from Eastman Chemical Company), as evidenced in Comparative Example 33, are not readily soluble in Eastman PM solvent (propylene glycol monomethyl ether), and only partially soluble in Eastman PM acetate (propylene glycol methyl acetate) and Eastman DM solvent (diethylene glycol methyl ether). In contrast, certain inventive esters, such as certain of the low-butyryl cellulose esters HS-CAB-17s and HS-CAB-20s, as evidenced in Example 30 and Example 49, are soluble in each of these solvents or solvent systems.

It is important to recognize that, as with conventional molecular weight esters, there are important factors other than butyryl content that influence the solubility of HS-CAB's, such as acetyl/butyryl ratio and hydroxyl content. This can be seen especially in Example 49, in which varying levels of hydroxyl and acetate affect the solubility of esters having similar butyryl content. These ester substitutions may be varied by those skilled in the art, in light of the present disclosure, to obtain the desired solubility in a given solvent, and the desired compatibility with a given resin. We note that the inventive esters evidence increased solubility, when compared with those esters having conventional molecular weight, at similar hydroxyl and acetate levels.

As demonstrated in the examples, the inventive esters are soluble in most classes of typical coating solvents, including ketones, esters, alcohols, glycol ethers, and glycol ether esters, while tolerating dilution with water or aromatic hydrocarbons.

Examples of typical solvents in which the inventive esters exhibit solubility include acetone, methyl ethyl ketone, methyl isobutyl ketone, methyl amyl ketone, methyl propyl ketone, 2-propoxyethanol, 2-butoxyethanol, ethyl 3-ethoxypropionate, ethanol, methanol isopropyl alcohol, diacetone alcohol, ethylene glycol monobutyl ether acetate, ethyl acetate, propyl acetate, isopropyl acetate, butyl acetate, isobutyl acetate diethylene glycol ethyl ether, Eastman PM acetate (propylene glycol methyl acetate), Eastman EB acetate (ethylene glycol butyl acetate), Eastman PM Solvent (propylene glycol monomethyl ether), Eastman DM Solvent (diethylene glycol methyl ether), Eastman PB Solvent (propylene glycol monobutyl ether, Eastman DE Solvent (diethylene glycol ethyl ether), Eastman PP Solvent (propylene glycol monopropyl ether), Eastman EP Solvent (ethylene glycol monopropyl ether), Eastman EB Solvent (ethylene glycol monobutyl ether), Eastman 95% Tecsol C (ethanol with methanol, MIBK and ethyl acetate as denaturants with 5% water), N-methylpyrrolidone, Eastman EEP Solvent (ethyl 3-ethoxypropionate), and other volatile inert solvents typically used in coating compositions. For example, organic solutions of the esters of this invention can be prepared by adding 1 to 1000 parts of solvent per part of ester; 1.5 to 9 parts of solvent per part of ester is preferred.

The esters of the present invention exhibit viscosities in organic solutions that in many cases differ substantially from those of conventional molecular weight esters. Thus, in Example 34 of the present disclosure, the viscosities of an HS-CAB-38 (Sample 4, Table 4) and an HS-CAB-55 (Sample 5, Table 4) are compared to the lowest viscosity commercial cellulose esters, CAB-381-0.1 and CAB-551-0.01, of comparable butyryl content, using as solvent a 90/10 by weight mixture of n-butyl acetate/xylene. FIG. 1 shows a representative comparison of the relative viscosity at each measured concentration. The log viscosities vs. concentration plots are parallel for each of the esters, indicating that each of the esters has a similar exponential viscosity rise with concentration, except that the lower the molecular weight of the ester, the higher the concentration becomes to display the same behavior. Additional Brookfield viscosity data are presented in Table 6A of Example 34. Because the inventive esters exhibit a lower viscosity than conventional esters at the same concentration, they allow coating formulations having a higher ester content at the target viscosity.

Thus, some conventional high-butyryl cellulose esters such as CAB-551-0.01 (available from Eastman Chemical Company), as evidenced in Table 6A of Example 34, exhibit a viscosity greater than 10,000 centipoise (in a 90/10 by weight mixture of n-butyl acetate/xylene) as a 50 wt. % solution. In contrast, certain inventive esters having comparable butyryl content (HS-CAB-55) exhibit viscosities in the same solution of less than 200 centipoise at a 50 wt. % solution.

Likewise, conventional mid-butyryl cellulose esters such as CAB-381-0.1 (available from Eastman Chemical Company, Kingsport, Tenn.), as evidenced in Example 34, exhibit a viscosity greater than 500,000 centipoise (in a 90/10 by weight mixture of n-butyl acetate/xylene) as a 50 wt. % solution. In contrast, certain inventive esters having comparable butyryl content (HS-CAB-38) exhibit viscosities in the same solution of less than 500 centipoise at a 50 wt. % solution.

Further, certain inventive low-butyryl cellulose esters such as HS-CAB-17, as can be seen in Table 6A of Example 34, exhibit viscosities no greater than 6,000 centipoise, and others no greater than 3,000 centipose, as a 50 wt. % solution in a 90/10 by weight mixture of n-butyl acetate/xylene.

Further, the esters of the present invention are relatively hard polymers, i.e., about 12 Knoop Hardness Units (KHU), and have high glass transition temperatures. They can be added to other resins to improve the coating hardness, and to improve properties such as slip, sag resistance, and mar resistance. To further improve the toughness, crosslinkers such as melamines or isocyanates may be added to react with these esters or with other resins.

The esters of the present invention may possess free hydroxyl groups, and thus may be utilized in conjunction with crosslinking agents such as melamines and isocyanates. Such melamines are preferably compounds having a plurality of —N(CH$_2$OR)$_2$ functional groups, wherein R is C$_1$-C$_4$ alkyl, preferably methyl. In general, the melamine cross-linking agent may be selected from compounds of the following formula, wherein R is independently C$_1$-C$_4$ alkyl:

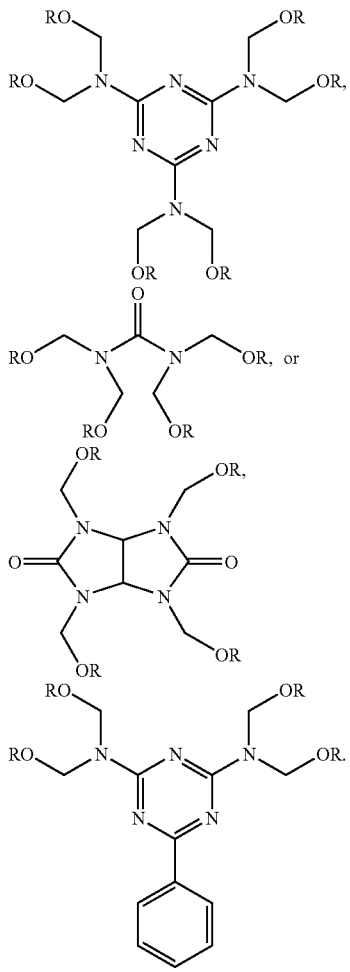

In this regard, preferred cross-linking agents include hexamethoxymethylamine, tetramethoxymethylbenzo-guanamine, tetramethoxymethylurea, mixed butoxy/methoxy substituted melamines, and the like. The most preferred melamine cross-linking agent is hexamethoxymethylamine.

Typical isocyanate crosslinking agents and resins include hexamethylene diisocyanate (HMDI), isophorone diisocyanate (IPDI), and toluene diisocyanate.

The cellulose esters of this invention are effective flow additives for high solids coatings formulations. Addition of the cellulose esters according to the invention to high solids coatings formulations generally results in the elimination of surface defects in the film upon curing/drying (i.e. elimination of pinholing and orange peel). A distinct advantage that high DS$_{Max}$, low DP cellulose esters have over conventional cellulose esters is that the inventive esters have a minimal impact on solution and/or spray viscosity when added to high solids coatings formulations. The percent solids can be increased, thus reducing the VOC of the formulation. Conventional cellulose esters can be used in these same applications as flow additives, but a reduction in solids must generally accompany the addition of the conventional cellulose esters. That is, the solvent level must be increased so as to maintain a desirable viscosity.

The invention therefore relates also to coating compositions containing the cellulose mixed esters according to the invention.

Thus, the present invention provides a coating composition comprising (a) about 0.1 to about 50 weight percent, based on the total weight (a) and (b) in said composition, of a C$_2$-C$_4$ mixed ester of cellulose, with an inherent viscosity of about 0.05 to 0.15 dL/g, as measured in a 60/40 (wt./wt.) solution of phenol/tetrachloroethane at 25° C., and a degree of substitution per anhydroglucose unit of C$_2$-C$_4$ esters of about 1.5 to about 3.50;

(b) about 0.1 to 92 weight percent, based on the total weight of (a) and (b) in said composition, of a resin selected from the group consisting of polyesters, polyester-amides, cellulose esters, alkyds, polyurethanes, epoxy resins, polyamides, acrylics, vinyl polymers, polyisocyanates, melamines, phenolics, urea resins, urethane resins, and polyamides; and (c) a solvent, preferably an organic solvent, or a solvent mixture;

wherein the total weight of (a) and (b) is about 5 to 95 weight percent of the total weight of (a), (b), and (c).

In the compositions of the invention, the total weight of (a), (b), and (c) will of course equal 100%.

It is recognized that additional additives can be used in the previously described compositions, including the following: flow additives, leveling additives, wetting and dispering agents, defoamers, adhesion promoters, slip aids, anti-skinning agents, UV stabilizers, biocides, mildewcides, fungicides, pigments, and others.

The mixed cellulose esters of the present invention may also be utilized in waterborne coating compositions. For example, the inventive esters may be dissolved in organic solvents, treated with either an amine or a surfactant, and dispersed in water. Examples of such solvents include, but are not limited to, 2-butanone, methyl amyl ketone, methanol, ethanol, ethyl 3-ethoxypropionate, ethylene glycol monoethyl ether, ethylene glycol monopropyl ether, and ethylene glycol monobutyl ether, and the like. Dispersion of the cellulose esters of the present invention in water is facilitated by addition of an amine or a surfactant. Typical amines include, but are not limited to, ammonia, piperidine, 4-ethylmorpholine, diethanolamine, triethanolamine, ethanolamine, tributylamine, dibutylamine, and dimethylamino ethanol. Surfactants include but are not limited to Aerosol OT, as well as other surfactants known in the art, such as those set out below.

Examples of dispersing agents and surfactants include sodium bis(tridecyl) sulfosuccinate, di(2-ethyl hexyl) sodium sulfosuccinate, sodium dihexylsulfosuccinate, sodium dicyclohexyl sulfosuccinate, diamyl sodium sulfosuccinate, sodium diisobutyl sulfosuccinate, disodium iso-decyl sulfosuccinate, disodium ethoxylated alcohol half ester of sulfosuccinic acid, disodium alkyl amido polyethoxy sulfosuccinate, tetrasodium N-(1,2-dicarboxy-ethyl)-N-oxtadecyl sulfosuccinamate, disodium N-octasulfosuccinamate, sulfated ethoxylated nonylphenol, 2-amino-2-methyl-1-propanol, and the like.

Alternatively, the inventive cellulose esters may be combined with one or more co-resins to assist dispersion. The amount of suitable aqueous solvent in the dispersed coating composition of such embodiments may be from about 50 to about 90 wt %, or from about 75 to about 90 wt %, of the total coating composition.

Thus, as a further aspect of the present invention, there is provided a waterborne coating composition comprising:

(a) about 0.1 to about 50 weight percent, based on the total weight of (a) and (b), of a C$_2$-C$_4$ ester of cellulose, exhibiting an inherent viscosity of about 0.05 to 0.15 dL/g, as measured in a 60/40 (wt./wt.) solution of phenol/tetrachloroethane at 25° C., and having substitutions as defined elsewhere herein, wherein the $C_2$-$C_4$ ester has been partially neutralized with ammonia or an amine;
(b) at least 50 weight percent, based on the total weight of (a) and (b), of a compatible water soluble or water dispersible resin selected from the group consisting of polyesters, polyesteramides, cellulose esters, alkyds, polyurethanes, epoxy resins, polyamides, acrylics, vinyl polymers, polyurethanes, and melamines;
(c) water; and
(d) an organic solvent;
wherein the total weight of (a) and (b) is between 5 and 50 weight percent of the total composition and the organic solvent comprises less than 20 weight percent of the total weight of the composition.

As a further aspect of the present invention, the above compositions are further comprised of one or more coatings additives. Such additives are generally present in a range of about 0.1 to 15 weight percent, based on the total weight of the composition. Examples of such coatings additives include leveling, rheology, and flow control agents such as silicones, fluorocarbons or cellulosics; flatting agents; pigment wetting and dispersing agents; surfactants; ultraviolet (UV) absorbers; UV light stabilizers; tinting pigments; defoaming and antifoaming agents; anti-settling, anti-sag and bodying agents; anti-skinning agents; anti-flooding and anti-floating agents; fungicides and mildewcides; corrosion inhibitors; thickening agents; or coalescing agents.

Specific examples of additional coatings additives can be found in Raw Materials Index, published by the National Paint & Coatings Association, 1500 Rhode Island Avenue, N.W., Washington, D.C. 20005.

Examples of flatting agents include synthetic silica, available from the Davison Chemical Division of W. R. Grace & Company under the trademark SYLOID™; polypropylene, available from Hercules Inc., under the trademark HERCOFLAT™; synthetic silicate, available from J. M Huber Corporation under the trademark ZEOLEX™; and polyethylene.

Examples of dispersing agents and surfactants include sodium bis(tridecyl) sulfosuccinate, di(2-ethylhexyl) sodium sulfosuccinate, sodium dihexylsulfosuccinate, sodium dicyclohexyl sulfosuccinate, diamyl sodium sulfosuccinate, sodium diisobutyl sulfosuccinate, disodium isodecyl sulfosuccinate, disodium ethoxylated alcohol half ester of sulfosuccinic acid, disodium alkyl amido polyethoxy sulfosuccinate, tetrasodium N-(1,2-dicarboxy-ethyl)-N-oxtadecyl sulfosuccinamate, disodium N-octasulfosuccinamate, sulfated ethoxylated nonylphenol, 2-amino-2-methyl-1-propanol, and the like.

Examples of viscosity, suspension, and flow control agents include polyaminoamide phosphate, high molecular weight carboxylic acid salts of polyamine amides, and alkyl amine salt of an unsaturated fatty acid, all are available from BYK Chemie U.S.A. under the trademark ANTI TERRA™. Further examples include polysiloxane copolymers, polyacrylate solution, cellulose esters, hydroxyethyl cellulose, hydrophobically modified hydroxyethyl cellulose, hydroxypropyl cellulose, polyamide wax, polyolefin wax, carboxymethyl cellulose, ammonium polyacrylate, sodium polyacrylate, and polyethylene oxide.

Several proprietary antifoaming agents are commercially available, for example, under the trademark BRUBREAK of Buckman Laboratories Inc., under the BYK™ trademark of BYK Chemie, U.S.A., under the FOAMASTER™ and NOPCO™ trademarks of Henkel Corp./Coating Chemicals, under the DREWPLUS™ trademark of the Drew Industrial Division of Ashland Chemical Company, under the TROYSOL™ and TROYKYD™ trademarks of Troy Chemical Corporation, and under the SAG™ trademark of Union Carbide Corporation.

Examples of fungicides, mildewcides, and biocides include 4,4-dimethyloxazolidine, 3,4,4-trimethyl-oxazolidine, modified barium metaborate, potassium N-hydroxymethyl-N-methyldithiocarbamate, 2-(thiocyano-methylthio) benzothiazole, potassium dimethyl dithiocarbamate, adamantane, N-(trichloromethylthio) phthalimide, 2,4,5,6-tetrachloroisophthalonitrile, orthophenyl phenol, 2,4,5-trichlorophenol, dehydroacetic acid, copper naphthenate, copper octoate, organic arsenic, tributyl tin oxide, zinc naphthenate, and copper 8-quinolinate.

Examples of U.V. absorbers and U.V. light stabilizers include substituted benzophenone, substituted benzotriazole, hindered amine, and hindered benzoate, available from American Cyanamide Company under the trade name Cyasorb UV, and available from Ciba Geigy under the trademark TINUVIN, and diethyl-3-acetyl-4-hydroxy-benzyl-phosphonate, 4-dodecyloxy-2-hydroxy benzophenone, and resorcinol monobenzoate.

To prepare coated articles according to the present invention, a formulated coating composition containing the cellulose esters of the present invention is applied to a substrate and allowed to dry. The substrate can be, for example, wood; plastic; metal, such as aluminum or steel; cardboard; glass; cellulose acetate butyrate sheeting; and various blends containing, for example, polypropylene, polycarbonate, polyesters such as polyethylene terephthalate, acrylic sheeting, as well as other solid substrates.

Pigments suitable for use in the coating compositions according to the present invention are the typical organic and inorganic pigments, well-known to one of ordinary skill in the art of surface coatings, especially those set forth by the Colour Index, 3d Ed., 2d Rev., 1982, published by the Society of Dyers and Colourists in association with the American Association of Textile Chemists and Colorists. Examples include, but are not limited to the following: CI Pigment White 6 (titanium dioxide); CI Pigment Red 101 (red iron oxide); CI Pigment Yellow 42, CI Pigment Blue 15, 15:1, 15:2, 15:3, 15:4 (copper phthalocyanines); CI Pigment Red 49:1; and CI Pigment Red 57:1.

The conventional cellulose acetate butyrates described in this invention were commercial samples from Eastman Chemical Company, Kingsport, Tenn., as follows: CAB-171-15, CAB-381-0.1, CAB-381-0.5, CAB-381-20, CAB-551-0.01 and CAB-551-0.2. Commercial CMCAB samples were from Eastman Chemical Company as follows: CMCAB-641-0.5 and CMCAB-641-0.2.

The following commercial coating resins, representative of those used in coatings, were used to demonstrate the compatibility of the inventive esters with a wide variety of coatings resins: Desmodur HL was obtained from Bayer as a 60% solution in butyl acetate. Eastman's Polymac HS 220-2010 (polyester), Eastman's Duramac HS 2706 (alkyd resin), Eastman's Polymac HS 5776 (polyester), Eastman's Acrylamac 232-1700 (acrylic resin), Versamid 750 (polyamide), UCAR's VYHD (polyvinyl chloride/acetate), Eastman's Duramac 207-2706 (TOFA short oil alkyd resin), Eastman's Duramac 5205 (coconut medium oil alkyd resin), Cytec's Cymel 303 (HMM melamine), Cytec's Beetle 65 (urea-formaldehyde), Bayer's Des N 3300 (polyisocyante), DuPont's Epon 1001F (epoxy resin), Bayer's Desmodur N 75 BA (aliphatic polyisocyanate), Actichem's Synocure 851 S (acrylic resin), Rohm & Haas Acryloid AT954 (acrylic resin), R&H Acryloid B-44 (acrylic resin), R&H Paraloid A-21 (acrylic lacquer), DuPont ELVACITE 2008 (acrylic lacquer), Polymac HS220-2010 (polyester), Cytec's BEETLE 65 (urea formaldehyde), UC CK-2103 (phenolic), Rohm & Haas Paraloid WR97 (acrylic lacquer, R&H Acryloid AU608X (acrylic resin), VERSAMID 750 (polyamide), Eastman's Duramac 207-2706 (alkyd resin), Eastman's Duramac 5205 (alkyd resin), Duramac 51-5135 (alkyd resin), Duramac 207-1405 (alkyd resin), DuPont's ELVACITE 2044 (ethyl methacrylate), Bayer's Des N 3300 (polymeric isocyanate), Eastman Reactol 175 (acrylic polyol), Akzo Nobel Microgel (thermoset acrylic), Eastman Duramac 1205 (alkyd resin), Eastman Duramac 2706 (alkyd resin), Eastman Duramac 2314 (alkyd resin), Resimene CE-7103 (melamine), Resimene 755 (melamine), Desmophen 1800 (polyester), Bayer Desmodur 3300 (isocyanate), Shell Epon 1001F (epoxy), Dow DER 542 (epoxy), Rhodia XIDT (isocyanate), Bayer Desmodur IL (isocyanate), Eastman Carbamac HS4372 (polyurethane), UCC UCAR VYHD (vinyl chloride/vinyl acetate), UCAR VMCH (vinyl chloride/vinyl acetate), DuPont LVAX 40 (Vinyl chloride/vinyl acetate), and Henkle Verasmid 750 (Polyamide).

In the present disclosure, the following terms have the given meanings:

Strike-in means redissolve of the basecoat caused by the solvents in a clearcoat and typically results in a mottled or muddy appearance of the basecoat pigment/metal flakes.

High Solids Coatings are coatings with a higher % solids in the formulation than traditional coatings, this typically means coatings formulations with a % solids level greater than or equal to 60%.

Medium Solids Coatings are coatings with a higher % solids in the formulation than low solids coatings, this typically means coatings formulations with a % solids level between 40% and 60%.

Low Solids Coatings are coatings with a low % solids in the formulation, this typically means coatings formulations with a % solids level less than 40%.

Gloss is a subjective term used to describe the relative amount and nature of mirror like reflection.

Orange Peel is a paint surface appearance resembling an orange skin texture.

A Surface Defect is any abnormality on the surface of a coating that adversely affects the appearance of the coating; examples include pinholes, craters, and orange peel.

Pinholes (Pinholing) are film surface defects characterized by small pore-like flaws in a coating, which extend entirely through the coating and have the general appearance of pinpricks.

Craters are small bowl-shaped depressions frequently having drops or bands of material at their centers and raised circular edges in a coating film.

Cratering is the formation in a wet coating film of small bowl-shaped depressions that persist after drying.

Dry-To-Touch Time is the interval between application and tack-free time (i.e. the amount of time required for a coating to feel dry.

Reducing Terminus means the terminal saccharide of a disaccharide, trisaccharide, oligosaccharide or polysaccharide that has no other saccharide attached at C1. The C1 can be functionalized with either a hydroxyl group or an ester group.

Non-reducing Terminus means the terminal saccharide of a disaccharide, trisaccharide, oligosaccharide or polysaccharide that has no other saccharide attached at C4. The C4 can be functionalized with either a hydroxyl group or an ester group.

Acetolysis means the cleavage of a glycosidic bond in the absence of water and in the presence of a catalyst and a carboxylic acid, including but not limited to acetic acid.

Hydrolysis means the cleavage of a glycosidic bond in the presence of water and a catalyst.

Hydrolysis also means the cleavage of an ester linkage of a cellulose ester in the presence of water and a catalyst to generate a free hydroxyl group on the cellulosic backbone.

Travel means change in color as the angle of viewing a goniochromatic material, such as a metallic paint film, is changed from the perpendicular to near-grazing. Sometimes called flop or flip-flop.

Flop means where two different painted panels appear to be a good match for color when viewed at a given angle, but appear different at all other angles.

Double Rub is the act of rubbing a solvent saturated cloth in one complete forward and backward motion over the coated surface.

Mandrel Bends is a test for determining the flexibility and adhesion of surface coatings, so named because it involves the bending of coated metal panels around mandrels. [adapted from ASTM procedure D-522]

Certain of the definitions were adapted from Coatings Encyclopedic Dictionary, ed. LeSota, S.; 1995, Federation of Societies for Coatings Technology, Blue Bell, Pa., incorporated herein by reference.

As used in the examples and throughout the application, MEK means methyl ethyl ketone; MPK means methyl propyl ketone; MAK means methyl amyl ketone; PM acetate or Eastman PM acetate means propylene glycol methyl acetate; EB acetate or Eastman EB acetate means ethylene glycol butyl acetate; PM or Eastman PM means propylene glycol monomethyl ether; DM or Eastman DM means diethylene glycol methyl ether; PB or Eastman PB means propylene glycol monobutyl ether; DE or Eastman DE means diethylene glycol ethyl ether; PP or Eastman PP means propylene glycol monopropyl ether; EP Solvent or Eastman EP Solvent means ethylene glycol monopropyl ether; EB Solvent or Eastman EB Solvent means ethylene glycol monobutyl ether; Tecsol C, 95% means ethanol with methanol, MIBK and ethyl acetate as denaturants with 5% water; NMP means n-methyl pyrrolidone; and EEP Solvent or Eastman EEP Solvent means ethyl 3-ethoxypropionate.

EXPERIMENTAL

The $^1$H NMR results are obtained using a JEOL Model GX-400 NMR spectrometer operated at 400 MHz. Sample tube size is 5 mm. The sample temperature is 80° C., the pulse delay 5 sec. and 64 scans are acquired for each experiment. Chemical shifts are reported in ppm from tetramethylsilane, with residual DMSO as an internal reference. The chemical shift of residual DMSO is set to 2.49 ppm.

For any carboxy($C_1$-$C_3$)alkylcellulose esters, a GC method is used to determine acetyl, propionyl, and butyryl, rather than NMR, because the methylene of the carboxyl($C_1$-$C_3$)alkyl group cannot be separated from the ring protons of the cellulose backbone, making absolute DS measurements by NMR difficult. The DS values are calculated by converting the acid number to percent carboxymethyl and using this along with the GC weight percents of acetyl, propionyl, and butyryl.

The acetyl, propionyl, and butyryl weight percents are determined by a hydrolysis GC method. In this method, about 1 g of ester is weighed into a weighing bottle and dried in a vacuum oven at 105° C. for at least 30 minutes. Then 0.500±0.001 g of sample is weighed into a 250 mL Erlenmeyer flask. To this flask is added 50 mL of a solution of 9.16 g isovaleric acid, 99%, in 2000 mL pyridine. This mixture is heated to reflux for about 10 minutes, after which 30 mL of isopropanolic potassium hydroxide solution is added. This mixture is heated at reflux for about 10 minutes. The mixture is allowed to cool with stirring for 20 minutes, and then 3 mL of concentrated hydrochloric acid is added. The mixture is stirred for 5 minutes, and then allowed to settle for 5 minutes. About 3 mL of solution is transferred to a centrifuge tube and centrifuged for about 5 minutes. The liquid is analyzed by GC (split injection and flame ionization detector) with a 25M X 0.53 mm fused silica column with 1 μm FFAP phase.

The weight percent acyl is calculated as follows, where:
$C_i$=concentration of I (acyl group)
$F_i$=relative response factor for component I
$F_s$=relative response factor for isovaleric acid
$A_i$=area of component I
$A_s$=area of isovaleric acid
R=(grams of isovaleric acid)/(g sample)

$$C_i = ((F_i {}^* A_i)/F_s {}^* A_s))^* R^* 100$$

This GC method is used, along with NMR, to determine weight % acetyl, propionyl, and butyryl, and the method used is indicated.

We note that wt. % substitutions may be converted to degree of substitution (DS) values, according to the following:

Wt. % Butyryl is calculated using the following equation:

$$\text{Wt. \% Bu} = (DS_{Bu} {}^* MW_{Bu})/((DS_{Ac} {}^* MW_{AcKet}) + (DS_{Bu} {}^* MW_{BuKet}) + MW_{anhydroglu})$$

Wt. % Acetyl is calculated using the following equation:

$$\text{Wt. \% Ac} = (DS_{Ac} {}^* MW_{Ac})/((DS_{Ac} {}^* MW_{AcKet}) + (DS_{Bu} {}^* MW_{BuKet}) + MW_{anhydroglu})$$

Wt. % Hydroxyl is calculated using the following equation:

$$\text{Wt. \% OH} = (DS_{Max} - DS_{Ac} - DS_{Bu}) {}^* MW_{OH}/((DS_{Ac} {}^* MW_{AcKet}) + (DS_{Bu} {}^* MW_{BuKet}) + MW_{anhydroglu})$$

Unless otherwise noted:
$DS_{Ac}$=Degree of substitution of butyryl as determined by $^1$H-NMR
$DS_{Bu}$=Degree of substitution of butyryl as determined by $^1$H-NMR
$MW_{Ac}$=Molecular weight of the acetyl ester, ($C_2H_3O$=43.045)
$MW_{Bu}$=Molecular weight of the butyryl ester, ($C_4H_7O$=71.095)
$MW_{OH}$=Molecular weight of the hydroxyl group, (OH=17.007)
$MW_{AcKet}$=Molecular weight of the acetyl ester minus one hydrogen, ($C_2H_2O$=42.037)
$MW_{BuKet}$=Molecular weight of the acetyl ester minus one hydrogen, ($C_4H_6O$=70.091)
$MW_{anhydroglu}$=Molecular weight of the anhydroglucose unit, ($C_6H_{10}O_5$=162.141)
$DS_{Max}$=Maximum degree of substitution ($DS_{Max}$ is assumed to be 3.22 for all calculations, to be more accurate, the degree of polymerization should be determined and the $DS_{Max}$ used in the calculations should be appropriately adjusted. To simplify the calculations, a $DS_{Max}$ of 3.22 is assumed. As is evidenced by the negative values of Wt % Hydroxyl for several of the HS-CAB samples that were isolated in the fully esterified state, 3.22 is not completely accurate.

Wt. % Propionyl cannot be determined from DS data obtained by $^1$H-NMR since the peaks generated by the propionyl protons overlap with those generated by the butyryl protons. As a result, it is always assumed that the peaks are generated by the ester of interest (i.e. a butyryl ester in the case of a CAB or a propionyl ester in the case of a CAP).

We use one of two methods to determine the degree of substitution (DS) of the inventive cellulose mixed esters and conventional cellulose esters.

Method 1 determines the degree of substitution of acetyl and of butyryl by analyzing the NMR spectrum and comparing the peak area of the integrated alkyl ester protons with the peak area of the cellulose backbone protons. According to this method, acetyl can be distinguished from the higher esters such as butyryl or propionyl, but butyryl cannot be distinguished from propionyl. As a result, one must assume that all the higher esters peaks come from either butyryl or propionyl, depending upon the anhydride used. This is a reasonable assumption for cellulose acetate butyrates since the level of propionyl in CAB's is near zero when butyric anhydride is a reactant. Another issue is that with this method, $^1$H-NMR does not indicate the degree of substitution of hydroxyl groups. The accepted method for determining the degree of substitution of hydroxyl groups is by difference, that is, one assumes a maximum degree of substitution and from that number subtracts the degree of substitution of acetyl and butyryl. The result is the degree of substitution of hydroxyl groups, seen in the following equation 1.

$$DS_{Max} - DS_{Bu} - DS_{Ac} = DS_{OH} \qquad \text{Equation 1}$$

Ester substitutions for conventional molecular weight cellulose esters are easily calculated. Since they have a higher degree of substitution, it is accepted that the $DS_{Max}$ is 3.0. For the inventive mixed esters according to the invention, the maximum degree of substitution is greater than 3.0 and is on a steeper part of the curve, that is small changes in DP have a greater impact on $DS_{Max}$ than is seen with conventional esters. As a result, in order to obtain an accurate measure of the $DS_{Max}$ and ultimately the $DS_{OH}$, one should first determine the degree of polymerization (based on molecular weight), and use that information to determine the $DS_{Max}$. Throughout this application, the $DS_{Max}$ is assumed to be equal to 3.22 for this purpose. This is a reasonable number that would be obtained with a degree of polymerization of anhydroglucose units equal to 9. Unfortunately, $DS_{Max}$=3.22 is not an accurate assumption for all HS-CAB samples, and in some cases (see Examples 9-27) the calculated $DS_{OH}$ would be less than zero. We therefore sometimes describe an upper hydroxyl content of the cellulose mixed esters according to the invention, while omitting the lower value.

Method 2 utilizes the weight percent data determined by GC (acetyl, propionyl, and butyryl) and by titration (hydroxyl), and DS values are calculated from these data. The uncertainty with the use of this method is that the DS calculations are dependent on the accuracy and precision of the GC and titration test methods. As a result, in some cases when this method is used to determine degree of substitution, the calculated $DS_{Max}$ is less than 3.0.

We are presenting both wt % and degree of substitution in the application, in certain instances, in an effort to describe the inventive esters as completely as possible. Unless stated otherwise, DS results are from NMR data, wt % acetyl, propionyl and butyryl are from gas chromatography analysis, and wt % hydroxyl values are from titration data.

The acid number of any carboxy($C_1$-$C_3$)alkylcellulose esters are determined by titration as follows. An accurately weighed aliquot (0.5-1.0 g) of the carboxy ($C_1$-$C_3$) alkylcellulose ester is mixed with 50 mL of pyridine and stirred. To this mixture is added 40 mL of acetone followed by stirring.

Finally, 20 mL of water is added and the mixture stirred again. This mixture is titrated with 0.1 N sodium hydroxide in water using a glass/combination electrode. A blank consisting of 50 mL of pyridine, 40 mL of acetone, and 20 mL of water is also titrated. The acid number is calculated as follows where:

Ep=mL NaOH solution to reach end point of sample
B=mL NaOH solution to reach end point of blank
N=normality of sodium hydroxide solution
Wt.=weight of carboxy ($C_1$-$C_3$) alkylcellulose ester titrated.

Acid Number (mg KOH/g sample)=
((Ep−B)*N*56.1)/Wt.

IV Test Method

The inherent viscosity (IV) of the cellulose esters described in this application, except where indicated otherwise, are determined by measuring the flow time of a solution of known polymer concentration and the flow time of a solvent-blank in a capillary viscometer, and then calculating the IV.

IV is defined by the following equation:

$$(n)\frac{25°\,C.}{0.50\%} = \frac{\ln\frac{ts}{to}}{C}$$

where:
(n)=Inherent Viscosity at 25° C. at a polymer concentration of 0.50 g/100 mL of solvent.
ln=Natural logarithm
$t_s$=Sample flow time
$t_o$=Solvent−blank flow time
C=Concentration of polymer in grams per 100 mL of solvent=0.50

Samples are prepared to a concentration of 0.50 g per 100 mL of solvent (60% phenol and 40% 1,1,2,2-tetrachloroethane by weight, also described herein as "PM95"). The sample (0.25 g) is weighed into a culture tube containing a stir bar. 50.0 mL of 60% phenol and 40% 1,1,2,2-tetrachloroethane by weight (also described in the application as "PM95") is added. The mixture is placed in a heater and heated with stirring (300 rpm) to 125° C. (7 minutes to reach the target temperature and 15 minute hold at 125° C.). The sample is allowed to cool to room temperature (25° C.) and is then filtered and placed in the viscometer (Model AVS 500-Schott America, Glass & Scientific Products, Inc., Yonkers, N.Y.). IV is calculated according to the equation above.

Solution Viscosity Determination

A few solution viscosity values are provided in the present application, because the method has been used in the literature to measure viscosity, and inferentially, molecular weight. We note, however, that solution viscosity measurements of the low molecular weight esters of the invention are less meaningful than are the inherent viscosity measurements as set forth above. We therefore provide solution viscosity measurements for comparison purposes only, and not as a preferred method of inferring molecular weight. Unless otherwise indicated, solution viscosity values are measured according to ASTM-D 817.

GPC Method for Molecular Weight Determination

The molecular weight distributions of cellulose ester and carboxy($C_1$-$C_3$)alkylcellulose ester samples are determined by gel permeation chromatography (GPC) using one of two methods listed below.

Method 1, THF: The molecular weight distributions of cellulose ester samples indicated as being tested by GPC with THF as a solvent are determined at ambient temperature in Burdick and Jackson GPC-grade THF stabilized with BHT, at a flow rate of 1 ml/min. All other samples are determined using GPC with NMP as a solvent, as set forth in Method 2 below. Sample solutions are prepared by dissolution of about 50 mg of polymer in 10 ml of THF, to which 10 μl of toluene is added as a flow-rate marker. An autosampler is used to inject 50 μl of each solution onto a Polymer Laboratories PLgel® column set consisting of a 5 μm Guard, a Mixed-C® and an Oligopore® column in series. The eluting polymer is detected by differential refractometry, with the detector cell held at 30° C. The detector signal is recorded by a Polymer Laboratories Caliber® data acquisition system, and the chromatograms are integrated with software developed at Eastman Chemical Company. A calibration curve is determined with a set of eighteen nearly monodisperse polystyrene standards with molecular weight from 266 to 3,200,000 g/mole and 1-phenylhexane at 162 g/mole. The molecular weight distributions and averages are reported either as equivalent polystyrene values or as true molecular weights calculated by means of a universal calibration procedure with the following parameters:

$K_{PS}$=0.0128 $a_{PS}$=0.712
$K_{CE}$=0.00757 $a_{CE}$=0.842

Method 2, NMP: The molecular weight distributions of all samples not otherwise indicated are determined by GPC with NMP as a solvent, as follows. The molecular weight distributions of cellulose ester samples are determined by gel permeation chromatography at 40° C. in Burdick and Jackson N-Methylpyrrolidone with 1% Baker glacial acetic acid by weight, at a flow rate of 0.8 ml/min. Sample solutions are prepared by dissolution of about 25 mg of polymer in 10 ml of NMP, to which 10 μl of toluene is added as a flow-rate marker. An autosampler is used to inject 20 μl of each solution onto a Polymer Laboratories PLgel® column set consisting of a 10 μm Guard, a Mixed-B® column. The eluting polymer is detected by differential refractometry, with the detector cell held at 40° C. The detector signal is recorded by a Polymer Laboratories Caliber® data acquisition system, and the chromatograms are integrated with software developed at Eastman Chemical Company. A calibration curve is determined with a set of eighteen nearly monodisperse polystyrene standards with molecular weight from 580 to 3,200,000 g/mole. The molecular weight distributions and averages are reported as equivalent polystyrene values.

The invention can be further illustrated by the following examples of preferred embodiments, although it will be understood that these examples are included merely for purposes of illustration and are not intended to limit the scope of the invention unless otherwise specifically indicated.

EXAMPLES

Example 1

Preparation of a Mid-Butyryl Cellulose Ester (HS-CAB-38) According to the Invention Cellulose (80 g), provided as a dissolving grade of softwood pulp with an α-cellulose content of at least 94%, was activated by soaking in water (~1000 mL) in excess of 20 minutes, and then filtering through a fritted funnel to remove the water. Residual water was removed by washing the water-wet cellulose with acetic acid (~2000 mL). The acetic acid-wet cellulose was then washed with butyric acid (~2000 mL). A 2 L-reaction kettle was charged with the butyric acid-wet activated cellulose (311.67 g). Butyric acid (145.8 g) was added to the kettle. The mixture was cooled to 15° C. A mixture of butyric anhydride (225.9 g), acetic anhydride (96.8 g), and sulfuric acid (3.42 g) were cooled to 15° C. and then added to the reaction kettle. The mixture was stirred for 1 hour at room temperature. The mixture was then heated to 84.2° C. and stirred for 11.5 hours. A mixture of water (150 g) and acetic acid (105 g) was slowly added to the clear "dope." The mixture was stirred for 7.5 hours at 65° C. The catalyst was neutralized by the addition of Mg(OAc)$_4$ (4.5 g) and NaOAc (1.7 g) dissolved in acetic acid (HOAc) (5.25 g) and water (19 g). The neutralized dope was filtered at approximately 50° C. through a glass wool-covered coarse fritted funnel. The product was precipitated by pouring, with rapid mixing, the clear, neutralized dope into 20-30 volumes of water. Decanting away the filtration liquid and adding fresh deionized water and then allowing the precipitate to stand in the fresh water for several hours hardened the precipitate. The precipitate was washed extensively with deionized water for at least 4 hours. The product was dried in a vacuum oven at approximately 50° C. overnight to yield 95 g of the final product. The product had the following composition: $DS_{Bu}$=1.92; $DS_{Ac}$=0.98; $M_n$=3012; $M_w$=5296; Polydispersity=1.758; IV (PM95)=0.077; S=38.2 ppm; Mg=12.9 ppm; Na=9.7 ppm [Calculated results: wt. % Bu=40.40%, wt. % Ac=12.48%, wt. % OH=1.61%].

Example 2

Preparation of a Mid-Butyryl Cellulose Ester (HS-CAB-38) According to the Invention Cellulose (80 g), provided as a dissolving grade of softwood pulp with an α-cellulose content of at least 94%, was activated by soaking in water (~1000 mL) for at least 20 minutes and then filtering through a fritted funnel to remove the water. Residual water was removed by washing the water-wet cellulose with acetic acid (~2000 mL). The acetic acid-wet cellulose was then washed with butyric acid (~2000 mL). A 2 L-reaction kettle was charged with the butyric acid-wet activated cellulose (415 g). Butyric acid (46.6 g) was added to the kettle. The mixture was cooled to 15° C. A mixture of butyric anhydride (246.4 g), acetic anhydride (98.8 g), and sulfuric acid (3.42 g) were cooled to 15° C. and then added to the reaction kettle. The mixture was stirred for 1 hour at room temperature. The mixture was then heated to 78.3° C. and stirred for 11.2 hours. A mixture of water (156 g) and acetic acid (109 g) was slowly added to the clear "dope." The mixture was stirred for 7.5 hours at 65° C. The catalyst was neutralized by the addition of Mg(OAc)$_4$ (4.5 g) and NaOAc (1.7 g) dissolved in HOAc (5.25 g) and water (19 g). The neutralized dope was filtered at approximately 50° C. through a glass wool-covered coarse fritted funnel. The product was precipitated by pouring, with rapid mixing, the clear, neutralized dope into 20-30 volumes of water. Decanting away the filtration liquid and adding fresh deionized water and then allowing the precipitate to stand in the fresh water for several hours hardened the precipitate. The precipitate was washed extensively with deionized water for at least 4 hours. The product was dried in a vacuum oven at approximately 50° C. overnight to yield 132 g of the final product. The product had the following composition: $DS_{Bu}$=1.78; $DS_{Ac}$=1.04; $M_n$=4448; $M_w$=9691; Polydispersity=2.179; IV (PM 95)=0.121; S=81.2 ppm; Mg=37.1 ppm; Na=23.3 ppm. [Calculated results: wt. % Bu=38.28%, wt. % Ac=13.54%, wt. % OH=2.06%].

Example 3

Preparation of a High-Butyryl Cellulose Ester (HS-CAB-55) According to the Invention Cellulose (80 g), provided as a dissolving grade of softwood pulp with an α-cellulose content of at least 94%, was activated by soaking in water (~1000 mL) for at least 20 minutes and then filtering through a fritted funnel to remove the water. Residual water was removed by washing the water-wet cellulose with acetic acid (~2000 mL). The acetic acid-wet cellulose was then washed with butyric acid (~2000 mL). A 2 L-reaction kettle was charged with the butyric acid-wet activated cellulose (390.33 g). Butyric acid (70.3 g) was added to the kettle. The mixture was cooled to 15° C. A mixture of butyric anhydride (396.1 g), acetic anhydride (0 g), and sulfuric acid (3.24 g) were cooled to 15° C. and then added to the reaction kettle. The mixture was stirred for 1 hour at room temperature. The mixture was then heated to 87.4° C. and stirred for 11.0 hours. A mixture of water (164 g) and acetic acid (115 g) was slowly added to the clear "dope." The mixture was stirred for 23 hours at 65° C. The catalyst was neutralized by the addition of Mg(OAc)$_4$ (4.3 g) and NaOAc (1.6 g) dissolved in HOAc (5.25 g) and water (19 g). The neutralized dope was filtered at approximately 50° C. through a glass wool-covered coarse fritted funnel. The product was precipitated by pouring, with rapid mixing, the clear, neutralized dope into 20-30 volumes of water. Decanting away the filtration liquid and adding fresh deionized water and then allowing the precipitate to stand in the fresh water for several hours hardened the precipitate. The precipitate was washed extensively with deionized water for at least 4 hours. The product was dried in a vacuum oven at approximately 50° C. overnight to yield 110 g of the final product. The product had the following composition: $DS_{Bu}$=2.66; $DS_{Ac}$=0.09; $M_n$=3492; $M_w$=6170; Polydispersity=1.767; IV (PM 95)=0.086; S=44 ppm; Mg=7.7 ppm; Na=6.9 ppm. [Calculated results: wt. % Bu=53.67%, wt. % Ac=1.10%, wt. % OH=2.27%].

Example 4

Preparation of a High-Butyryl Cellulose Ester (HS-CAB-55) According to the Invention Cellulose (80 g), provided as a dissolving grade of softwood pulp with an α-cellulose content of at least 94%, was activated by soaking in water (~1000 mL) for at least 20 minutes and then filtering through a fritted funnel to remove the water. Residual water was removed by washing the water-wet cellulose with acetic acid (~2000 mL). The acetic acid-wet cellulose was then washed with butyric acid (~2000 mL). A 2 L-reaction kettle was charged with the butyric acid-wet activated cellulose (346.0 g). Butyric acid (112.8 g) was added to the kettle. The mixture was cooled to 15° C. A mixture of butyric anhydride (399.0 g), acetic anhydride (0 g), and sulfuric acid (3.24 g) were cooled to 15° C. and then added to the reaction kettle. The mixture was stirred for 1 hour at room temperature. The mixture was then heated to 82.6° C. and stirred for 11.0 hours. A mixture of water (164 g) and acetic acid (115 g) was slowly added to the clear "dope." The mixture was stirred for 23 hours at 65° C. The catalyst was neutralized by the addition of Mg(OAc)$_4$ (4.3 g) and NaOAc (1.6 g) dissolved in HOAc (5.25 g) and water (19 g). The neutralized dope was filtered at approximately 50° C. through a glass wool-covered coarse fritted funnel. The product was precipitated by pouring, with rapid mixing, the clear, neutralized dope into 20-30 volumes of water. Decanting away the filtration liquid and adding fresh deionized water and then allowing the precipitate to stand in the fresh water for several hours hardened the precipitate. The precipitate was washed extensively with deionized water for at least 4 hours. The product was dried in a vacuum oven at approximately 50° C. overnight to yield 136 g of the final product. The product had the following composition: $DS_{Bu}$=2.62; $DS_{Ac}$=0.05; $M_n$=4137; $M_w$=8715; Polydispersity=2.106; IV (PM 95)=0.111; S=174.1; Mg=79.5; Na=65.1 [Calculated results: wt. % Bu=53.55%, wt. % Ac=0.62%, wt. % OH=2.69%].

Example 5

Preparation of a Fully-Esterified, Low-Butyryl Cellulose Ester (HS-CAB-17) According to the Invention A 2 L-reaction kettle was charged with a butyric acid-wet, water-activated cellulose (457.14 g), prepared according to Example 1. Butyric acid (18.10 g) and acetic acid (55.58 g) were added to the kettle. The mixture was cooled to 0° C. A mixture of butyric anhydride (572.00 g), acetic anhydride (145.60 g), and sulfuric acid (5.28 g) were cooled to −15° C. and then added to the reaction kettle. The mixture was stirred for 1 hour at room temperature. The mixture was then heated to 62.8° C. and stirred for 24 hours. The catalyst was neutralized by the addition of Mg(OAc)$_4$ (42.29 g) dissolved in HOAc (500 g) and water (500 g). The product was precipitated by pouring the clear, neutralized dope with rapid mixing, into 20-30 volumes of water. The precipitate was washed extensively with deionized water for at least 4 hours. The product was dried in a vacuum oven at approximately 50° C. overnight. The product had the following composition: $DS_{Bu}$=1.07; $DS_{Ac}$=2.22; $DS_{Max}$=3.29; $M_n$=5575; $M_w$=10969; Polydispersity=1.97; IV (PM 95)=0.122 [Calculated results: wt. % Bu=23.02%, wt. % Ac=28.92%, wt. % OH=−0.36%].

Example 6

Preparation of a Fully-Esterified Low-Butyryl Cellulose Ester (HS-CAB-17) According to the Invention A 2 L-reaction kettle was charged with a butyric acid-wet, water-activated cellulose (457.14 g) (prepared according to Example 1). Butyric acid (18.10 g) and acetic acid (55.58 g) were added to the kettle. The mixture was cooled to 0° C. A mixture of butyric anhydride (572.00 g), acetic anhydride (145.60 g), and sulfuric acid (5.28 g) were cooled to −15° C. and then added to the reaction kettle. The mixture was stirred for 1 hour at room temperature. The mixture was then heated to 79.4° C. and stirred for 21.2 hours. The catalyst was neutralized by the addition of Mg(OAc)$_4$ (42.29 g) dissolved in HOAc (500 g) and water (500 g). The product was precipitated by pouring the clear, neutralized dope with rapid mixing, into 20-30 volumes of water. The precipitate was washed extensively with deionized water for approximately 15 hours. The product was dried in a vacuum oven at approximately 50° C. overnight. The product had the following composition: $DS_{Bu}$=1.13; $DS_{Ac}$=2.34; $DS_{Max}$=3.47; $M_n$=2837; $M_w$=4401; Polydispersity=1.55; IV (PM 95)=0.062. [Calculated results: wt. % Bu=23.65%, wt. % Ac=29.65%, wt. % OH=−1.25%].

Example 7

Preparation of a Fully-Esterified Mid-Butyryl Cellulose Ester (HS-CAB-38) According to the Invention A 2 L-reaction kettle was charged with a butyric acid-wet, water-activated cellulose (163.00 g), prepared according to Example 1. Butyric acid (13.70 g) was added to the kettle. The mixture was cooled to 0° C. A mixture of butyric anhydride (196.90 g), acetic anhydride (71.69 g), and sulfuric acid (2.64 g) were cooled to −15° C. and then added to the reaction kettle. The mixture was stirred for 1 hour at room temperature. The mixture was then heated to 71.1° C. and stirred for 2 hours. The catalyst was neutralized by the addition of Mg(OAc)$_4$ (42.29 g) dissolved in HOAc (500 g) and water (500 g). The product was precipitated by pouring the clear, neutralized dope with rapid mixing, into 20-30 volumes of water. The precipitate was washed extensively with deionized water for at least 4 hours. The product was dried in a vacuum oven at approximately 50° C. overnight. The product had the following composition: $DS_{Bu}$=1.91; $DS_{Ac}$=1.43; $DS_{Max}$=3.34; $M_n$=4031; $M_w$=10343; Polydispersity=2.57; IV (PM 95)=0.089. [Calculated results: wt. % Bu=38.13%, wt. % Ac=17.28%, wt. % OH=−0.57%].

Example 8

Preparation of a Fully-Esterified, High-Butyryl Cellulose Ester (HS-CAB-55) According to the Invention A 2 L-reaction kettle was charged with a butyric acid-wet, water-activated cellulose (338.70 g), prepared according to Example 1. Butyric acid (22.78 g) was added to the kettle. The mixture was cooled to 0° C. A mixture of butyric anhydride (614.41 g), acetic anhydride (0.61 g), and sulfuric acid (5.28 g) were cooled to −15° C. and then added to the reaction kettle. The mixture was stirred for 1 hour at room temperature. The mixture was then heated to 79.4° C. and stirred for 5 hours. The catalyst was neutralized by the addition of Mg(OAc)$_4$ (42.29 g) dissolved in HOAc (500 g) and water (500 g). The product was precipitated by pouring the clear, neutralized dope with rapid mixing, into 20-30 volumes of water. The precipitate was washed extensively with deionized water for at least 4 hours. The product was dried in a vacuum oven at approximately 50° C. overnight. The product had the following composition: $DS_{Bu}$=3.18; $DS_{Ac}$=0.04; $DS_{Max}$=3.22; $M_n$=5113; $M_w$=11977; Polydispersity=2.34; IV (PM 95)=0.111. [Calculated results: wt. % Bu=58.47%, wt. % Ac=0.45%, wt. % OH=0.00%].

Examples 9-27

HS-CAB Samples

According to Examples 9-27, additional HS-CAB's of a range of compositions are prepared and evaluated. The samples evaluated are described in Tables 2-3, along with data from Examples 1-8 set forth above, and are prepared as described generally elsewhere in the specification and in Examples 1-8.

TABLE 2

HS-CAB Samples

| Example # | CAB Type | Wt % Bu | DS Bu | Wt % Ac | DS Ac | Wt % Pr | DS Pr | Wt % OH | DS OH | IV (PM95) | Mn | Tg |
|---|---|---|---|---|---|---|---|---|---|---|---|---|
| 1 | HS-CAB-38 | 40.40[1] | 1.92 | 12.48[2] | 0.98 | NA[3] | NA | 1.61[4] | 0.32[5] | 0.077 | 3012[6] | NM |
| 2 | HS-CAB-38 | 38.28[1] | 1.78 | 13.54[2] | 1.04 | NA[3] | NA | 2.06[4] | 0.4[5] | 0.121 | 4448[6] | NM |
| 3 | HS-CAB-55 | 53.67[1] | 2.66 | 1.10[2] | 0.09 | NA[3] | NA | 2.27[4] | 0.47[5] | 0.086 | 3492[6] | NM |
| 4 | HS-CAB-55 | 53.55[1] | 2.62 | 0.62[2] | 0.05 | NA[3] | NA | 2.69[4] | 0.55[5] | 0.111 | 4137[6] | NM |
| 5 | HS-CAB-20 | 23.02[1] | 1.07 | 28.92[2] | 2.22 | NA[3] | NA | −0.36[4] | −0.07[5] | 0.122 | 5575[6] | NM |
| 6 | HS-CAB-20 | 23.65[1] | 1.13 | 29.65[2] | 2.34 | NA[3] | NA | −1.25[4] | −0.25[5] | 0.062 | 2837[6] | NM |
| 7 | HS-CAB-38 | 38.13[1] | 1.91 | 17.28[2] | 1.43 | NA[3] | NA | −0.57[4] | −0.12[5] | 0.089 | 4031[6] | NM |
| 8 | HS-CAB-55 | 58.47[1] | 3.18 | 0.45[2] | 0.04 | NA[3] | NA | 0.00[4] | 0[5] | 0.111 | 5113[6] | NM |
| 9 | HS-CAB-20 | 22.87 | 1.01 | 27.45 | 2.21 | 0.71 | NA | 0.81 | 0[5] | 0.071 | 1556 | 83.38 |
| 10 | HS-CAB-20 | 21.71 | 1.04 | 23.93 | 2.08 | 0.00 | NA | 1.32 | 0.1[5] | 0.074 | 1812 | 90.98 |
| 11 | HS-CAB-20 | 24.25 | 1.12 | 21.12 | 1.78 | 0 | NA | 2.31 | 0.32[5] | 0.091 | 1838 | 101.71 |
| 12 | HS-CAB-20 | 23.99 | 1.08 | 21.43 | 1.72 | 0 | NA | 3.23 | 0.42[5] | 0.091 | 2152 | 107.55 |
| 13 | HS-CAB-20 | 24.31 | NM | 20.79 | NM | 0.55 | NA | 3.58 | NM | 0.093 | 1823 | 112.41 |
| 14 | HS-CAB-29 | 29.38 | 1.40 | 18.37 | 1.55 | 0.38 | NA | 1.81 | 0.27[5] | 0.085 | NM | 100.80 |

TABLE 3

HS-CAB Samples

| Example # | CAB Type | Wt % Bu | DS Bu | Wt % Ac | DS Ac | Wt % Pr | DS Pr | Wt % OH | DS OH | IV (PM95) | Mn | Tg |
|---|---|---|---|---|---|---|---|---|---|---|---|---|
| 15 | HS-CAB-29 | 28.72 | 1.18 | 17.17 | 1.27 | 0.56 | NA | 3.83 | 0.77[5] | 0.111 | NM | 120.37 |
| 16 | HS-CAB-38 | 41.52 | NM | 12.52 | NM | 0.33 | NA | 0.79 | NM | 0.079 | 2040 | 85.03 |
| 17 | HS-CAB-38 | 39.73 | 1.99 | 11.50 | 1.06 | 0.37 | NA | 1.13 | 0.17[5] | 0.086 | 2340 | 95.06 |
| 18 | HS-CAB-38 | 38.16 | NM | 13.06 | NM | 0.41 | NA | 1.4 | NM | 0.102 | 2734 | 102.72 |
| 19 | HS-CAB-38 | 39.51 | 1.51 | 11.21 | 0.95 | 0.28 | NA | 2.16 | 0.76[5] | 0.095 | 2465 | NM |
| 20 | HS-CAB-38 | 35.01 | 1.63 | 13.42 | 0.94 | 0.77 | NA | 3.51 | 0.65[5] | 0.103 | NM | 115.92 |
| 21 | HS-CAB-46 | 47.36 | 2.40 | 6.44 | 0.46 | 0.42 | NA | 2.23 | 0.36[5] | NM | 2499 | 80.72 |
| 22 | HS-CAB-46 | 44.18 | 2.13 | 7.24 | 0.49 | 0.5 | NA | 3.1 | 0.60[5] | 0.112 | 3182 | 99.17 |
| 23 | HS-CAB-55 | 53.88 | 2.91 | 2.52 | 0.13 | 0.33 | NA | 1.09 | 0.18[5] | 0.076 | NM | 75.27 |
| 24 | HS-CAB-55 | 54.10 | 2.91 | 2.21 | 0.19 | 0.33 | NA | 1.19 | 0.12[5] | 0.077 | 2265 | 76.07 |
| 25 | HS-CAB-55 | 51.82 | NM | 2.85 | NM | 0.44 | NA | 2.49 | NM | 0.107 | 3222 | 92.25 |
| 26 | HS-CAB-55 | 54.59 | 2.38 | 2.36 | 0.13 | 0.36 | NA | 3.10 | 0.71[5] | 0.101 | 2783 | 99.17 |

TABLE 3-continued

HS-CAB Samples

| Example # | CAB Type | Wt % Bu | DS Bu | Wt % Ac | DS Ac | Wt % Pr | DS Pr | Wt % OH | DS OH | IV (PM95) | Mn | Tg |
|---|---|---|---|---|---|---|---|---|---|---|---|---|
| 27 | HS-CAB-55 | 45.39 | 2.11 | 3.56 | 0.18 | 0.41 | NA | 4.61 | 0.93[5] | NM | NM | 114.43 |

[1]Wt. % Butyryl is calculated using the following equation: Wt. % Bu = $(DS_{Bu} * MW_{Bu})/((DS_{Ac} * MW_{AcKet}) + (DS_{Bu} * MW_{BuKet}) + MW_{anhydroglu})$
[2]Wt. % Acetyl is calculated using the following equation: Wt. % Ac = $(DS_{Ac} * MW_{Ac})/((DS_{Ac} * MW_{AcKet}) + (DS_{Bu} * MW_{BuKet}) + MW_{anhydroglu})$
[3]$DS_{Pr}$ cannot be distinguished from butyryl from DS data obtained by $^1$H-NMR, since the peaks generated by the propionyl protons overlap with those generated by the butyryl protons. As a result, it is assumed that the peaks are generated by the ester of interest (i.e. a butyryl ester in the case of a CAB or a propionyl ester in the case of a CAB.
[4]Wt. % Hydroxyl is calculated using the following equation: Wt. % OH = $(DS_{Max} - DS_{Ac} - DS_{Bu}) * MW_{OH}/((DS_{Ac} * MW_{AcKet}) + (DS_{Bu} * MW_{BuKet}) + MW_{anhydroglu})$
[5]$DS_{OH}$ is calculated using the following equation: $DS_{OH} = DS_{Max} - DS_{Ac} - DS_{Bu}$
[6]These GPC results are obtained using NMP as the solvent as opposed to THF. There is a bias between these two methods and NMP results tend to be higher than those in THF.
$DS_{Ac}$ = Degree of substitution of butyryl as determined by $^1$H-NMR
$DS_{Bu}$ = Degree of substitution of butyryl as determined by $^1$H-NMR
$MW_{Ac}$ = Molecular weight of the acetyl ester, ($C_2H_3O$ = 43.045)
$MW_{Bu}$ = Molecular weight of the butyryl ester, ($C_4H_7O$ = 71.095)
$MW_{OH}$ = Molecular weight of the hydroxyl group, (OH = 17.007)
$MW_{AcKet}$ = Molecular weight of the acetyl ester minus one hydrogen, ($C_2H_2O$ = 42.037)
$MW_{BuKet}$ = Molecular weight of the acetyl ester minus one hydrogen, ($C_4H_6O$ = 70.091)
$MW_{anhydroglu}$ = Molecular weight of the anhydroglucose unit, ($C_6H_{10}O_5$ = 162.141)
$DS_{Max}$ = Maximum degree of substitution ($DS_{Max}$ is assumed to be 3.22 for all calculations, to be more accurate, the degree of polymerization could be determined and the $DS_{Max}$ used in the calculations appropriately adjusted. To simplify the calculations, a $DS_{Max}$ of 3.22 is assumed. As is evidenced by the negative values of Wt % Hydroxyl for several of the HS-CAB samples isolated in the fully esterified state, 3.22 is not completely accurate.
NA = Not available from data collected
NM = Not measured

Examples 28-30 and Comparative Examples 31-33

The HS-CAB samples and commercial CAB samples (available from Eastman Chemical Company), as set forth in Table 4, are dissolved in a variety of solvents and solvent blends (see Table 5 and 6) at 10% by weight at approximately 22° C. (72° F.) (room temperature). The samples are checked visually for solubility and rated as soluble-clear (9), soluble-slight haze (7), gels (5), partially soluble (3), and insoluble (1). The inventive cellulose esters are considerably more soluble in some solvents than current commercial cellulose esters of similar acetyl/butyryl content (e.g. CAB-381-0.1, CAB-551-0.01, and CAB-171-15, all available from Eastman Chemical Company, Kingsport, Tenn.), particularly the HS CAB-38 and HS CAB-17 type ester for the following solvents: toluene, methanol, ethanol, isopropyl alcohol, Eastman EB, Eastman EP, PB, PP, DIBK, C-11 ketone, EB acetate, PM acetate, and n-butyl acetate.

TABLE 4

Properties of HS-CAB's evaluated

| | Sample # | | | | | |
|---|---|---|---|---|---|---|
| | 1 | 2 | 3 | 4 | 5 | 6 |
| Ester Type | HS-CAB-38 | HS-CAB-55 | HS-CAB-17* | HS-CAB-38 | HS-CAB-55 | HS-CAB-55 |
| % Acetyl (GC) | 9.99 | 2.93 | 24.85 | NA | NA | NA |
| % Butyryl (GC) | 41.07 | 51.41 | 20.42 | NA | NA | NA |
| % Propionyl (GC) | 0.28 | 0.41 | 0.38 | NA | NA | NA |
| % Hydroxyl (titration) | 1.40 | 2.2 | 3.83 | NA | NA | NA |
| DS Acetyl (NMR) | 1.00 | 0.07 | 1.70 | 1.00 | 0.07 | 0.05 |
| DS Butyryl (NMR) | 2.06 | 2.73 | 0.91 | 1.94 | 2.70 | 2.72 |
| DS CM | 0 | 0 | 0 | 0 | 0 | 0 |
| IV (PM 95) | 0.096 | 0.088 | 0.091 | 0.096 | 0.088 | 0.119 |

TABLE 4-continued

Properties of HS-CAB's evaluated

| | Sample # | | | | | |
|---|---|---|---|---|---|---|
| | 1 | 2 | 3 | 4 | 5 | 6 |
| $M_n$ | 1775† | 2274† | 2529† | 3175†† | 3349†† | 4098†† |
| $M_w$ | 3159† | 3636† | 3998† | 5551†† | 6066†† | 8149†† |

†Calculated by GPC w/ THF as solvent.

††Calculated by GPC w/ NMP as solvent.

‡‡These three samples (Samples 4-6) are blends of multiple runs, made according to Examples 1, 3, and 4, respectively MEK = methyl ethyl ketone, MPK = methyl propyl ketone, MAK = methyl amyl ketone, PM acetate = propylene glycol methyl acetate, EB acetate = ethylene glycol butyl acetate, PM = propylene glycol monomethyl ether, DM = diethylene glycol methyl ether, PB = propylene glycol monobutyl ether, DE = diethylene glycol ethyl ether, PP = propylene glycol monopropyl ether, Eastman EP Solvent = ethylene glycol monopropyl ether, Eastman EB Solvent = ethylene glycol monobutyl ether, 95% Tecsol C = ethanol with methanol, MIBK and ethyl acetate as denaturants with 5% water, NMP = n-methyl pyrrolidone, Eastman EEP Solvent = ethyl 3-ethoxypropionate

TABLE 5

Solubility of Cellulose Esters

| Solubility at 10 wt % solutions 1 = insoluble, 3 = partially soluble, 5 = gels, 7 = soluble hazy, 9 = soluble | Example 28 | Comparative Example 31 | Example 29 | Comparative Example 32 | Example 30 | Comparative Example 33 |
|---|---|---|---|---|---|---|
| Esters--- | HS-CAB-38 Sample 1, Table 4 | CAB 381-0.1 | HS-CAB-55 Sample 2, Table 4 | CAB 551-0.01 | HS-CAB-17 Sample 3, Table 4 | CAB 171-15S |
| Solvent: | | | | | | |
| Blends: | | | | | | |
| Toluene/Ethyl Acetate 70/30 | 9 | 9 | 9 | 9 | 5 | 1 |
| Toluene/95% Tecsol C 80/20 | 9 | 9 | 9 | 9 | 5 | 1 |
| Tecsol C(95)/Ethyl Acetate 70/30 | 9 | 9 | 9 | 9 | 7 | 1 |
| Isopropyl Alcohol/Water 90/10 | 9 | 1 | 9 | 1 | 1 | 1 |
| MEK/MPK/MAK/EEP/n-Butyl Acetate 20/20/10/15/35 | 9 | 9 | 9 | 9 | 9 | 9 |
| Ketones: | | | | | | |
| Acetone | 9 | 9 | 9 | 9 | 9 | 9 |
| MEK | 9 | 9 | 9 | 9 | 9 | 9 |
| MPK | 9 | 9 | 9 | 9 | 8 | 9 |
| MAK | 9 | 9 | 9 | 9 | 5 | 1 |
| C-11 ketone | 9 | 1 | 9 | 9 | 3 | 1 |
| DIBK | 9 | 1 | 9 | 9 | 1 | 1 |
| Esters: | | | | | | |
| Ethyl Acetate | 9 | 9 | 9 | 9 | 9 | 9 |
| n-Butyl Propionate | 9 | 9 | 9 | 9 | 1 | 1 |
| PM Acetate | 9 | 9 | 9 | 9 | 9 | 3 |
| EB Acetate | 9 | 9 | 9 | 9 | 7 | 1 |
| n-Butyl Acetate | 9 | 9 | 9 | 9 | 7 | 1 |
| t-Butyl Acetate (ester solvent) | 9 | 9 | 9 | 9 | 3 | 1 |
| n-Propyl Propionate | 9 | 9 | 9 | 9 | 7 | 9 |

TABLE 6

Solubility of Cellulose Esters

| 1 = insoluble, 3 = partially soluble, 5 = gels, 7 = soluble hazy, 9 = soluble | Example 28 | Comparative Example 31 | Example 29 | Comparative Example 32 | Example 30 | Comparative Example 33 |
|---|---|---|---|---|---|---|
| Esters--- | HS-CAB-38 Sample 1, Table 4 | CAB 381-0.1 | HS-CAB-55 Sample 2, Table 4 | CAB 551-0.01 | HS-CAB-17 Sample 3, Table 4 | CAB 171-15S |
| Solvent: | | | | | | |
| Glycol ethers: | | | | | | |
| PM | 9 | 9 | 9 | 9 | 9 | 1 |
| DM | 9 | 9 | 9 | 9 | 9 | 3 |
| PB | 7 | 1 | 7 | 9 | 3 | 1 |
| DE | 9 | 9 | 9 | 9 | 8 | 1 |
| PP | 9 | 1 | 9 | 9 | 5 | 1 |
| EP | 9 | 1 | 9 | 9 | 5 | 1 |
| EB | 9 | 1 | 9 | 9 | 3 | 1 |
| Alcohols: | | | | | | |
| Diacetone alcohol | 9 | 9 | 9 | 9 | 9 | 9 |
| Methanol | 9 | 1 | 9 | 1 | 1 | 1 |
| Tecsol C (95) | 9 | 1 | 9 | 1 | 3 | 1 |
| Isopropyl alcohol | 3 | 1 | 7 | 1 | 3 | 1 |
| Other: | | | | | | |
| EEP | 9 | 9 | 9 | 9 | 7 | 1 |
| Exxate 600 | 9 | 9 | 9 | 9 | 5 | 1 |
| NMP | 9 | 9 | 5 | 9 | 9 | 9 |
| VM & P Naptha | 3 | 1 | 3 | 1 | 3 | 1 |
| Toluene | 9 | 1 | 9 | 5 | 3 | 1 |
| Xylene | 3 | 1 | 3 | 1 | 3 | 1 |
| Dimethylaminoethanol | 9 | 9 | 9 | 9 | 9 | 9 |
| Methylene chloride | 9 | 9 | 9 | 9 | 9 | 9 |
| Pyridine | 9 | 9 | 9 | 9 | 9 | 9 |

Example 34

Viscosity Studies

The viscosities of an HS-CAB-38 (Sample 4, Table 4) and an HS-CAB-55 (Sample 5, Table 4) are compared to the lowest viscosity commercial cellulose esters, CAB-381-0.1 and CAB-551-0.01, of comparable butyryl content, using as solvent an n-butyl acetate/xylene in a 90/10 by weight mixture, using Brookfield viscosity as a function of concentration. FIG. 1 shows the relative viscosity at each measured concentration. Note how the log viscosities vs. concentration plots are parallel for each of the esters. This indicates that each of the esters has a similar exponential viscosity rise with concentration, except that the lower the molecular weight of the ester is, the higher the concentration becomes to display the same behavior. Because the inventive esters exhibit a lower viscosity than conventional esters at the same concentration, they allow coating formulations having a higher ester content at the target viscosity.

Additional Brookfield viscosity data are presented in Table 6A. The HS-CAB's evaluated are dissolved at various solids levels in n-butyl acetate/xylene (9:1 by weight).

TABLE 6A

Viscosity in a 90/10 by weight mixture of n-butyl acetate/xylene

| Material | lot | Wt % Bu | Wt % OH | IV (PM95) | % Solids | Centipoise |
|---|---|---|---|---|---|---|
| HS-CAB-38 | EMT02-121 | 39.77 | 1.61 | 0.09 | 30 | 12.2 |
| HS-CAB-38 | EMT02-121 | 39.77 | 1.61 | 0.09 | 50 | 312 |
| HS-CAB-38 | EMT02-121 | 39.77 | 1.61 | 0.09 | 60 | 3430 |
| HS-CAB-38 | EMT02-121 | 39.77 | 1.61 | 0.09 | 70 | 70800 |
| HS-CAB-38 | EMT02-122 | 38.48 | 1.66 | 0.08 | 30 | 12.6 |
| HS-CAB-38 | EMT02-122 | 38.48 | 1.66 | 0.08 | 50 | 332 |
| HS-CAB-38 | EMT02-122 | 38.48 | 1.66 | 0.08 | 60 | 3655 |
| HS-CAB-38 | EMT02-122 | 38.48 | 1.66 | 0.08 | 70 | 88300 |
| HS-CAB-55 | EMT02-117 | 52.78 | 1.18 | 0.08 | 30 | 9.4 |
| HS-CAB-55 | EMT02-117 | 52.78 | 1.18 | 0.08 | 50 | 139.4 |
| HS-CAB-55 | EMT02-117 | 52.78 | 1.18 | 0.08 | 60 | 200000* |
| HS-CAB-55 | EMT02-117 | 52.78 | 1.18 | 0.08 | 70 | 200000* |
| HS-CAB-55 | EMT02-128 | 54.17 | 1.43 | 0.08 | 30 | 12.3 |
| HS-CAB-55 | EMT02-128 | 54.17 | 1.43 | 0.08 | 50 | 132.4 |

TABLE 6A-continued

Viscosity in a 90/10 by weight mixture of n-butyl acetate/xylene

| Material | lot | Wt % Bu | Wt % OH | IV (PM95) | % Solids | Centipoise |
|---|---|---|---|---|---|---|
| HS-CAB-55 | EMT02-128 | 54.17 | 1.43 | 0.08 | 60 | 885 |
| HS-CAB-55 | EMT02-128 | 54.17 | 1.43 | 0.08 | 70 | 200000* |
| HS-CAB-17 | EMT02-084 | 20.1 | 2.18 | 0.08 | 30 | 37.6 |
| HS-CAB-17 | EMT02-084 | 20.1 | 2.18 | 0.08 | 50 | 2685 |
| HS-CAB-17 | EMT02-084 | 20.1 | 2.18 | 0.08 | 60 | 65800 |
| HS-CAB-17 | EMT02-084 | 20.1 | 2.18 | 0.08 | 70 | 200000 |
| HS-CAB-17 | EMT02-085 | 20.1 | 2.18 | 0.08 | 30 | 45.5 |
| HS-CAB-17 | EMT02-085 | 20.42 | 1.99 | 0.09 | 50 | 5660 |
| HS-CAB-17 | EMT02-085 | 20.42 | 1.99 | 0.09 | 60 | 124800 |
| HS-CAB-17 | EMT02-085 | 20.42 | 1.99 | 0.09 | 70 | ** |
| CAB-551-0.01 | NA | 55.06 | 1.50 | 0.26 | 10 | 3.8 |
| CAB-551-0.01 | NA | 55.06 | 1.50 | 0.26 | 30 | 160 |
| CAB-551-0.01 | NA | 55.06 | 1.50 | 0.26 | 40 | 935 |
| CAB-551-0.01 | NA | 55.06 | 1.50 | 0.26 | 50 | 10300 |
| CAB-381-0.1 | NA | 39.87 | 1.61 | 0.44 | 10 | 38 |
| CAB-381-0.1 | NA | 39.87 | 1.61 | 0.44 | 30 | 1600 |
| CAB-381-0.1 | NA | 39.87 | 1.61 | 0.44 | 40 | 15300 |
| CAB-381-0.1 | NA | 39.87 | 1.61 | 0.44 | 50 | 508000 |

HS-CAB-55 (EMT02-117) gels at 65, 67, 69, and 70%
HS-CAB-55 (EMT02-128) gels at 70%
HS-CAB-17 (EMT02-084) gels at 70%
HS-CAB-17 (EMT02-085) gels at 60% and 70%
HS-CAB-38 (EMT02-121) is very viscous at 70%
HS-CAB-38 (EMT02-122) is very viscous at 70%
HS-CAB-17 (EMT02-084) is very viscous at 60%
*Mixture gels
**Not measured since material is partially insoluble

Examples 35-40 and Comparative Examples 41-46

Viscosity of HS CAB/Resin Blends and Comparison with Conventional CAB/Resin Blends Blends of HS-CAB-38 (Sample 1, Table 4) and HS-CAB-55 (Sample 2, Table 4) with commercial resins (Duramac HS 2706, Polymac HS 5776, and Acrylamac 232-1700) (1:1 CAB to resin, at 20% and 40% solids levels) are prepared and the viscosities of the solutions are determined using a Brookfield viscometer. Comparison blends of CAB-381-0.1 and CAB-551-0.01 with commercial resins (Duramac HS 2706, Polymac HS 5776, and Acrylamac 232-1700) (1:1 CAB to resin, at 20% solids levels) are prepared and the viscosities of the solutions are determined using a Brookfield viscometer. The results are presented in Table 7. The HS-CABs have very little impact on solution or spray viscosity and can thus be added at much higher levels than conventional esters. This results in an increase in the % non-volatiles in the system.

Example 47

Compatibility of HS-CAB's with Various Coatings Resins

Solutions are prepared using ratios of cellulosic to modifying resin of 1/9, 1/3, 1/1, and 3/1 at 10% solids in a mixture of n-butyl acetate/MEK/MPK/EEP/MAK (35/20/20/15/10). Films are cast on glass at 10 mil thickness. The films are allowed to air dry for 24 hours. The resulting films are evaluated visually under good room lights (Tables 8 and 9) for film clarity. HS-CAB-55 (Sample 2, Table 4) and HS-CAB-38 (Sample 1, Table 4) have good compatibility with most resins tested: acrylics, polyesters, melamine type resins, urea formaldehyde resins, alkyds, isocyanate resin, phenolics and epoxies, and limited compatibility in vinyls and polyamides. HS-CAB-17s (Sample 3, Table 4) are less compatible than HS-CAB-55 and HS-CAB-38, but still can be used with the resins tested in limited amounts.

TABLE 7

Viscosity of CABs for High $DS_{Max}$, low DP and Conventional CAB/Resin Blends

| Example # | CAB Type | Resin Type | Ratio of CAB:Resin | Total Solids | Spindle # | RPM | Viscosity (cP) |
|---|---|---|---|---|---|---|---|
| 35 | HS-CAB-38 | Duramac HS 2706 | 1:1 | 40% | 18 | 30 | 13.3 |
| 41 | CAB-381-0.1 | Duramac HS 2706 | 1:1 | 20% | 18 | 30 | 23.7 |
| 36 | HS-CAB-55 | Duramac HS 2706 | 1:1 | 40% | 18 | 30 | 12.8 |
| 42 | CAB-551-0.01 | Duramac HS 2706 | 1:1 | 20% | 18 | 60 | 6.0 |
| 37 | HS-CAB-38 | Polymac HS 5776 | 1:1 | 40% | 18 | 30 | 15.4 |
| 43 | CAB-381-0.1 | Polymac HS 5776 | 1:1 | 20% | 18 | 30 | 24.5 |
| 38 | HS-CAB-55 | Polymac HS 5776 | 1:1 | 40% | 18 | 30 | 13.9 |
| 44 | CAB-551-0.01 | Polymac HS 5776 | 1:1 | 20% | 18 | 60 | 5.9 |
| 39 | HS-CAB-38 | Acrylamac 232-1700 | 1:1 | 40% | 18 | 30 | 37.4 |
| 45 | CAB-381-0.1 | Acrylamac 232-1700 | 1:1 | 20% | 18 | 30 | 31.9 |
| 40 | HS-CAB-55 | Acrylamac 232-1700 | 1:1 | 40% | 18 | 30 | 32.9 |
| 46 | CAB-551-0.01 | Acrylamac 232-1700 | 1:1 | 20% | 18 | 60 | 8.4 |

This example shows the compatibility of the inventive cellulose mixed esters with a variety of coatings resins.

TABLE 8

Compatibility Studies
Film Compatibility, 1 mil films cast from 10 mil thickness from 10% solution
from a solvent blend of MEK/MPK/MAK/EEP/n-BuOAc (20/20/10/15/35)

| Sample: | TYPE RESIN | HS-CAB-55 EMT02-82 | HS-CAB-38 EMT02-83 | HS-CAB-20 EMT02-85 |
|---|---|---|---|---|
| R&H Acryloid AT954 1:4 | THERMOSET ACRYLIC | 0 | 0 | 1 |
| 1:1 | | 0 | 0 | 9 |
| 4:1 | | 0 | 0 | 7 |
| R&H Acryloid B-44 1:4 | ACRYLIC LACQUER | 0 | 0 | 9 |
| 1:1 | | 0 | 7 | 7 |
| 4:1 | | 0 | 0 | 0 |
| R&H Paraloid A-21 1:4 | ACRYLIC LACQUER | 0 | 0 | 0 |
| 1:1 | | 0 | 0 | 9 |
| 4:1 | | 0 | 0 | 7 |
| Cytec CYMEL 303 1:4 | HEXAMETHOXYMETHYL MELAMINE | 0 | 0 | 0 |
| 1:1 | | 0 | 0 | 7 |
| 4:1 | | 0 | 0 | 7 |
| ELVACITE 2008 1:4 | DUPONT ACRYLIC LACQUER | 0 | 0 | 0 |
| 1:1 | Methyl methacrylate (lo MW) | 0 | 0 | 7 |
| 4:1 | | 0 | 0 | 7 |
| Polymac HS220-2010 1:4 | Polyester | 0 | 0 | 0 |
| 1:1 | | 0 | 0 | 0 |
| 4:1 | | 0 | 0 | 0 |
| BEETLE 65 1:4 | Cytec Urea Formadehyde | 0 | 7 | 0 |
| 1:1 | | 0 | 0 | 0 |
| 4:1 | | 7 | 7 | 0 |
| UCAR VYHD 1:4 | VINYL CHLORIDE/VINYL ACETATE | 3 | 9 | 9 |
| 1:1 | | 3 | 9 | 9 |
| 4:1 | | 3 | 7 | 1 |
| CK-2103 1:4 | UC PHENOLIC | 0 | 0 | 0 |
| 1:1 | | 0 | 0 | 0 |
| 4:1 | | 0 | 0 | 0 |
| R&H Paraloid WR97 1:4 | RH WATER REDUCIBLE TS ACRYLIC | 0 | 0 | 7 |
| 1:1 | | 0 | 0 | 9 |
| 4:1 | | 0 | 0 | 7 |

0 = clear, no haze;
1 = very slight haze, only in bright light;
3 = slight haze in room;
5 = translucent;
7 = translucent and incompatible domains;
9 = hazy and incompatible;
10 = opaque

TABLE 9

Compatibility Studies

| Sample: | TYPE RESIN | HS-CAB-55 EMT02-82 | HS-CAB-38 EMT02-83 | HS-CAB-20 EMT02-85 |
|---|---|---|---|---|
| Neat esters 1:0 | Cellulosic resins without resins | 0 | 0 | 0 |
| R&H Acryloid AU608X 1:4 | R&H Acrylic | 0 | 0 | 0 |
| 1:1 | | 0 | 0 | 1 |
| 4:1 | | 0 | 0 | 7 |
| EPON 1001F 1:4 | DUPONT EPOXY | 5 | 5 | 5 |
| 1:1 | | 5 | 5 | 9 |
| 4:1 | | 3 | 5 | 7 |

TABLE 9-continued

| | | Compatibility Studies | | |
|---|---|---|---|---|
| Sample: | TYPE RESIN | HS-CAB-55 EMT02-82 | HS-CAB-38 EMT02-83 | HS-CAB-20 EMT02-85 |
| VERSAMID 750 1:4 | POLYAMIDE | 9 | 9 | 9 |
| 1:1 | | 9 | 9 | 9 |
| 4:1 | | 9 | 9 | 9 |
| Duramac 207-2706 1:4 | EASTMAN short oil, TOFA, 23% n-butac, corrosion resistant | 0 | 0 | 0 |
| 1:1 | | 0 | 0 | 0 |
| 4:1 | | 0 | 0 | 0 |
| Duramac 5205 1:4 | Med. Coconut oil alkyd, 40% xylene. Plasticizer for NC | 0 | 0 | 1 |
| 1:1 | | 0 | 0 | 7 |
| 4:1 | | 0 | 0 | 7 |
| Duramac 51-5135 1:4 | EASTMAN Med oil SOYA alkyd gasoline resistant, 40% VMP | 0 | 5 | 7 |
| 1:1 | | 0 | 3 | 7 |
| 4:1 | | 0 | 3 | 7 |
| Duramac 207-1405 1:4 | EASTMAN SOYA chain stopped alkyd, 50% NV | 1 | 5 | 7 |
| 1:1 | | 1 | 3 | 7 |
| 4:1 | | 0 | 1 | 7 |
| ELVACITE 2044 1:4 | DuPont ethyl methacrylate | 0 | 0 | 7 |
| 1:1 | | 0 | 0 | 8 |
| 4:1 | | 0 | 0 | 8 |
| Des N 3300 1:4 | Bayer Polymeric isocyanate | 0 | 0 | 0 |
| 1:1 | | 0 | 0 | 5 |
| 4:1 | | 0 | 0 | 10 |

Example 48

HS-CAB Solubilities

Solutions are prepared using ratios of cellulosic to modifying resin ratio of 1/1 at 10% solids in one of four solvent blends, Solvent 1 (MEK/PMAc/EEP, 5/4/1), Solvent 2 (MEK/Xylene/EEP, 5/4/1), Solvent 3 (MEK/PMAc/Toluene, 1/1/2), Solvent 4 (PMAc/EtOH/n-BuOH, 2/1/1). Films are cast on glass at 10 mil thickness. The films are allowed to air dry for 24 hours. The resulting films are evaluated visually under good room lights and the results are presented in Tables 10-16 for film clarity.

TABLE 10

Film Compatibility 1 mil films cast from 8 mil thickness from 25% solution from 4 different solvent blends

| | | | | | Resin | | | | |
|---|---|---|---|---|---|---|---|---|---|
| | | | | | R&H Acryloid AT400 | Bayer A670 | R&H AU608 | Eastman Acrylamac 2328 | Eastman Acrylamac 2350 |
| | | | | | | | CAB:Resin | | |
| | | | | | 1:1 | 1:1 | 1:1 | 1:1 | 1:1 |
| | | | | | | | Solvent | | |
| | | | | | Solvent 1 | Solvent 1 | Solvent 1 | Solvent 1 | Solvent 1 |
| | | | | | | | Type Resin | | |
| | | Wt % Bu | Wt % Ac | Wt % OH | Thermoset Acrylic-1 | OH Functional Acrylic-1 | OH Functional Acrylic-1 | Thermoset Acrylic-1 | OH Functional Acrylic-1 |
| CAB 381-0.1 | Commercial | 39.87* | 12.90* | 1.61* | 0 | 0 | 0 | 1 | 0 |
| CAB 551-0.01 | Commercial | 55.06* | 1.07* | 1.50* | 0 | 0 | 0 | 0 | 0 |
| HS-CAB-38 | EMT02-158 | 39.51 | 11.21 | 2.16 | 0 | 0 | 0 | 0 | 3 |
| HS-CAB-38 | EMT03-030 | 35.01 | 13.42 | 3.51 | 3 | 0 | 0 | 3 | 5 |
| HS-CAB-38 | EMT02-162 | 39.73 | 11.5 | 1.13 | 0 | 0 | 0 | 0 | 3 |
| HS-CAB-55 | EMT02-105 | 53.88 | 2.52 | 1.09 | 0 | 0 | 0 | 0 | 0 |
| HS-CAB-55 | EMT02-117 | 54.1 | 2.21 | 1.19 | 0 | 0 | 0 | 0 | 0 |
| HS-CAB-55 | EMT02-131 | 54.59 | 2.36 | 3.1 | 0 | 0 | 0 | 1 | 0 |
| HS-CAB-55 | EMT02-133 | 51.82 | 2.85 | 2.49 | 0 | 0 | 0 | 0 | 0 |
| HS-CAB-55 | EMT02-169 | 45.39 | 3.56 | 4.61 | 0 | 0 | 0 | 0 | 5 |

TABLE 10-continued

Film Compatibility 1 mil films cast from 8 mil
thickness from 25% solution from 4 different solvent blends

| | | Wt % Bu | Wt % Ac | Wt % OH | R&H Acryloid AT400 | Bayer A670 | R&H AU608 | Eastman Acrylamac 2328 | Eastman Acrylamac 2350 |
|---|---|---|---|---|---|---|---|---|---|
| | | | | | CAB:Resin 1:1 | 1:1 | 1:1 | 1:1 | 1:1 |
| | | | | | Solvent 1 | Solvent 1 | Solvent 1 | Solvent 1 | Solvent 1 |
| | | | | | Type Resin | | | | |
| | | | | | Thermoset Acrylic-1 | OH Functional Acrylic-1 | OH Functional Acrylic-1 | Thermoset Acrylic-1 | OH Functional Acrylic-1 |
| HS-CAB-46 | EMT03-077 | 47.36 | 6.44 | 2.23 | 0 | 0 | 0 | 0 | 0 |
| HS-CAB-46 | EMT02-062 | 44.18 | 7.24 | 3.1 | 0 | 0 | 0 | 0 | 1 |
| HS-CAB-29 | EMT03-059 | 28.72 | 17.17 | 3.83 | 5 | 3 | 0 | 9 | 9 |
| HS-CAB-29 | EMT03-051 | 29.38 | 18.37 | 1.81 | 1 | 1 | 0 | 9 | 9 |
| HS-CAB-20 | EMT03-042 | 21.71 | 23.93 | 1.32 | 9 | 9 | 5 | 9 | 9 |
| HS-CAB-20 | EMT03-039 | 24.25 | 21.12 | 2.31 | 9 | 7 | 0 | 5 | 9 |
| HS-CAB-20 | EMT03-044 | 22.87 | 27.45 | 0.81 | 9 | 7 | 7 | 9 | 9 |
| HS-CAB-20 | EMT03-040 | 23.99 | 21.43 | 3.23 | 9 | 7 | 0 | 5 | 9 |

Solvent 1 = MEK/PMAc/EEP 5/4/1
Solvent 2 = MEK/Xylene/EEP 5/4/1
Solvent 3 = MEK/PMAc/Toluene 1/1/2
Solvent 4 = PMAc/EtOH/n-BuOH 2/1/1
0 = clear no haze;
1 = very slight have, only in bright light;
3 = slight haze in room;
5 = translucent;
7 = translucent and incompatible domains;
9 = hazy and incompatible;
10 = opaque
*Calculated using equations previously described in Examples 1-8.

TABLE 11

Film Compatibility 1 mil films cast from 8 mil thickness from
25% solution from 4 different solvent blends

| | | Wt % Bu | Wt % Ac | Wt % OH | Eastman Reactol 175 | Akzo Nobel Microgel | Eastman Duramac 1205 | Eastman Duramac 2706 | Eastman Duramac 2314 |
|---|---|---|---|---|---|---|---|---|---|
| | | | | | CAB:Resin 1:1 | 1:1 | 1:1 | 1:1 | 1:1 |
| | | | | | Solvent 1 | Solvent 1 | Solvent 1 | Solvent 1 | Solvent 1 |
| | | | | | Type Resin | | | | |
| | | | | | Thermoset Acrylic-1 | Thermoset Acrylic-1 | Chain Stopped SOYA Oil alkyd-1 | Hexamethoxy methyl melamine-1 | Styrenated alkyd-1 |
| CAB 381-0.1 | Commercial | 39.87* | 12.90* | 1.61* | 0 | 7 | 1 | 0 | 3 |
| CAB 551-0.01 | Commercial | 55.06* | 1.07* | 1.50* | 0 | 5 | 3 | 0 | 0 |
| HS-CAB-38 | EMT02-158 | 39.51 | 11.21 | 2.16 | 0 | 0 | 1 | 0 | 0 |
| HS-CAB-38 | EMT03-030 | 35.01 | 13.42 | 3.51 | 0 | 1 | 3 | 0 | 9 |
| HS-CAB-38 | EMT02-162 | 39.73 | 11.5 | 1.13 | 0 | 0 | 3 | 0 | 0 |
| HS-CAB-55 | EMT02-105 | 53.88 | 2.52 | 1.09 | 0 | 0 | 1 | 0 | 0 |
| HS-CAB-55 | EMT02-117 | 54.1 | 2.21 | 1.19 | 0 | 0 | 3 | 0 | 0 |
| HS-CAB-55 | EMT02-131 | 54.59 | 2.36 | 3.1 | 0 | 0 | 0 | 0 | 0 |
| HS-CAB-55 | EMT02-133 | 51.82 | 2.85 | 2.49 | 0 | 0 | 0 | 0 | 0 |
| HS-CAB-55 | EMT02-169 | 45.39 | 3.56 | 4.61 | 0 | 1 | 1 | 0 | 1 |
| HS-CAB-46 | EMT03-077 | 47.36 | 6.44 | 2.23 | 0 | 0 | 0 | 0 | 0 |

TABLE 11-continued

Film Compatibility 1 mil films cast from 8 mil thickness from 25% solution from 4 different solvent blends

| | | Wt % Bu | Wt % Ac | Wt % OH | Resin | | | | |
|---|---|---|---|---|---|---|---|---|---|
| | | | | | Eastman Reactol 175 | Akzo Nobel Microgel | Eastman Duramac 1205 | Eastman Duramac 2706 | Eastman Duramac 2314 |
| | | | | | CAB:Resin | | | | |
| | | | | | 1:1 | 1:1 | 1:1 | 1:1 | 1:1 |
| | | | | | Solvent | | | | |
| | | | | | Solvent 1 | Solvent 1 | Solvent 1 | Solvent 1 | Solvent 1 |
| | | | | | Type Resin | | | | |
| | | | | | Thermoset Acrylic-1 | Thermoset Acrylic-1 | Chain Stopped SOYA Oil alkyd-1 | Hexamethoxy methyl melamine-1 | Styrenated alkyd-1 |
| HS-CAB-46 | EMT02-062 | 44.18 | 7.24 | 3.1 | 0 | 0 | 0 | 0 | 0 |
| HS-CAB-29 | EMT03-059 | 28.72 | 17.17 | 3.83 | 0 | 3 | 3 | 0 | 9 |
| HS-CAB-29 | EMT03-051 | 29.38 | 18.37 | 1.81 | 0 | 1 | 5 | 0 | 9 |
| HS-CAB-20 | EMT03-042 | 21.71 | 23.93 | 1.32 | 0 | 3 | 9 | 9 | 9 |
| HS-CAB-20 | EMT03-039 | 24.25 | 21.12 | 2.31 | 0 | 3 | 9 | 9 | 9 |
| HS-CAB-20 | EMT03-044 | 22.87 | 27.45 | 0.81 | 7 | 3 | 9 | 1 | 9 |
| HS-CAB-20 | EMT03-040 | 23.99 | 21.43 | 3.23 | 0 | 3 | 9 | 0 | 9 |

Solvent 1 = MEK/PMAc/EEP 5/4/1
Solvent 2 = MEK/Xylene/EEP 5/4/1
Solvent 3 = MEK/PMAc/Toluene 1/1/2
Solvent 4 = PMAc/EtOH/n-BuOH 2/1/1
0 = clear no haze;
1 = very slight have, only in bright light;
3 = slight haze in room;
5 = translucent;
7 = translucent and incompatible domains;
9 = hazy and incompatible;
10 = opaque

TABLE 12

Film Compatibility 1 mil films cast from 8 mil thickness from 25% solution from 4 different solvent blends

| | | Wt % Bu | Wt % Ac | Wt % OH | Resin | | | | |
|---|---|---|---|---|---|---|---|---|---|
| | | | | | Resimene CE-7103 | Resimene 755 | Desmophen 1800 | Bayer Desmodur 3300 | Cytec Cymel 303 |
| | | | | | CAB:Resin | | | | |
| | | | | | 1:1 | 1:1 | 1:1 | 1:1 | 1:1 |
| | | | | | Solvent | | | | |
| | | | | | Solvent 1 | Solvent 1 | Solvent 2 | Solvent 2 | Solvent 2 |
| | | | | | Type Resin | | | | |
| | | | | | Melamine-1 | Melamine-1 | Polyester-2 | Isocyanate-2 | Melamine-2 |
| CAB 381-0.1 | Commercial | 39.87* | 12.90* | 1.61* | 0 | 0 | 0 | 5 | 0 |
| CAB 551-0.01 | Commercial | 55.06* | 1.07* | 1.50* | 0 | 0 | 0 | 0 | 0 |
| HS-CAB-38 | EMT02-158 | 39.51 | 11.21 | 2.16 | 0 | 0 | 0 | 0 | 0 |
| HS-CAB-38 | EMT03-030 | 35.01 | 13.42 | 3.51 | 0 | 0 | 0 | 1 | 0 |
| HS-CAB-38 | EMT02-162 | 39.73 | 11.5 | 1.13 | 0 | 0 | 0 | 0 | 0 |
| HS-CAB-55 | EMT02-105 | 53.88 | 2.52 | 1.09 | 0 | 0 | 0 | 0 | 0 |
| HS-CAB-55 | EMT02-117 | 54.1 | 2.21 | 1.19 | 0 | 0 | 0 | 0 | 0 |
| HS-CAB-55 | EMT02-131 | 54.59 | 2.36 | 3.1 | 0 | 0 | 0 | 0 | 0 |
| HS-CAB-55 | EMT02-133 | 51.82 | 2.85 | 2.49 | 0 | 0 | 0 | 0 | 0 |
| HS-CAB-55 | EMT02-169 | 45.39 | 3.56 | 4.61 | 0 | 0 | 0 | 1 | 0 |
| HS-CAB-46 | EMT03-077 | 47.36 | 6.44 | 2.23 | 0 | 0 | 0 | 0 | 0 |
| HS-CAB-46 | EMT02-062 | 44.18 | 7.24 | 3.1 | 0 | 0 | 0 | 0 | 0 |
| HS-CAB-29 | EMT03-059 | 28.72 | 17.17 | 3.83 | 3 | 0 | 0 | 9 | 0 |
| HS-CAB-29 | EMT03-051 | 29.38 | 18.37 | 1.81 | 0 | 0 | 0 | 0 | 0 |
| HS-CAB-20 | EMT03-042 | 21.71 | 23.93 | 1.32 | 9 | 9 | 7 | 7 | 0 |
| HS-CAB-20 | EMT03-039 | 24.25 | 21.12 | 2.31 | 1 | 0 | 0 | 9 | 0 |

TABLE 12-continued

Film Compatibility 1 mil films cast from 8 mil thickness from 25% solution from 4 different solvent blends

| | | | | | Resin | | | | |
|---|---|---|---|---|---|---|---|---|---|
| | | | | | Resimene CE-7103 | Resimene 755 | Desmophen 1800 | Bayer Desmodur 3300 | Cytec Cymel 303 |
| | | | | | | | CAB:Resin | | |
| | | | | | 1:1 | 1:1 | 1:1 | 1:1 | 1:1 |
| | | | | | | | Solvent | | |
| | | | | | Solvent 1 | Solvent 1 | Solvent 2 | Solvent 2 | Solvent 2 |
| | | Wt % | Wt % | Wt % | | | Type Resin | | |
| | | Bu | Ac | OH | Melamine-1 | Melamine-1 | Polyester-2 | Isocyanate-2 | Melamine-2 |
| HS-CAB-20 | EMT03-044 | 22.87 | 27.45 | 0.81 | 5 | 0 | 7 | 1 | 0 |
| HS-CAB-20 | EMT03-040 | 23.99 | 21.43 | 3.23 | 5 | 0 | 7 | 9 | 0 |

Solvent 1 = MEK/PMAc/EEP 5/4/1
Solvent 2 = MEK/Xylene/EEP 5/4/1
Solvent 3 = MEK/PMAc/Toluene 1/1/2
Solvent 4 = PMAc/EtOH/n-BuOH 2/1/1
0 = clear no haze;
1 = very slight have, only in bright light;
3 = slight haze in room;
5 = translucent;
7 = translucent and incompatible domains;
9 = hazy and incompatible;
10 = opaque

TABLE 13

Film Compatibility 1 mil films cast from 8 mil thickness from 25% solution from 4 different solvent blends

| | | | | | Resin | | | |
|---|---|---|---|---|---|---|---|---|
| | | | | | Eastman Polymac HS 5789 | Eastman Polymac HS 5761 | Eastman Duramac 5135 | Eastman Duramac 5731 |
| | | | | | | | CAB:Resin | |
| | | | | | 1:1 | 1:1 | 1:1 | 1:1 |
| | | | | | | | Solvent | |
| | | | | | Solvent 2 | Solvent 2 | Solvent 2 | Solvent 2 |
| | | | | | | | Type Resin | |
| | | Wt % Bu | Wt % Ac | Wt % OH | Polyester-2 | Polyester-2 | Medium SOYA oil alkyd-2 | Medium SOYA oil alkyd-2 |
| CAB 381-0.1 | Commercial | 39.87* | 12.90* | 1.61* | 0 | 0 | 0 | 5 |
| CAB 551-0.01 | Commercial | 55.06* | 1.07* | 1.50* | 0 | 0 | 1 | 3 |
| HS-CAB-38 | EMT02-158 | 39.51 | 11.21 | 2.16 | 0 | 0 | 7 | 3 |
| HS-CAB-38 | EMT03-030 | 35.01 | 13.42 | 3.51 | 0 | 0 | 9 | 7 |
| HS-CAB-38 | EMT02-162 | 39.73 | 11.5 | 1.13 | 0 | 0 | 7 | 3 |
| HS-CAB-55 | EMT02-105 | 53.88 | 2.52 | 1.09 | 0 | 0 | 0 | 0 |
| HS-CAB-55 | EMT02-117 | 54.1 | 2.21 | 1.19 | 0 | 0 | 0 | 0 |
| HS-CAB-55 | EMT02-131 | 54.59 | 2.36 | 3.1 | 0 | 0 | 7 | 3 |
| HS-CAB-55 | EMT02-133 | 51.82 | 2.85 | 2.49 | 0 | 0 | 0 | 3 |
| HS-CAB-55 | EMT02-169 | 45.39 | 3.56 | 4.61 | 0 | 0 | 9 | 9 |
| HS-CAB-46 | EMT03-077 | 47.36 | 6.44 | 2.23 | 0 | 0 | 1 | 3 |
| HS-CAB-46 | EMT02-062 | 44.18 | 7.24 | 3.1 | 0 | 0 | 7 | 9 |
| HS-CAB-29 | EMT03-059 | 28.72 | 17.17 | 3.83 | 0 | 0 | 9 | 9 |
| HS-CAB-29 | EMT03-051 | 29.38 | 18.37 | 1.81 | 0 | 0 | 7 | 7 |
| HS-CAB-20 | EMT03-042 | 21.71 | 23.93 | 1.32 | 9 | 9 | 9 | 9 |
| HS-CAB-20 | EMT03-039 | 24.25 | 21.12 | 2.31 | 0 | 0 | 9 | 7 |

TABLE 13-continued

Film Compatibility 1 mil films cast from 8 mil thickness from 25% solution from 4 different solvent blends

| | | Wt % Bu | Wt % Ac | Wt % OH | Resin | | | |
|---|---|---|---|---|---|---|---|---|
| | | | | | Eastman Polymac HS 5789 | Eastman Polymac HS 5761 | Eastman Duramac 5135 | Eastman Duramac 5731 |
| | | | | | CAB:Resin | | | |
| | | | | | 1:1 | 1:1 | 1:1 | 1:1 |
| | | | | | Solvent | | | |
| | | | | | Solvent 2 | Solvent 2 | Solvent 2 | Solvent 2 |
| | | | | | Type Resin | | | |
| | | | | | Polyester-2 | Polyester-2 | Medium SOYA oil alkyd-2 | Medium SOYA oil alkyd-2 |
| HS-CAB-20 | EMT03-044 | 22.87 | 27.45 | 0.81 | 9 | 9 | 7 | 7 |
| HS-CAB-20 | EMT03-040 | 23.99 | 21.43 | 3.23 | 0 | 0 | 9 | 9 |

Solvent 1 = MEK/PMAc/EEP 5/4/1
Solvent 2 = MEK/Xylene/EEP 5/4/1
Solvent 3 = MEK/PMAc/Toluene 1/1/2
Solvent 4 = PMAc/EtOH/n-BuOH 2/1/1
0 = clear no haze;
1 = very slight have, only in bright light;
3 = slight haze in room;
5 = translucent;
7 = translucent and incompatible domains;
9 = hazy and incompatible;
10 = opaque

TABLE 14

Film Compatibility 1 mil films cast from 8 mil thickness from 25% solution from 4 different solvent blends

| | | Wt % Bu | Wt % Ac | Wt % OH | Resin | | | | |
|---|---|---|---|---|---|---|---|---|---|
| | | | | | Eastman Duramac 5359 | Shell Epon 1001F | Dow DER 542 | Rhodia XIDT | Bayer Desmodur IL |
| | | | | | CAB:Resin | | | | |
| | | | | | 1:1 | 1:1 | 1:1 | 1:1 | 1:1 |
| | | | | | Solvent | | | | |
| | | | | | Solvent 2 | Solvent 2 | Solvent 2 | Solvent 2 | Solvent 2 |
| | | | | | Type Resin | | | | |
| | | | | | Styrenated alkyd-2 | Epoxy-2 | Epoxy-2 | Isocyanate-2 | Isocyanate-2 |
| CAB 381-0.1 | Commercial | 39.87* | 12.90* | 1.61* | 9 | 5 | 0 | 3 | 9 |
| CAB 551-0.01 | Commercial | 55.06* | 1.07* | 1.50* | 0 | 0 | 0 | 0 | 10 |
| HS-CAB-38 | EMT02-158 | 39.51 | 11.21 | 2.16 | 3 | 5 | 0 | 0 | 0 |
| HS-CAB-38 | EMT03-030 | 35.01 | 13.42 | 3.51 | 9 | 5 | 0 | 5 | 0 |
| HS-CAB-38 | EMT02-162 | 39.73 | 11.5 | 1.13 | 3 | 5 | 0 | 0 | 0 |
| HS-CAB-55 | EMT02-105 | 53.88 | 2.52 | 1.09 | 0 | 5 | 0 | 0 | 9 |
| HS-CAB-55 | EMT02-117 | 54.1 | 2.21 | 1.19 | 0 | 5 | 0 | 0 | 9 |
| HS-CAB-55 | EMT02-131 | 54.59 | 2.36 | 3.1 | 3 | 5 | 0 | 0 | 0 |
| HS-CAB-55 | EMT02-133 | 51.82 | 2.85 | 2.49 | 0 | 3 | 0 | 0 | 3 |
| HS-CAB-55 | EMT02-169 | 45.39 | 3.56 | 4.61 | 9 | 3 | 0 | 3 | 0 |
| HS-CAB-46 | EMT03-077 | 47.36 | 6.44 | 2.23 | 0 | 3 | 0 | 0 | 0 |
| HS-CAB-46 | EMT02-062 | 44.18 | 7.24 | 3.1 | 7 | 3 | 0 | 0 | 0 |
| HS-CAB-29 | EMT03-059 | 28.72 | 17.17 | 3.83 | 9 | 9 | 3 | 9 | 0 |
| HS-CAB-29 | EMT03-051 | 29.38 | 18.37 | 1.81 | 7 | 5 | 0 | 3 | 0 |
| HS-CAB-20 | EMT03-042 | 21.71 | 23.93 | 1.32 | 9 | 7 | 0 | 9 | 0 |
| HS-CAB-20 | EMT03-039 | 24.25 | 21.12 | 2.31 | 9 | 3 | 0 | 9 | 0 |

TABLE 14-continued

Film Compatibility 1 mil films cast from 8 mil thickness from 25% solution from 4 different solvent blends

| | | Wt % Bu | Wt % Ac | Wt % OH | Resin | | | | |
|---|---|---|---|---|---|---|---|---|---|
| | | | | | Eastman Duramac 5359 | Shell Epon 1001F | Dow DER 542 | Rhodia XIDT | Bayer Desmodur IL |
| | | | | | CAB:Resin | | | | |
| | | | | | 1:1 | 1:1 | 1:1 | 1:1 | 1:1 |
| | | | | | Solvent | | | | |
| | | | | | Solvent 2 | Solvent 2 | Solvent 2 | Solvent 2 | Solvent 2 |
| | | | | | Type Resin | | | | |
| | | | | | Styrenated alkyd-2 | Epoxy-2 | Epoxy-2 | Isocyanate-2 | Isocyanate-2 |
| HS-CAB-20 | EMT03-044 | 22.87 | 27.45 | 0.81 | 9 | 7 | 0 | 9 | 0 |
| HS-CAB-20 | EMT03-040 | 23.99 | 21.43 | 3.23 | 9 | 7 | 0 | 9 | 0 |

Solvent 1 = MEK/PMAc/EEP 5/4/1
Solvent 2 = MEK/Xylene/EEP 5/4/1
Solvent 3 = MEK/PMAc/Toluene 1/1/2
Solvent 4 = PMAc/EtOH/n-BuOH 2/1/1
0 = clear no haze;
1 = very slight have, only in bright light;
3 = slight haze in room;
5 = translucent;
7 = translucent and incompatible domains;
9 = hazy and incompatible;
10 = opaque

TABLE 15

Film Compatibility 1 mil films cast from 8 mil thickness from 25% solution from 4 different solvent blends

| | | Wt % Bu | Wt % Ac | Wt % OH | Resin | | |
|---|---|---|---|---|---|---|---|
| | | | | | Eastman Carbamac HS4372 | UCC UCAR VYHD | UCAR VMCH |
| | | | | | CAB:Resin | | |
| | | | | | 1:1 | 1:1 | 1:1 |
| | | | | | Solvent | | |
| | | | | | Solvent 2 | Solvent 3 | Solvent 3 |
| | | | | | Type Resin | | |
| | | | | | Polyurethane-2 | Vinyl chloride/Vinyl acetate-3 | Vinyl chloride/Vinyl acetate-3 |
| CAB 381-0.1 | Commercial | 39.87* | 12.90* | 1.61* | 7 | | |
| CAB 551-0.01 | Commercial | 55.06* | 1.07* | 1.50* | 9 | | |
| HS-CAB-38 | EMT02-158 | 39.51 | 11.21 | 2.16 | 1 | 7 | 7 |
| HS-CAB-38 | EMT03-030 | 35.01 | 13.42 | 3.51 | 5 | 7 | 7 |
| HS-CAB-38 | EMT02-162 | 39.73 | 11.5 | 1.13 | 3 | 7 | 3 |
| HS-CAB-55 | EMT02-105 | 53.88 | 2.52 | 1.09 | 1 | 7 | 3 |
| HS-CAB-55 | EMT02-117 | 54.1 | 2.21 | 1.19 | 3 | 7 | 7 |
| HS-CAB-55 | EMT02-131 | 54.59 | 2.36 | 3.1 | 5 | 7 | 7 |
| HS-CAB-55 | EMT02-133 | 51.82 | 2.85 | 2.49 | 3 | 7 | 3 |
| HS-CAB-55 | EMT02-169 | 45.39 | 3.56 | 4.61 | 7 | 7 | 7 |
| HS-CAB-46 | EMT03-077 | 47.36 | 6.44 | 2.23 | 3 | 7 | 3 |
| HS-CAB-46 | EMT02-062 | 44.18 | 7.24 | 3.1 | 7 | 7 | 7 |
| HS-CAB-29 | EMT03-059 | 28.72 | 17.17 | 3.83 | 5 | 7 | 3 |
| HS-CAB-29 | EMT03-051 | 29.38 | 18.37 | 1.81 | 7 | 7 | 3 |
| HS-CAB-20 | EMT03-042 | 21.71 | 23.93 | 1.32 | 7 | 7 | 3 |
| HS-CAB-20 | EMT03-039 | 24.25 | 21.12 | 2.31 | 7 | 7 | 3 |

TABLE 15-continued

Film Compatibility 1 mil films cast from 8 mil thickness from 25% solution from 4 different solvent blends

| | | Wt % Bu | Wt % Ac | Wt % OH | Eastman Carbamac HS4372 CAB:Resin 1:1 Solvent 2 Type Resin Polyurethane-2 | UCC UCAR VYHD CAB:Resin 1:1 Solvent 3 Type Resin Vinyl chloride/Vinyl acetate-3 | UCAR VMCH CAB:Resin 1:1 Solvent 3 Type Resin Vinyl chloride/Vinyl acetate-3 |
|---|---|---|---|---|---|---|---|
| HS-CAB-20 | EMT03-044 | 22.87 | 27.45 | 0.81 | 7 | 3 | 3 |
| HS-CAB-20 | EMT03-040 | 23.99 | 21.43 | 3.23 | 7 | 7 | 3 |

Solvent 1 = MEK/PMAc/EEP 5/4/1
Solvent 2 = MEK/Xylene/EEP 5/4/1
Solvent 3 = MEK/PMAc/Toluene 1/1/2
Solvent 4 = PMAc/EtOH/n-BuOH 2/1/1
0 = clear no haze;
1 = very slight have, only in bright light;
3 = slight haze in room;
5 = translucent;
7 = translucent and incompatible domains;
9 = hazy and incompatible;
10 = opaque

TABLE 16

Film Compatibility 1 mil films cast from 8 mil thickness from 25% solution from 4 different solvent blends

| | | Wt % Bu | Wt % Ac | Wt % OH | DuPont LVAX 40 CAB:Resin 1:1 Solvent 3 Type Resin Vinyl chloride/Vinyl acetate-3 | Henkle Verasmid 750 CAB:Resin 1:1 Solvent 4 Type Resin Polyamide-4 |
|---|---|---|---|---|---|---|
| CAB 381-0.1 | Commercial | 39.87* | 12.90* | 1.61* | | |
| CAB 551-0.01 | Commercial | 55.06* | 1.07* | 1.50* | | |
| HS-CAB-38 | EMT02-158 | 39.51 | 11.21 | 2.16 | 3 | 5 |
| HS-CAB-38 | EMT03-030 | 35.01 | 13.42 | 3.51 | 7 | 5 |
| HS-CAB-38 | EMT02-162 | 39.73 | 11.5 | 1.13 | 3 | 3 |
| HS-CAB-55 | EMT02-105 | 53.88 | 2.52 | 1.09 | 5 | 3 |
| HS-CAB-55 | EMT02-117 | 54.1 | 2.21 | 1.19 | 5 | 5 |
| HS-CAB-55 | EMT02-131 | 54.59 | 2.36 | 3.1 | 5 | 5 |
| HS-CAB-55 | EMT02-133 | 51.82 | 2.85 | 2.49 | 5 | 5 |
| HS-CAB-55 | EMT02-169 | 45.39 | 3.56 | 4.61 | 3 | 5 |
| HS-CAB-46 | EMT03-077 | 47.36 | 6.44 | 2.23 | 5 | 5 |
| HS-CAB-46 | EMT02-062 | 44.18 | 7.24 | 3.1 | 5 | 3 |
| HS-CAB-29 | EMT03-059 | 28.72 | 17.17 | 3.83 | 5 | 5 |
| HS-CAB-29 | EMT03-051 | 29.38 | 18.37 | 1.81 | 5 | 5 |
| HS-CAB-20 | EMT03-042 | 21.71 | 23.93 | 1.32 | 5 | 5 |
| HS-CAB-20 | EMT03-039 | 24.25 | 21.12 | 2.31 | 5 | 5 |

TABLE 16-continued

Film Compatibility 1 mil films cast from 8 mil thickness from 25% solution from 4 different solvent blends

| | | Wt % Bu | Wt % Ac | Wt % OH | Resin DuPont LVAX 40 CAB:Resin 1:1 Solvent Solvent 3 Type Resin Vinyl chloride/Vinyl acetate-3 | Resin Henkle Verasmid 750 CAB:Resin 1:1 Solvent Solvent 4 Type Resin Polyamide-4 |
|---|---|---|---|---|---|---|
| HS-CAB-20 | EMT03-044 | 22.87 | 27.45 | 0.81 | 5 | 7 |
| HS-CAB-20 | EMT03-040 | 23.99 | 21.43 | 3.23 | 5 | 3 |

Solvent 1 = MEK/PMAc/EEP 5/4/1
Solvent 2 = MEK/Xylene/EEP 5/4/1
Solvent 3 = MEK/PMAc/Toluene 1/1/2
Solvent 4 = PMAc/EtOH/n-BuOH 2/1/1
0 = clear no haze;
1 = very slight have, only in bright light;
3 = slight haze in room;
5 = translucent;
7 = translucent and incompatible domains;
9 = hazy and incompatible;
10 = opaque

Example 49

Solubility of Various HS-CAB's

The HS-CAB's described in Tables 2-3 (Examples 1-27) are treated with solvents and solvent blends (0.2 g of ester in 1.8 g of solvent) to prepare 10 wt % solutions of the CAB's and conventional CAB's (CAB-381-0.1 and CAB-551-0.01). The samples are placed on a roller overnight to allow them to go into solution. Samples are removed from the roller and the solubility of each HS-CAB in each solvent or solvent blend is determined according to the following criteria:

1=Insoluble; 3=Partially Soluble; 5=Gels; 7=Soluble, Hazy; 9=Soluble, Clear. The results of the solubility studies are presented in Tables 17-19.

TABLE 17

| | CAB 171-15S | CAB 381-0.1 | CAB 551-0.01 | EMT02-105 HS-CAB-55 | EMT2-158 HS-CAB-38 | EMT03-030 HS-CAB-38 | EMT02-117 HS-CAB-55 | EMT02-162 HS-CAB-38 | EMT02-131 HS-CAB-55 |
|---|---|---|---|---|---|---|---|---|---|
| Wt % Bu | | | | 53.88 | 39.51 | 35.01 | 54.1 | 39.73 | 54.59 |
| Wt % Ac | | | | 2.52 | 11.21 | 13.42 | 2.21 | 11.5 | 2.36 |
| Wt % OH | | | | 1.09 | 2.16 | 3.51 | 1.19 | 1.13 | 3.1 |
| Isopropyl alcohol/water 90/10 | 1 | 1 | 1 | 1 | 3 | 9 | 1 | 1 | 9 |
| C-11 ketone | 1 | 1 | 9 | 9 | 9 | 3 | 9 | 5 | 5 |
| DIBK | 1 | 1 | 9 | 9 | 7 | 3 | 9 | 9 | 9 |
| PP | 1 | 1 | 9 | 9 | 9 | 9 | 9 | 9 | 9 |
| EP | 1 | 1 | 9 | 9 | 9 | 9 | 9 | 9 | 9 |
| EB | 1 | 1 | 9 | 9 | 9 | 9 | 9 | 7 | 9 |
| MeOH | 1 | 1 | 1 | 1 | 9 | 9 | 3 | 3 | 9 |
| Tescol C (95) | 1 | 1 | 1 | 3 | 1 | 3 | 3 | 1 | 9 |
| Toluene | 1 | 1 | 5 | 9 | 9 | 3 | 9 | 9 | 9 |
| Xylene | 1 | 1 | 1 | 1 | 1 | 1 | 1 | 1 | 1 |

TABLE 18

| | CAB 171-15S | CAB 381-0.1 | CAB 551-0.01 | EMT03-042 HS-CAB-20 | EMT03-059 HS-CAB-29 | EMT03-077 HS-CAB-46 | EMT03-051 HS-CAB-29 | EMT02-133 HS-CAB-55 |
|---|---|---|---|---|---|---|---|---|
| Wt % Bu | | | | 21.71 | 28.72 | 47.36 | 29.38 | 51.82 |
| Wt % Ac | | | | 23.93 | 17.17 | 6.44 | 18.37 | 2.85 |
| Wt % OH | | | | 1.32 | 3.83 | 2.23 | 1.81 | 2.49 |

TABLE 18-continued

|  | CAB 171-15S | CAB 381-0.1 | CAB 551-0.01 | EMT03-042 HS-CAB-20 | EMT03-059 HS-CAB-29 | EMT03-077 HS-CAB-46 | EMT03-051 HS-CAB-29 | EMT02-133 HS-CAB-55 |
|---|---|---|---|---|---|---|---|---|
| Isopropyl alcohol/ water 90/10 | 1 | 1 | 1 | 1 | 3 | 9 | 1 | 9 |
| C-11 ketone | 1 | 1 | 9 | 1 | 1 | 9 | 1 | 9.1 |
| DIBK | 1 | 1 | 9 | 1 | 1 | 9 | 1 | .1 |
| PP | 1 | 1 | 9 | 5 | 5 | 9 | 7 | 9.9 |
| EP | 1 | 1 | 9 | 9 | 1 | 9 | 9 | 9.9 |
| EB | 1 | 1 | 9 | 3 | 9 | 9 | 3 | 9.9 |
| MeOH | 1 | 1 | 1 | 1 | 9 | 9 | 1 | 9.9 |
| Tescol C (95) | 1 | 1 | 1 | 1 | 1 | 9 | 1 | 9.9 |
| Toluene | 1 | 1 | 5 | 3 | 1 | 9 | 1 | 9.1 |
| Xylene | 1 | 1 | 1 | 1 | 1 | 1 | 1 | 1.1 |

TABLE 19

|  | CAB 171-15S | CAB 381-0.1 | CAB 551-0.01 | EMT03-039 HS-CAB-20 | EMT03-044 HS-CAB-20 | EMT02-169 HS-CAB-55 | EMT03-062 HS-CAB-46 | EMT03-040 HS-CAB-20 |
|---|---|---|---|---|---|---|---|---|
| Wt % Bu |  |  |  | 24.25 | 22.87 | 45.39 | 44.18 | 23.99 |
| Wt % Ac |  |  |  | 21.12 | 27.45 | 3.56 | 7.24 | 21.43 |
| Wt % OH |  |  |  | 2.31 | 0.81 | 4.61 | 3.1 | 3.23 |
| Isopropyl alcohol/water 90/10 | 1 | 1 | 1 | 1 | 1 | 9 | 9 | 1 |
| C-11 ketone | 1 | 1 | 9 | 1 | 1 | 9 | 5 | 1 |
| DIBK | 1 | 1 | 9 | 1 | 1 | 3 | 3 | 1 |
| PP | 1 | 1 | 9 | 5 | 7 | 9 | 9 | 5 |
| EP | 1 | 1 | 9 | 9 | 1 | 9 | 9 | 9 |
| EB | 1 | 1 | 9 | 3 | 3 | 9 | 9 | 3 |
| MeOH | 1 | 1 | 1 | 1 | 1 | 9 | 9 | 1 |
| Tescol C (95) | 1 | 1 | 1 | 1 | 1 | 9 | 9 | 1 |
| Toluene | 1 | 1 | 5 | 3 | 3 | 3 | 3 | 3 |
| Xylene | 1 | 1 | 1 | 1 | 1 | 3 | 1 | 1 |

| Esters | | | | | | | |
|---|---|---|---|---|---|---|---|
|  | EMT02-105 HS-CAB-55 | EMT2-158 HS-CAB-38 | EMT03-030 HS-CAB-38 | EMT02-117 HS-CAB-55 | EMT02-162 HS-CAB-38 | EMT02-131 HS-CAB-55 | EMT03-042 HS-CAB-20 |
| Isopropyl alcohol/ water 90/10 | 1 | 3 | 9 | 1 | 1 | 9 | 1 |
| C-11 ketone | 9 | 9 | 3 | 9 | 5 | 5 | 1 |
| DIBK | 9 | 7 | 3 | 9 | 9 | 9 | 1 |
| PP | 9 | 9 | 9 | 9 | 9 | 9 | 5 |
| EP | 9 | 9 | 9 | 9 | 9 | 9 | 9 |
| EB | 9 | 9 | 9 | 9 | 7 | 9 | 3 |
| MeOH | 1 | 9 | 9 | 3 | 3 | 9 | 1 |
| Tescol C (95) | 3 | 1 | 3 | 3 | 1 | 9 | 1 |
| Toluene | 9 | 9 | 3 | 9 | 9 | 9 | 3 |
| Xylene | 1 | 1 | 1 | 1 | 1 | 1 | 1 |
| n-butyl acetate | 9 | 9 | 9 | 9 | 9 | 9 | 7 |
| Ethyl acetate | 9 | 9 | 7 | 9 | 9 | 9 | 7 |
| Texanol | 9 | 9 | 9 | 9 | 9 | 9 | 3 |
| 2-EH acetate | 9 | 9 | 3 | 9 | 9 | 9 | 1 |
| EEP | 9 | 9 | 7 | 9 | 9 | 9 | 7 |
| PM | 9 | 9 | 9 | 9 | 9 | 9 | 7 |
| PB | 9 | 9 | 9 | 9 | 9 | 9 | 7 |
| PM acetate | 9 | 9 | 9 | 9 | 9 | 9 | 7 |
| EB acetate | 9 | 9 | 9 | 9 | 9 | 9 | 7 |
| MPK | 9 | 9 | 7 | 9 | 9 | 9 | 7 |
| MEK | 9 | 9 | 9 | 9 | 9 | 9 | 7 |
| MAK | 9 | 9 | 9 | 9 | 9 | 9 | 7 |
| Acetone | 9 | 9 | 9 | 7 | 9 | 9 | 9 |

| Esters | | | | | | | |
|---|---|---|---|---|---|---|---|
|  | EMT03-059 HS-CAB-29 | EMT03-077 HS-CAB-46 | EMT03-051 HS-CAB-29 | EMT02-133 HS-CAB-55 | EMT03-039 HS-CAB-20 | EMT03-044 HS-CAB-20 | EMT02-169 HS-CAB-55 |
| Isopropyl alcohol/ water 90/10 | 3 | 9 | 1 | 9 | 1 | 1 | 9 |
| C-11 ketone | 1 | 9 | 1 | 9 | 1 | 1 | 9 |
| DIBK | 1 | 9 | 1 | 1 | 1 | 1 | 3 |

TABLE 19-continued

| | | | | | | | |
|---|---|---|---|---|---|---|---|
| PP | 5 | 9 | 7 | 9 | 5 | 7 | 9 |
| EP | 1 | 9 | 9 | 9 | 9 | 1 | 9 |
| EB | 9 | 9 | 3 | 9 | 3 | 3 | 9 |
| MeOH | 9 | 9 | 1 | 9 | 1 | 1 | 9 |
| Tescol C (95) | 1 | 9 | 1 | 9 | 1 | 1 | 9 |
| Toluene | 1 | 9 | 1 | 9 | 3 | 3 | 3 |
| Xylene | 1 | 1 | 1 | 1 | 1 | 1 | 3 |
| n-butyl acetate | 9 | 9 | 7 | 9 | 5 | 7 | 9 |
| Ethyl acetate | 9 | 9 | 9 | 9 | 7 | 7 | 9 |
| Texanol | 3 | 9 | 9 | 9 | 7 | 1 | 9 |
| 2-EH acetate | 1 | 9 | 1 | 9 | 1 | 1 | 3 |
| EEP | 9 | 9 | 7 | 9 | 7 | 7 | 9 |
| PM | 9 | 9 | 9 | 9 | 7 | 7 | 9 |
| PB | 9 | 9 | 9 | 9 | 7 | 7 | 9 |
| PM acetate | 9 | 9 | 9 | 9 | 9 | 7 | 9 |
| EB acetate | 9 | 9 | 9 | 9 | 9 | 7 | 9 |
| MPK | 9 | 9 | 9 | 9 | 7 | 7 | 7 |
| MEK | 9 | 9 | 9 | 9 | 9 | 7 | 9 |
| MAK | 5 | 9 | 7 | 9 | 7 | 7 | 9 |
| Acetone | 9 | 9 | 9 | 9 | 9 | 9 | 9 |

| | Esters | |
|---|---|---|
| | EMT03-062 | EMT03-040 |
| Isopropyl alcohol/water 90/10 | 9 | 1 |
| C-11 ketone | 5 | 1 |
| DIBK | 3 | 1 |
| PP | 9 | 5 |
| EP | 9 | 9 |
| EB | 9 | 3 |
| MeOH | 9 | 1 |
| Tescol C (95) | 9 | 1 |
| Toluene | 3 | 3 |
| Xylene | 1 | 1 |
| n-butyl acetate | 9 | 5 |
| Ethyl acetate | 9 | 7 |
| Texanol | 9 | 7 |
| 2-EH acetate | 5 | 1 |
| EEP | 9 | 7 |
| PM | 9 | 9 |
| PB | 9 | 7 |
| PM acetate | 9 | 9 |
| EB acetate | 9 | 9 |
| MPK | 9 | 7 |
| MEK | 9 | 9 |
| MAK | 9 | 9 |
| Acetone | 9 | 9 |

Example 50

Inventive HS-CAB-17 and HS-HS-CAB-38 esters are evaluated as pigment grinding vehicles for inks or coating.

Eight millbases and eight ink formulations are prepared as described in Table 20. Compared to conventional CAB grades, color development (color strength) of inventive HS-CAB's is equal or better.

TABLE 20

| | 291-1 | 291-2 | 291-3 | 291-4 | 291-5 | 291-6 | 291-7 | 291-8 |
|---|---|---|---|---|---|---|---|---|
| Millbases | | | | | | | | |
| CAB-381-0.1 Solution (290-1) | 25 | | | | 25 | | | |
| HS-CAB-38 Solution (290-2) | | 25 | | | | 25 | | |
| CAB-171-15 Solution (290-5) | | | 25 | | | | 25 | |
| HS-CAB-20 Solution (290--6) | | | | 25 | | | | 25 |
| Blue 15:3 Pigment (Aarbor) | | | | | 25 | 25 | 25 | 25 |
| VT8015 Violet Pigment (Uhlich) | 25 | 25 | 25 | 25 | | | | |
| Ethanol/Ethyl Acetate (70:30) Blend | 50 | 50 | | | 50 | 50 | | |
| Ethyl Acetate/Ethanol (70:30) Blend | | | 50 | 50 | | | 50 | 50 |
| Total | 100 | 100 | 100 | 100 | 100 | 100 | 100 | 100 |
| INKS | | | | | | | | |
| Millbases | 50 | 50 | 50 | 50 | 50 | 50 | 50 | 50 |
| CAB-381-0.1 Solution (290-1) | 35 | | | | 50 | | | |

TABLE 20-continued

|  | 291-1 | 291-2 | 291-3 | 291-4 | 291-5 | 291-6 | 291-7 | 291-8 |
|---|---|---|---|---|---|---|---|---|
| HS-CAB-38 Solution (290-2) |  | 35 |  |  |  | 35 |  |  |
| CAB-171-15 Solution (290-5) |  |  | 35 |  |  |  | 35 |  |
| HS-CAB-20 Solution (290-6) |  |  |  | 35 |  |  |  | 35 |
| Ethanol/Ethyl Acetate (70:30) Blend | 15 | 15 |  |  | 15 | 15 |  |  |
| Ethyl Acetate/Ethanol (70:30) Blend |  |  | 15 | 15 |  |  | 15 | 15 |
| Total | 100 | 100 | 100 | 100 | 115 | 100 | 100 | 100 |
| Color Strength (bleached white, %) | 100 | 100 | 100 | 100 | 80 | 100 | 80 | 100 |
| Transparency on Leneta (RK #2) | 1 | 1 | 1 | 1 | 3 | 2 | 1 | 1 |
| Gloss @ 60 on Leneta White (RK #2) | 6 | 1.2 | 1.4 | 1.1 | 36 | 40 | 32 | 23 |
| Gloss @ 60 on C1S | 7 | 1.4 | 1.4 | 0.7 | 34 | 37 | 31 | 32 |
| Adhesion on Leneta Black | 5 | 1 | 4 | 1 | 5 | 2 | 5 | 2 |
| Adhesion on Leneta White | 5 | 2 | 3 | 2 | 5 | 2 | 1 | 2 |
| Adhesion on PP | 4 | 2 | 1 | 2 | 4 | 1 | 1 | 3 |
| Adhesion on White PE | 1 | 3 | 1 | 2 | 1 | 2 | 1 | 3 |
| Block Resistance (F.) @ 40 psi, 1 sec on C1S | 270 | 230 | 400+ | 400+ | 270 | 230 | 400+ | 400+ |
| Water Resistance on PP | 5 | 5 | 5 | 5 | 5 | 4 | 5 | 5 |
| Water Resistance on White PE | 5 | 3 | 5 | 5 | 5 | 3 | 5 | 5 |
| Alcohol Resistance on PP | 1 | 1 | 1 | 1 | 1 | 1 | 1 | 1 |
| Alcohol Resistance on White PE | 1 | 1 | 1 | 1 | 1 | 1 | 1 | 1 |
| Alkali Resistance on PP | 5 | 5 | 5 | 5 | 5 | 4 | 5 | 5 |
| Alkali Resistance on White PE | 5 | 1 | 5 | 5 | 5 | 2 | 5 | 4 |
| 409 Resistance on PP | 5 | 5 | 4 | 1 | 5 | 3 | 3 | 4 |
| 409 Resistance on White PE | 4 | 3 | 1 | 1 | 2 | 1 | 5 | 1 |

Rating:
1 = Poor;
5 = Excellent
Samples are ranked relative to a standard.

Example 51

Improved Melt Stability of HS-CAB's

An inventive HS-CAB-38, having a glass transition temperature ($T_g$) of 89° C. and a melt temperature of 120° C., is placed on a preheated 2-roll horizontal mill (80° C.). The HS-CAB powder adheres to the Roll and the temperature is gradually increased until the HS-CAB begins to soften and flow (~100° C.). It is noted that this material appears to have good thermal stability. After nearly 30 minutes on the mill, the CAB has not yellowed.

Example 52

HS-CAP-48: High Propionyl, Low DP CAP

A 2 L-reaction kettle was charged with a propionic acid-wet activated cellulose (311.77 g total, 160 g dry cellulose), prepared according to Example 1, except that the butyric acid wash was replaced with a propionic acid wash. Propionic acid (262.5 g) and acetic acid (5.22 g) were added to the kettle. The mixture was cooled to −10° C. A mixture of propionic anhydride (757.69 g) and sulfuric acid (5.44 g) were cooled to −30° C. and then added to the reaction kettle. The mixture was stirred for 1 hour at room temperature. The mixture was then heated to 70° C. Sulfuric acid (5.44 g) was added to the clear dope approximately 1 hour after the room temperature hold. The mixture was then stirred at 70° C. and stirred for 3 hours and 52 minutes. A mixture of water (182.5 g) and acetic acid (498.4 g) was slowly added to the clear "dope." The mixture was stirred for 24 hours at 70° C. The catalyst was neutralized by the addition of $Mg(OAc)_4$ (14.1 g) dissolved in HOAc (475 g) and water (195 g). The neutralized dope was filtered at approximately 50° C. through a glass wool-covered coarse fritted funnel. The product was precipitated by pouring, with rapid mixing, the clear, neutralized dope into 20-30 volumes of water. Decanting away the filtration liquid and adding fresh deionized water and then allowing the precipitate to stand in the fresh water for several hours hardened the precipitate. The precipitate was washed extensively with deionized water for at least 2 hours. The product was dried in a vacuum oven at approximately 50° C. overnight. The product had the following composition: $DS_{Pr}$=1.75; $DS_{Ac}$=0.22; $M_n$=3887; $M_w$=7036; Polydispersity=1.81; IV (PM95)=0.086.

Example 53

Coating Formulations with HS-CAB-38 and Evaluation

Clearcoat formulations are prepared according to Tables 21-22 and the resulting coatings are evaluated to determine the effect different levels of HS-CAB-38 (Sample 4, Table 4) have on dry-to-touch time, hardness development, and gloss.

TABLE 21

| Solvent Blend | |
|---|---|
| n-Butyl Acetate | 66.0 |
| Xylene | 34.0 |
| Total | 100.0 |

TABLE 22

| Formulations with HS-CAB-38 | | | | |
|---|---|---|---|---|
|  | 0% CAB | 2% CAB | 4% CAB | 8% CAB |
| Synocure 851 S (60%) (Xylene: n-Butyl Acetate) (2:1) | 48.8 | 48.5 | 47 | 46 |
| HS-CAB-38 (50%) (n-Butyl Acetate) | — | 1.2 | 2.3 | 4.8 |
| Eastman EEP[1] | 4.1 | 4 | 3.9 | 3.8 |

TABLE 22-continued

Formulations with HS-CAB-38

|  | 0% CAB | 2% CAB | 4% CAB | 8% CAB |
|---|---|---|---|---|
| Solvent blend | 27.4 | 26.6 | 27.5 | 26.3 |
| Desmodur N 75 BA (75%) (n-Butyl Acetate) | 19.7 | 19.7 | 19.3 | 19.1 |
| Total | 100 | 100 | 100 | 100 |
| DIN 4 viscosity (seconds) | 19.5 | 19.7 | 19.2 | 19.5 |
| Theoretical % Total Solids Content | 44.1 | 44.5 | 43.8 | 44.3 |

(1)Ethyl 3-ethoxypropionate
Synocure 851 S: 4.5% OH content

Dry-To-Touch Time

Coatings re prepared (Tables 21-22) with an OH:NCO stoichiometry of 1:1, and a DIN 4 viscosity of 18-20 seconds. Coatings are prepared with 0% CAB and with 2%, 4% and 8% of the hydroxy-functional acrylic substituted with the HS-CABs. Each of the coatings is spray applied to Chemetall Gold Seal, high zinc phosphate 1.0 mm steel panels using a DeVilbiss JGA 545 spray gun at 55 psi air pressure. Three panels are coated for each test ratio, such that a range of dry film thickness including 45 μm is obtained. The dry-to-touch time is evaluated by a thumb print test (according to ASTM D 1640 section 7.4.2).

TABLE 23

Dry-To-Touch Time (Minutes)

| Example # |  | 0% CAB | 2% CAB | 4% CAB | 8% CAB |
|---|---|---|---|---|---|
| 53 | HS-CAB-38 | 230 | 207 | 184 | 180 |

The results of the dry-to-touch times are shown in Table 23. The shortest dry-to-touch times are achieved as the level of HS-CAB-38 (Sample 4, Table 4) is increased.

Hardness Development

Each of the panels is also assessed for hardness development by König pendulum hardness evaluations. Tests are carried out after 24 hours and continued every 24 hours up to 168 hours. The panels are stored at 23° C. during this period.

TABLE 24

Hardness Development with HS-CAB-38, König Pendulum Hardness (Seconds)

| Hours | 0% CAB | 2% CAB | 4% CAB | 8% CAB |
|---|---|---|---|---|
| 24 | 23 | 22 | 21 | 21 |
| 48 | 71 | 68 | 67 | 70 |
| 72 | 104 | 101 | 99 | 103 |
| 144 | 143 | 139 | 140 | 142 |
| 168 | 183 | 180 | 182 | 184 |

König pendulum hardness results are shown in Table 24. After 24 hours and at the end of the 7 days test period, the HS-CAB-38 content of each set of coatings has little effect on the König pendulum hardness.

Example 54

HS-CABs as Flow Additives in Automotive Monocoat Formulations: General Formulations A white-pigmented high solids coating using a hybrid acrylic-isocyanate-polyester system is developed which can be sprayed at 70% solids and 18 second Ford Cup #4 viscosity (Tables 25 and 26). An ultra high solids master batch consisting of TRONOX CR828 (titanium dioxide pigment), Rohm and Haas AU608X (acrylic polyol), and Sherwin-Williams US-2 solvent (paint thinner) are mixed together under high shear. To this, CAB, BYK® 325, or a combination of the two are added along with the isocyanate portion, (Bayer Desmodur N 3300) and Bayer Desmophen 800 (polyester polyol) used to keep the OH/CN balance. The Brookfield viscosities are measured at the same solids prior to the addition of the isocyanate. After the isocyanate is added, the spray viscosities are adjusted with the addition of Sherwin-Williams US-2 thinner to 18-20 second Ford Cup #4 and sprayed using a DeVibliss air assisted spray gun at 35 pounds of pressure. Two panels of each formulation are sprayed. After flash-off for 40 minutes at room temperature, the panels are baked in an oven at 82° C. (180° F.) for 30 minutes. Before any of the panels are tested, the baked panels are laid horizontally in a constant temperature-humidity room at 24° C. (70° F.) and 50% relative humidity for 7 days.

TABLE 25

Pigment Dispersion

| Rohm and Haas AU608X (OH Functional Acrylic) | 41.42 |
|---|---|
| TRONOX 828 (Titanium Dioxide Pigment) | 56.66 |
| Sherwin Williams US-2 Thinner | 1.92 |

The pigment dispersion is mixed in an Eiger High Speed Disperser until the particle size is <0.1 micron on a Hegmann gauge. This is achieved by mixing at 300 rpm for 5 minutes, allowing the solution to cool and repeating 5 times.

TABLE 26

5 formulations with 4 types of cellulose esters

|  | A: No CAB/ No BYK ® 325 | B: No CAB/ With BYK ® 325 | C: With CAB/No BYK ® 325 | D: With ½ CAB/With ½ BYK ® 325 | E: With CAB/With BYK ® 325 |
|---|---|---|---|---|---|
| Bayer Desmodur N 3390 | 15.04 | 15.04 | 15.04 | 15.04 | 15.04 |
| Pigment Dispersion (II above) | 57.84 | 57.84 | 57.84 | 57.84 | 57.84 |
| US-2 Thinner | 12.75 | 12.75 | 9.08 | 10.91 | 9.08 |

TABLE 26-continued

5 formulations with 4 types of cellulose esters

| | A: No CAB/ No BYK® 325 | B: No CAB/ With BYK® 325 | C: With CAB/No BYK® 325 | D: With ½ CAB/With ½ BYK® 325 | E: With CAB/With BYK® 325 |
|---|---|---|---|---|---|
| Bayer Desmophen 800 | 14.37 | 14.37 | 10.70 | 12.53 | 10.70 |
| CAB (50 wt % solution | 0 | 0 | 7.34 | 3.67 | 7.34 |
| BYK® 325 | 0 | 0.50 | 0 | .25 | 0.5 |
| Total | 100.00 | 100.50 | 100.00 | 100.25 | 100.50 |

Two panels are sprayed for each paint type (Table 26-Columns A, B, C, E) along with center point replicates, (formulation 26-D paints). The samples are tested for pencil hardness[1], pendulum rocker hardness (König),[2] Tukon Hardness (Knoops), orange peel, smoothness, gloss by wave guide measurements (long and short waves), gloss at 20 degrees and 60 degrees,[3] distinctness of image (DOI),[4] experimental solids, Brookfield viscosity,[5] Ford Cup viscosity, MEK Double Rubs,[6] thickness,[7] tape pull adhesion tests,[8] and a visual inspection for pinholes and craters.
[1]ASTM Method D3363-00, "Standard Test Method for film hardness by pencil test."
[2]ASTM Method D4366-95, "Standard Test Methods for hardness of Organic Coatings by Pendulum Damping Tests."
[3]ASTM Method D523-89 (1999), "Standard Test Method for Specular Gloss."
[4]ASTM Method D5767-95 (1999), "Standard Test Methods for Instrumental Measurement of Distinctness-of-Image Gloss of Coating Surfaces."
[5]ASTM Method D2196, "Test Methods for Rheological Properties of Non-Newtonian Materials by Rotational (Brookfield) Viscometer."
[6]ASTM Method 5402, "Practice of Assessing the Solvent Resistance of Organic Coatings Using Solvent Rubs."
[7]ASTM Method D1186, "Test Method for Nondestructive Measurement of Dry film thickness of Nonmagnetic Coating Applied to a Ferrous Base."
[8]ASTM Method D3359, "Test Methods for Measuring Adhesion by Tape Test."

HS-CAB-55 (Sample 5, Table 4) and HS-CAB-38 (Sample 4, Table 4) provide the same anti-cratering, anti-mounding and anti-pinholing property as CAB-381-0.1 and CAB-551-0.01 yet at much higher application solids. All the panels which do not contain cellulose ester have pinholes or craters. HS-CAB-55 and HS-CAB-38 do not hurt the adhesion of paint to the substrate. Furthermore, HS-CAB-38 and HS-CAB-55 do not hurt Tukon hardness, as no samples are found to be significantly worse than others. 20 and 60 degree Specular Gloss are not hurt by the addition of HS-CAB-38 or HS-CAB-55. The addition of CAB-381-0.1 hurts 20 degree gloss values when compared to all other samples. Gloss by short-wave Wave-Scan measurements indicate that HS-CAB-38 and HS-CAB-55 are the smoothest samples. They are considerably better than standard cellulose esters yet the solids are much higher.

Examples 55-59

Pigmented Thermoplastic Automotive Basecoat

HS-CAB-17 (Sample 3, Table 4) and HS-CAB-38 (Sample 1, Table 4) are evaluated as metallic flake control agents in a high solids basecoat useful for automotive coatings. Five formulations are prepared as described in Table 27. The formulations are sprayed onto metal panels using a spray technique altered to accommodate for the higher solids. The formulations are reduced with xylene/n-BuOAc to obtain the same solids level as Example 55 (i.e. 69%). Example 55 contains HS-CAB-17, Example 56 contains HS-CAB-38, Example 57 (Comparative) is the control and contains no metallic flake control agent, and Examples 58 and 59 contain the microgel metallic flake control agent R-1623-M3.

TABLE 27

| | Example # | | | | |
|---|---|---|---|---|---|
| | 55 | 56 | 57 | 58 | 59 |
| HS-CAB-17 (60%)[9] | 30 | 0 | 0 | 0 | 0 |
| HS-CAB-38 (60%)[10] | 0 | 30 | 0 | 0 | 0 |
| Coroc R-1623-M3 | 0 | 0 | 0 | 10 | 10 |

TABLE 27-continued

| | Example # | | | | |
|---|---|---|---|---|---|
| | 55 | 56 | 57 | 58 | 59 |
| Reactol 175 (80%) | 20 | 20 | 50 | 50 | 60 |
| Cymel 301 | 20 | 20 | 20 | 20 | 20 |
| Stapa Metalux | 20 | 20 | 20 | 20 | 20 |
| Mica | 2 | 2 | 2 | 2 | 13 |
| EEP | 8 | 8 | 8 | 0 | 2 |
| Total | 100 | 100 | 100 | 102 | 126 |
| Panel Appearance[11] | Excellent | Fair | Poor | Poor | Good |
| Adjusted Appearance | NA | NA | Good | Good | NA |

[9]60% solids in MEK, Batch EMT02-085
[10]60% solids in MEK, Batch EMT02-113
[11]When sprayed at 69% solids Excellent appearance is achieved at a solids level of 69% weight solids compared to a commonly used control of 52% weight solids. Example 55 exhibits excellent appearance and good holdout from the OEM clear. The coating also exhibits good travel or flop. The appearance is poor with Examples 57-59 when sprayed at 69% solids. The appearance of Example 56 is fair.

Further reduction is done with the control formulations and the formulations containing the microgels until a good appearance is obtained. For example, the amount of solids for Example 57 is 52.4 in order to obtain similar appearance as Example 55.

Once basecoats with approximately equal appearance are prepared, one half of each panel is then sprayed with a commercial 2-component urethane clearcoat, DuPont OEM TSA, and baked at 121° C. (250° F.) for 20 minutes. Flop/Travel is measured for each cured panel (see Table 28). Example 55 (HS-CAB-17) has good appearance and travel, Example 59 (no CAB or microgel) has good appearance and fair travel when reduced to 52.4% solids, and Example 59 (HS-CAB-38) has fair appearance and poor travel, indicating that there is "strike in" of the basecoat by the topcoat solvents.

TABLE 28

| Example # | Notebook # | Additive | Flop/Travel | % Solids |
|---|---|---|---|---|
| 55 | X-19870-16 | HS-CAB-17 | 12.22 | 69 |
| 58 | X-19870-18 | R-1623-3M | 10.67 | 54 |
| 56 | X-19870-20 | HS-CAB-38 | 10.25 | 69 |

Example 60

Low Molecular Weight CAB's In Urethane Clearcoat Formulation

A new CAB/Acrylic/Urethane formulation is developed loosely based on a combination of two Eastman Publications (E-321 & TT-96-SOL-2A). The purpose of this new formulation is to show the improved flow properties and quicker dry-to-touch time of acrylic isocyanate formulation when CAB-551-0.01 is added. Then, determine if the HS-CAB will give similar improvements without contributing as greatly to viscosity.

The following formulations are prepared:

TABLE 29

| Without CAB (grams) | With CAB (grams) | |
|---|---|---|
| 70.93 | 53.89 | Rohm & Haas Paraloid AU-608B Acrylic (60% solids in n-Butyl Acetate) |
| 0.00 | 23.52 | CAB (50% solution in acetone) |
| 0.45 | 7.27 | n-Butyl Acetate |
| 11.76 | 0.00 | Acetone |
| 0.59 | 0.59 | Dibutyltin Dilaurate (DBTDL) catalyst (1% in n-Butyl Acetate) |
| 16.26 | 14.73 | Bayer Desmodur N-100 Aliphatic Isocyanate (100% Solids) |
| 100.00 | 100.00 | Total |

Formulation Constants
58.8 wt. % Solids Acrylic/CAB/Isocyanate Ratio 55/20/25
41.2 wt % solvent 71.5% n-Butyl Acetate, 28.5% Acetone
Isocyanate/Polyol Ratio 1.2/1
DBTDL catalyst level 0.01% based on solids

Examples 61-66

Evaluation of HS-CAB-38 in Urea Formaldehyde Coatings

A series of formulations containing HS-CAB (Sample 4, Table 4), at 4 different levels), CAB-381-0.1, and no CAB, are prepared as described in Table 30. Table 36 shows the viscosity of the systems at 22.3% solids for the CAB-381-0.1 and 24.3% solids for the rest. The use of HS-CAB-38 gives formulations with viscosities approximately one tenth that of formulations using the CAB-381-0.1 control and one third that of the control without CAB. The HS-CAB-38 samples are applied at a solids level of 40%, approximately twice that of the controls.

The samples are spray applied and allowed to cure for one week prior to evaluation. All samples pass chemical resistance tests with greater than 200 MEK double rubs.

The results of both forward and reverse impact are listed in Table 36. Forward impact drops with the initial change in ratio of the acrylic polyol to HS-CAB-38 but does not change with subsequent alterations. Reverse impact is poor in all cases with no notable differences.

Table 31 also lists the 60° gloss for each example. Gloss is not reduced appreciably even at high levels of HS-CAB-38. The one exception is the 25:45 ratio of AU608X to HS-CAB-38. This sample yields values that are up to 9 points lower.

Crosshatch adhesion is 100 percent retained with all samples.

In this evaluation the HS-CAB-38 samples in all ratios yield higher hardness values than do CAB-381-0.1.

TABLE 30

Formulations of HS-CAB-38/Urea Formaldehyde Coatings

| | Ex. #61 | Ex. #62 | Ex. #63 | Ex. #64 | Ex. #65 | Ex. #66 |
|---|---|---|---|---|---|---|
| Paraloid AU608X | 28.2 | 16.6 | 18.2 | 14.1 | 10 | 0 |
| Cymel U80 | 7.2 | 6.5 | 7.2 | 7.2 | 7.2 | 7.2 |
| CAB-381-0.1 | 0 | 18.2 | 0 | 0 | 0 | 0 |
| HS-CAB-38 | 0 | 0 | 6 | 8.5 | 10.8 | 16.9 |
| n-Butyl Acetate | 38.4 | 34.9 | 40.8 | 41.8 | 42.8 | 45.2 |
| Xylene | 25.7 | 23.3 | 27.3 | 27.9 | 28.7 | 30.2 |
| pTSA[A] | 0.5 | 0.4 | 0.5 | 0.5 | 0.5 | 0.5 |

TABLE 31

Evaluation of HS-CAB-38/Urea Formaldehyde Coatings

| | Ex. # 61 | Ex. # 62 | Ex. # 63 | Ex. # 64 | Ex. # 65 | Ex. # 66 |
|---|---|---|---|---|---|---|
| Wt. % Solids | 24.3 | 22.3 | 24.3 | 24.3 | 24.3 | 24.3 |
| Viscosity cP of above solids | 18.5 | 56.8 | 7.3 | 5.5 | 5 | 4 |
| Application solids | 24.3 | 22.3 | 40 | 40 | 40 | 40 |
| MEK Double Rubs | >200 | >200 | >200 | >200 | >200 | >200 |
| Impact Forward (psi) | 30 | 30 | 30 | 20 | 20 | 20 |
| Impact Reverse (psi) | <10 | <10 | <10 | <10 | <10 | <10 |
| Gloss | 93 | 91 | 92 | 92 | 84 | 90 |
| Adhesion | 100 | 100 | 100 | 100 | 100 | 100 |
| König | 195 | 178 | 180 | 186 | 184 | 184 |

In the drawings and specification, there have been disclosed typical preferred embodiments of the invention and, although specific terms are employed, they are used in a generic and descriptive sense only and not for purposes of limitation, the scope of the invention being set forth in the following claims.

We claim:

1. A cellulose mixed ester having the following properties:
   a total degree of substitution per anhydroglucose unit of from 3.08 to 3.50, having the following substitutions:
      a degree of substitution per anhydroglucose unit of hydroxyl of no more than about 0.70,
      a degree of substitution per anhydroglucose unit of $C_3$-$C_4$ esters from about 0.80 to about 1.40, and
      a degree of substitution per anhydroglucose unit of acetyl of from about 1.20 to about 2.34;
   an inherent viscosity of from 0.05 to 0.12 dL/g, as measured in a 60/40 (wt./wt.) solution of phenol/tetrachloroethane at 25° C.;
   a number average molecular weight ($M_n$) of from about 1,000 to about 5,600;
   a weight average molecular weight ($M_w$) of from about 1,500 to about 10,000; and
   a polydispersity of from about 1.2 to about 3.5.

2. The cellulose mixed ester according to claim 1, wherein the $C_3$-$C_4$ ester comprises butyryl, and wherein the cellulose mixed ester forms a clear solution as a 10 weight percent mixture in propylene glycol monomethyl ether.

3. The cellulose mixed ester according to claim 1, wherein the $C_3$-$C_4$ ester comprises butyryl, and wherein the cellulose mixed ester forms a clear solution as a 10 weight percent mixture in propylene glycol methyl acetate.

4. The cellulose mixed ester according to claim 1, wherein the $C_3$-$C_4$ ester comprises butyryl, and wherein the cellulose mixed ester forms a clear solution as a 10 weight percent mixture in diethylene glycol methyl ether.

5. The cellulose mixed ester according to claim 1, wherein the $C_3$-$C_4$ ester comprises propionyl.

6. The cellulose mixed ester according to claim 1, wherein the degree of substitution per anhydroglucose unit of hydroxyl is from about 0.05 to about 0.70.

7. The cellulose mixed ester according to claim 1, wherein the number average molecular weight ($M_n$) is from about 1,500 to about 5,000.

8. The cellulose mixed ester according to claim 1, wherein the polydispersity is from 1.2 to 2.5.

9. The cellulose mixed ester according to claim 1, wherein the inherent viscosity is from 0.07 to 0.11 dL/g.

10. The cellulose mixed ester according to claim 1, wherein the number average molecular weight ($M_n$) is from about 1,000 to about 4,000.

11. The cellulose mixed ester according to claim 1, wherein the $C_3$-$C_4$ ester comprises butyryl, and wherein the cellulose mixed ester exhibits a viscosity no greater than 6,000 centipoise as a 50 wt. % solution in a 90/10 by weight mixture of n-butyl acetate/xylene.

12. The cellulose mixed ester according to claim 1, wherein the $C_3$-$C_4$ ester comprises butyryl, and wherein the cellulose mixed ester exhibits a viscosity no greater than 3,000 centipoise as a 50 wt. % solution in a 90/10 by weight mixture of n-butyl acetate/xylene.

13. A cellulose mixed ester having the following properties:
   a total degree of substitution per anhydroglucose unit of from 3.08 to 3.50, having the following substitutions:
      a degree of substitution per anhydroglucose unit of hydroxyl of no more than about 0.70;
      a degree of substitution per anhydroglucose unit of $C_3$-$C_4$ esters from about 1.40 to about 2.45, and
      a degree of substitution per anhydroglucose unit of acetyl of from about 0.20 to about 0.80;
   an inherent viscosity of from 0.05 to 0.12 dL/g, as measured in a 60/40 (wt./wt.) solution of phenol/tetrachloroethane at 25° C.;
   a number average molecular weight ($M_n$) of from about 1,000 to about 5,600;
   a weight average molecular weight ($M_w$) of from about 1,500 to about 10,000; and
   a polydispersity of from about 1.2 to about 3.5.

14. The cellulose mixed ester according to claim 13, wherein the $C_3$-$C_4$ ester comprises butyryl, and wherein the cellulose mixed ester forms a clear solution as a 10 weight percent mixture in C-11 ketone.

15. The cellulose mixed ester according to claim 13, wherein the $C_3$-$C_4$ ester comprises butyryl, and wherein the cellulose mixed ester forms a clear solution as a 10 weight percent mixture in diisobutyl ketone.

16. The cellulose mixed ester according to claim 13, wherein the $C_3$-$C_4$ ester comprises butyryl, and wherein the cellulose mixed ester forms a clear solution as a 10 weight percent mixture in propylene glycol monopropyl ether.

17. The cellulose mixed ester according to claim 13, wherein the $C_3$-$C_4$ ester comprises butyryl, and wherein the cellulose mixed ester forms a clear solution as a 10 weight percent mixture in ethylene glycol monopropyl ether.

18. The cellulose mixed ester according to claim 13, wherein the $C_3$-$C_4$ ester comprises butyryl, and wherein the cellulose mixed ester forms a clear solution as a 10 weight percent mixture in ethylene glycol monobutyl ether.

19. The cellulose mixed ester according to claim 13, wherein the $C_3$-$C_4$ ester comprises butyryl, and wherein the cellulose mixed ester forms a clear solution as a 10 weight percent mixture in methanol.

20. The cellulose mixed ester according to claim 13, wherein the $C_3$-$C_4$ ester comprises butyryl, and wherein the cellulose mixed ester forms a clear solution as a 10 weight percent mixture in ethanol with 5% water, containing methanol, methyl isobutyl ketone, and ethyl acetate as denaturants.

21. The cellulose mixed ester according to claim 13, wherein the $C_3$-$C_4$ ester comprises butyryl, and wherein the cellulose mixed ester forms a clear solution as a 10 weight percent mixture in toluene.

22. The cellulose mixed ester according to claim 13, wherein the $C_3$-$C_4$ ester comprises butyryl, and wherein the cellulose mixed ester forms a clear solution as a 10 weight percent mixture in a 90/10 by weight isopropyl alcohol/water blend.

23. The cellulose mixed ester according to claim 13, wherein the $C_3$-$C_4$ ester comprises propionyl.

24. The cellulose mixed ester according to claim 13, wherein the degree of substitution per anhydroglucose unit of hydroxyl is from about 0.05 to about 0.70.

25. The cellulose mixed ester according to claim 13, wherein the number average molecular weight ($M_n$) is from about 1,500 to about 5,000.

26. The cellulose mixed ester according to claim 13, wherein the polydispersity is from 1.2 to 2.5.

27. The cellulose mixed ester according to claim 13, wherein the number average molecular weight ($M_n$) is from about 1,000 to about 4,000.

28. The cellulose mixed ester according to claim 13, wherein the $C_3$-$C_4$ ester comprises butyryl, and wherein the cellulose mixed ester exhibits a viscosity no greater than about 500 centipoise as a 50 wt. % solution in a 90/10 by weight mixture of n-butyl acetate/xylene.

29. A coating composition, comprising:
 a) the cellulose mixed ester according to claim 1 or 13;
 b) one or more coating resins; and
 c) one or more solvents.

30. A coating composition comprising:
 a) about 0.1 to about 50 weight percent, based on the total weight of (a) and (b) in the coating composition, of the cellulose ester according to claim 1 or 13;
 b) about 50 to 99.9 weight percent, based on the total weight of (a) and (b) in the composition, of at least one resin selected from the group consisting of a polyester, a polyester-amide, a cellulose ester, an alkyd, a polyurethane, an epoxy resin, a polyamide, an acrylic, a vinyl polymer, a polyisocyanate, and a melamine; and
 c) at least one solvent;
 wherein the total weight of (a) and (b) is from about 5 to about 85 weight percent of the total weight of (a), (b), and (c).

31. The coating composition according to claim 30, further comprising about 0.1 to about 15 weight percent, based on the total weight of the composition, of one or more coatings additives selected from the group consisting of leveling, rheology, and flow control agents; flatting agents; pigment wetting and dispersing agents; surfactants; ultraviolet (UV) absorbers; UV light stabilizers; tinting pigments; defoaming and antifoaming agents; anti-settling, anti-sag and bodying agents; anti-skinning agents; anti-flooding and anti-floating agents; fungicides and mildewcides; corrosion inhibitors; thickening agents; or coalescing agents.

32. The coating composition of claim 31, further comprising one or more fillers and/or pigments.

33. The coating composition of claim 32, wherein the pigment is comprised of aluminum or mica.

34. A shaped or formed article coated with the composition of claim 30.

35. A plastic material coated with the composition according to claim 30.

36. A metal coated with the composition according to claim 30.

37. A wood surface coated with the composition according to claim 30.

38. A paper coated with the composition according to claim 30.

39. A pigment dispersion, comprising:
 about 20 to about 50 weight percent by weight of a pigment; and
 about 50 to about 80 percent by weight of the cellulose mixed ester of claim 1 or 13.

40. The pigment dispersion of claim 39, wherein the pigment is comprised of alumina or mica.

41. A radiation curable coating containing the cellulose mixed ester according to claim 1 or 13.

42. A powder coating containing the cellulose mixed ester according to claim 1 or 13.

43. An ink composition containing the cellulose mixed ester according to claim 1 or 13.

* * * * *